(12) United States Patent
Fujioka et al.

(10) Patent No.: US 7,349,775 B2
(45) Date of Patent: Mar. 25, 2008

(54) MOTOR VEHICLE STATE DETECTING SYSTEM

(75) Inventors: Hiroshi Fujioka, Tokyo (JP); Takanori Matsunaga, Tokyo (JP); Takashi Maeda, Tokyo (JP); Toshinori Matsui, Tokyo (JP); Masahiko Kurishige, Tokyo (JP); Hideyuki Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 629 days.

(21) Appl. No.: 11/030,335

(22) Filed: Jan. 7, 2005

(65) Prior Publication Data

US 2005/0154510 A1    Jul. 14, 2005

Related U.S. Application Data

(62) Division of application No. 10/299,795, filed on Nov. 20, 2002, now Pat. No. 6,915,199.

(30) Foreign Application Priority Data

May 23, 2002  (JP)  ............... 2002-148929

(51) Int. Cl.
  *G06F 7/00*  (2006.01)
(52) U.S. Cl. ............... 701/29; 701/45; 701/91; 701/36; 701/80; 701/82; 701/70; 701/71; 701/72; 701/73; 701/74; 701/75; 701/76; 303/122.02; 303/138; 303/139; 303/140

(58) Field of Classification Search ............... 701/36, 701/70–76, 80, 82, 90–92, 29; 303/122.02, 303/138–140, 163–169, 175, 177; 180/244
See application file for complete search history.

(56) References Cited

U.S. PATENT DOCUMENTS 5,742,507 A * 4/1998 Eckert ............... 701/70

(Continued)

FOREIGN PATENT DOCUMENTS

DE    39 22 528 C1    7/1990

(Continued)

OTHER PUBLICATIONS

An EPS Control Strategy to Improve Steering Maneuverability on Slippery Roads (SAE Technical Paper Series; 2002-01-0618).

(Continued)

*Primary Examiner*—Thomas Black
*Assistant Examiner*—Wae Lenny Louie
(74) *Attorney, Agent, or Firm*—Sughrue Mion, PLLC

(57) ABSTRACT

System for detecting stability/instability of behavior of a motor vehicle upon occurrence of tire slip or lock. State of the motor vehicle is determined on the basis of an alignment torque (Ta) applied from a road and a side slip angle ($\beta$). By taking advantage of such torque/slip-angle characteristic that although the alignment torque is proportional to a side slip angle when the latter is small, the alignment torque becomes smaller as the side slip angle increases, a normal value is determined from a straight line slope and the side slip angle in a region where the latter is small. Unstable behavior of the motor vehicle is determined when deviation of actual measured value from the normal value increases. Further, unstable state is determined when the slope of the alignment torque for the slip angle departs significantly from that of approximate straight line slope.

6 Claims, 62 Drawing Sheets

U.S. PATENT DOCUMENTS

| | | | |
|---|---|---|---|
| 5,774,821 A * | 6/1998 | Eckert | 701/78 |
| 6,856,868 B1 * | 2/2005 | Le et al. | 701/38 |
| 6,915,199 B2 * | 7/2005 | Fujioka et al. | 701/70 |
| 6,941,207 B2 * | 9/2005 | Matsubara et al. | 701/41 |
| 7,165,008 B2 * | 1/2007 | Choi | 702/141 |
| 7,197,389 B2 * | 3/2007 | Fujioka et al. | 701/70 |
| 7,212,902 B2 * | 5/2007 | Fujioka et al. | 701/70 |
| 7,239,952 B2 * | 7/2007 | Bauer | 701/70 |
| 7,277,787 B2 * | 10/2007 | Salib et al. | 701/70 |
| 2003/0100979 A1 * | 5/2003 | Lu et al. | 701/36 |

FOREIGN PATENT DOCUMENTS

| | | |
|---|---|---|
| DE | 40 26 625 A1 | 2/1992 |
| DE | 44 196 50 A1 | 7/1995 |
| DE | 195 03 148 A1 | 8/1995 |
| DE | 196 07 050 A1 | 8/1997 |
| DE | 199 58 492 A1 | 6/2001 |
| DE | 100 09 921 A1 | 7/2001 |
| JP | 7-27730 | 10/1995 |

OTHER PUBLICATIONS

Estimation of Lateral Grip Margin Based on Self-aligning Torque for Vehicle Dynamics Enhancement (2004-01-1070).

* cited by examiner

MOTOR VEHICLE STATE DETECTING SYSTEM

This is a divisional of application Ser. No. 10/299,795 filed Nov. 20, 2002 now U.S. Pat. No. 6,915,199, the disclosure of which is incorporated herein by reference.

BACKGROUND OF THE INVENTION

1. Field of the Invention

The present invention generally relates to a motor vehicle state detecting apparatus or system which is employed in conjunction with a drive recorder for a motor vehicle and/or for generation of a control start signal for the control of behavior of the motor vehicle. In particular, the invention is concerned with a motor vehicle state detecting system for detecting an unstable state of behavior of the motor vehicle or a prognostic sign thereof. More particularly, the present invention is concerned with a motor vehicle state detecting system which is capable of detecting accurately an unstable state of behavior of a motor vehicle or a prognostic sign thereof with high reliability even in the case where a grip force (friction force) of tire decreases.

2. Description of Related Art

For having better understanding of the concept underlying the present invention, description will first be made of the hitherto known or conventional motor vehicle state detecting system by reference to FIG. 62 which shows in a flow chart processing operations performed by a conventional motor vehicle behavior detecting apparatus disclosed in, for example, Japanese Patent Application Laid-Open Publication No. 277230/1995 (JP-A-7-277230) on the presumption that the motor vehicle behavior detecting system is employed in association with a motor vehicle data recording apparatus.

Referring to FIG. 62, detection of change of the condition or state of a motor vehicle is performed in steps S1 and S2.

At first, it is decided in the step S1 whether or not an anti-skid braking system (also known as antilock brake system or ABS in abbreviation) is in an activated or operating state. When it is determined in the step S1 that the anti-skid braking system is not operating (i.e., when the step S1 results in negation "NO"), decision is then made in the step S2 whether or not quick steering operation is being performed.

In this way, in the conventional motor-vehicle data recording apparatus, decision is made in the step S1 whether or not the anti-skid braking system is operated, which is then followed by the step S2 where decision is made whether or not the quick steering operation is performed.

When both the decision steps S1 and S2 result in negation "NO", then it is decided in a step S3 whether or not a touch sensor is activated (i.e., whether or not contact of the motor vehicle with other object has occurred). When no contact has occurred (i.e., when the step S3 results in "NO"), decision is then made in a step S4 whether or not the detected value of a high-G sensor has reached or exceeded a predetermined value (i.e., whether or not collision has occurred).

In general, in the state in which the anti-skid braking system is being actuated, there is a possibility of the behavior of the motor vehicle changing rapidly. Further, when the quick steering operation has been conducted, there is a possibility that the motor vehicle has already been in an unstable state with the behavior of the motor vehicle changing rapidly.

Such being the circumstances, when either one of the decision steps S1 and S2 results in affirmation "YES", indicating that the anti-skid braking system or the quick steering operation has been put into effect, unstable state of the behavior of the motor vehicle or the prognostic sign thereof is detected to thereby determine that there exists the possibility of collision (step S5). Thereafter, motor vehicle data is recorded and stored for a predetermined period (step S6), whereupon the processing routine shown in FIG. 62 comes to an end.

On the other hand, when the decision steps S1 to S3 results in "NO" while it is decided in the step S4 that detected value of the high-G sensor is equal to or greater than the predetermined value (i.e., when the step S4 results in "YES"), it is then determined that collision has taken place (step S7), and relevant data is then recorded and stored for a predetermined period (step S8), whereupon the processing comes to an end.

By contrast, when it is determined in the step S4 that detected value of high-G sensor is smaller than the predetermined value (i.e., when the step S4 results in "NO"), then the processing routine shown in FIG. 62 is immediately terminated.

Further, when it is determined in the step S3 that the touch sensor is activated (i.e., when the step S3 results in "YES"), it is then determined in a step S9 that collision has taken place. In that case, relevant data is recorded and stored for a predetermined period (step S10), whereupon the processing routine shown in FIG. 62 is terminated.

As is apparent from the above, in the conventional motor vehicle state detecting system, rapid change of the behavior of the motor vehicle is detected in the state where the anti-skid braking system is being applied or the quick steering operation is performed, to thereby make decision as to the possibility of occurrence of the collision.

However, in a slippery road surface condition such as typified by a snow-covered road, there may occur such situation that the motor-vehicle falls into a spinning state even when the steering operation is performed slowly without effectuating the braking operation.

In the situation mentioned above, it is impossible to detect the unstable state of behavior of the motor vehicle or the prognostic sign thereof with high accuracy and reliability through the detection procedure conducted by the conventional apparatus described above.

As is apparent from the foregoing, the conventional motor vehicle state detecting system is so arranged as to detect the unstable state of the motor vehicle on the basis of operation of the anti-skid braking system and quick manipulation of the steering wheel (steering handle). Thus, with the conventional motor vehicle state detecting system, it is difficult or impossible to detect with accuracy the unstable state of the motor vehicle on the slippery road surface condition such as the snow-covered road condition or the like, giving rise to a problem.

SUMMARY OF THE INVENTION

In the light of the state of the art described above, it is an object of the present invention to provide a motor vehicle state detecting system which is capable of detecting with high accuracy and reliability the unstable state of behavior of the motor vehicle or the prognostic sign thereof by detecting actual parameter values generated actually in the motor vehicle even in the case where the grip force (friction force) of tire is lowered.

With the present invention, it is contemplated to detect change of behavior of the motor vehicle regardless of occurrence of slip and/or tire lock by making use of a first parameter (side slip angle or alternatively steering angle and vehicle speed) and a second parameter (alignment torque or alternatively transverse acceleration).

More particularly, it has been established that characteristic of the second parameter relative to the first parameter (the characteristic of the second parameter is termed a third parameter) is such that the second parameter bears a proportional relation to the first parameter so long as the value of the first parameter is relatively small whereas when the value of the first parameter increases, the second parameter decreases to a value at which the proportional relation mentioned above can no more be sustained. By taking advantage of this fact, a normative or normal value is determined on the basis of a straight line representing the proportional relation in a region where the value of the first parameter is small, and when deviation of the value measured actually (hereinafter also referred to as the actual measured value) from the normal value (i.e., difference between the former and the latter) increases beyond a predetermined value, it is then decided or determined that a behavior of the motor vehicle is in a unstable state. Further, when the slope of the second parameter relative to the first parameter differs significantly from that of an approximate straight line, it is determined that the behavior of the motor vehicle is in the unstable state.

In view of the above and other objects which will become apparent as the description proceeds, there is provided according to a general aspect of the present invention a motor vehicle state detecting system for detecting an unstable state of a motor vehicle or alternatively a prognostic sign thereof.

The detecting system includes a first detecting means for detecting an actual measured value of a first parameter corresponding to either a side slip angle or alternatively a steering angle of the motor vehicle, a second detecting means for detecting an actual measured value of a second parameter corresponding to either an alignment torque or alternatively a transverse acceleration which the motor vehicle is subjected to, an arithmetic means for arithmetically determining a third parameter relevant to a relation which the second parameter bears relative to the first parameter, a reference value setting means for setting previously a comparison reference value for the third parameter, and a motor vehicle behavior stability decision means for making decision that behavior of the motor vehicle is unstable when the third parameter departs from the comparison reference value.

In the motor vehicle state detecting system described above, the third parameter may preferably be one selected from a group consisting of an absolute value of a deviation of the actual alignment torque from a normative or normal alignment torque, a change rate of an actual alignment torque for an actual side slip angle (torque/slip-angle change rate $dTa/d\beta$), a change rate of the actual alignment torque for the actual steering angle (torque/steering-angle change rate $dTa/d\theta$) an absolute value of a deviation of an actual transverse acceleration from a normal transverse acceleration, a change rate of the actual transverse acceleration for the actual side slip angle (acceleration/slip-angle change rate $dGy/d\beta$) and a change rate of the actual transverse acceleration for the actual steering angle (acceleration/steering-angle change rate $dGy/d\theta$), as will hereinafter be described in more detail.

By virtue of the arrangements of the motor vehicle state detecting system described above, the unstable state of the motor vehicle or prognostic sign thereof can be detected with high accuracy and reliability even when the grip force of tire becomes lowered.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
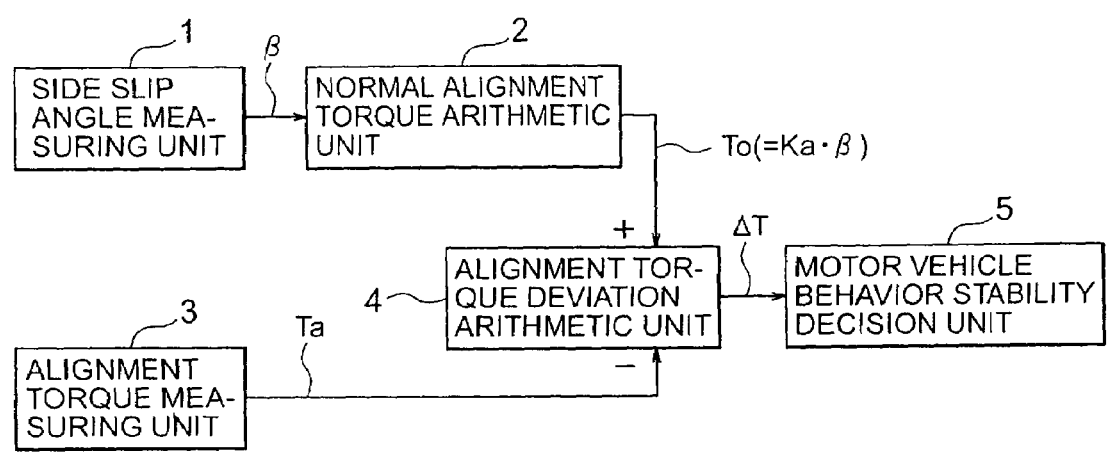
FIG. 1 is a block diagram showing schematically a major portion of a motor vehicle state detecting system according to a first embodiment of the present invention.

The present invention will be described in detail in conjunction with what is presently considered as preferred or typical embodiments thereof by reference to the drawings. In the following description, like reference characters designate like or corresponding contents throughout the several views.

Embodiment 1

FIG. 1 is a block diagram showing generally and schematically a system configuration of the motor vehicle state detecting system according to a first embodiment of the present invention.

Referring to FIG. 1, reference numeral 1 denotes a side slip angle measuring unit which constitutes a first detecting means for detecting an actual side slip angle β of a vehicle body or tire of the motor vehicle as an actual measured value of a first parameter.

A normative or normal alignment torque arithmetic unit 2 which constitutes a normal value arithmetic means includes a torque/slip-angle ratio setting means (not shown) for setting a torque/slip-angle ratio (=gain Ka) and serves for arithmetically determining a normal alignment torque To on the basis of the actual side slip angle β and the torque/slip-angle ratio (gain Ka).

The torque/slip-angle ratio setting means incorporated in the normal alignment torque arithmetic unit 2 serves to set a ratio of the alignment torque (also called aligning torque) to the slip angle of the motor vehicle as the torque/slip-angle ratio (gain Ka) in advance independence on the type of the motor vehicle concerned.

Thus, the normal alignment torque arithmetic unit 2 is capable of arithmetically determining the normative or normal alignment torque To (=Ka·β) for the actual side slip angle β by multiplying the actual side slip angle β by the gain Ka.

On the other hand, an alignment torque measuring unit 3 which constitutes a second detecting means is designed to detect an actual alignment torque Ta which the motor vehicle receives from a road surface in the course of running. Incidentally, in the description which follows, the actual side slip angle β will also be referred to simply as the side slip angle β for the convenience of description.

Further, an alignment torque deviation arithmetic unit 4 is provided which is so designed or programmed as to arithmetically determine as a third parameter an absolute value of a deviation of the actual alignment torque Ta from the normal alignment torque To (i.e., error or difference between the normal alignment torque To and the actual alignment torque Ta). More specifically, the alignment torque deviation arithmetic unit 4 determines a deviation ΔT of alignment torque (hereinafter also referred to as the alignment torque deviation ΔT) in accordance with ΔT=|To−Ta|.

Further, provided is a motor vehicle behavior stability decision unit 5 which includes a reference value setting means and a comparison means (not shown). The reference value setting means sets previously a predetermined deviation quantity α1 serving as a reference value for comparison with the alignment torque deviation ΔT independence on the motor vehicle concerned.

On the other hand, the comparison means incorporated in the motor vehicle behavior stability decision unit 5 serves to compare the alignment torque deviation ΔT with the predetermined deviation quantity α1 to thereby decide that the behavior of the motor vehicle is unstable when the alignment torque deviation ΔT is greater than the predetermined deviation quantity α1 inclusive thereof. The result of this decision is outputted as an unstable state detection signal.

In general, the actual alignment torque Ta bears a substantially proportional relation to the actual side slip angle β so long as the motor vehicle is in the stable running state. However, when the running state of the motor vehicle approaches to a stability limit or an unstable region, magnitude of the actual alignment torque Ta decreases, rendering it impossible to maintain the above-mentioned proportional relation relative to the actual side slip angle β. Accordingly, by taking advantage of this feature, it is possible to detect the state of the motor vehicle.

The side slip angle measuring unit 1 for measuring the actual side slip angle β may be implemented by mounting on a wheel of the motor vehicle an optical sensor which is capable of measuring the ground speeds in two directions, i.e., the longitudinal direction and the transverse direction.

On the other hand, the alignment torque measuring unit 3 for measuring the actual alignment torque Ta may be implemented by mounting a load cell or the like on a steering column.

As described above, the normal alignment torque arithmetic unit 2 is designed to arithmetically determine the normal alignment torque To (=Ka·β) while the alignment torque deviation arithmetic unit 4 is designed to arithmetically determine the alignment torque deviation ΔT (=|To−Ta|).

The motor vehicle behavior stability decision unit 5 is designed to compare the alignment torque deviation ΔT with the predetermined deviation quantity α1. When the comparison shows that ΔT≧α1, i.e., when the condition given by the undermentioned expression (1) is satisfied, it is then determined that the behavior of the motor vehicle is unstable.

$$|ka \cdot \beta - Ta| \geq \alpha 1 \qquad (1)$$

Figure 2:
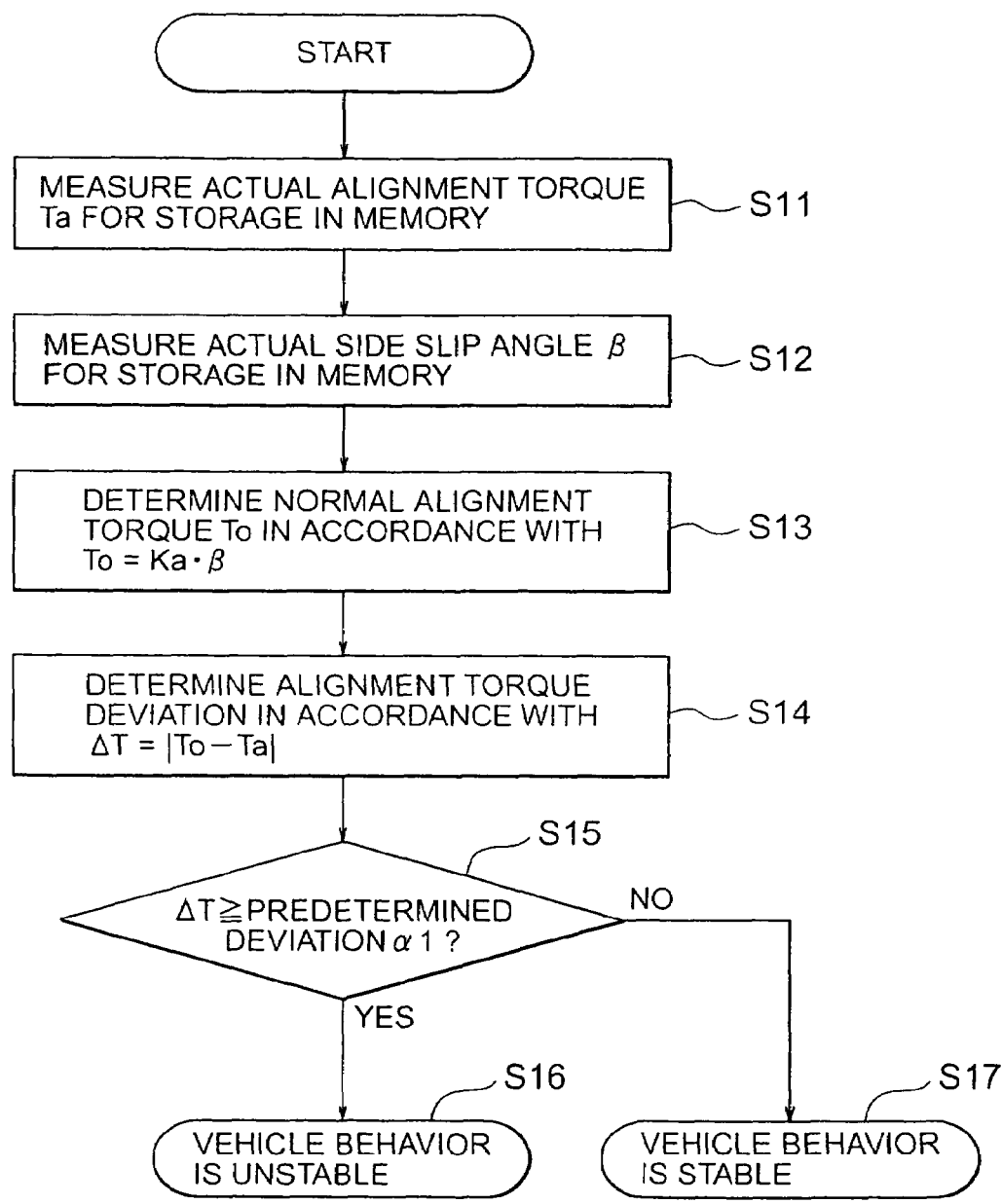
FIG. 2 is a flow chart for illustrating vehicle behavior decision operation performed by the motor vehicle state detecting system according to the first embodiment of the invention.

Next, description will be directed to the operation performed by the motor vehicle state detecting system according to the instant embodiment of the invention by reference to a flow chart shown in FIG. 2 together with FIG. 1.

Referring to FIG. 2, the actual alignment torque Ta which the motor vehicle receives from the road surface in the course of traveling is firstly measured by means of the alignment torque measuring unit 3 and the value of the actual alignment torque as measured being then stored in a memory incorporated in the alignment torque deviation arithmetic unit 4 (step S11).

On the other hand, the actual side slip angle β of the body or tire of the motor vehicle is measured by the side slip angle measuring unit 1, and the value of the actual side slip angle as measured is then stored in the memory incorporated in the normative or normal alignment torque arithmetic unit 2 (step S12).

Subsequently, the normal alignment torque arithmetic unit 2 multiplies the actual side slip angle β by the gain Ka of the alignment torque for the side slip angle to thereby arithmetically determine the normal alignment torque To (step S13).

In succession, the actual alignment torque Ta is subtracted from the normal alignment torque To by the alignment torque deviation arithmetic unit 4 and the absolute value of the difference between the actual alignment torque and the normal alignment torque is arithmetically derived as the alignment torque deviation ΔT (step S14).

Finally, the alignment torque deviation ΔT and the predetermined deviation quantity α1 preset in dependence on the motor vehicle concerned are compared with each other by means of the motor vehicle behavior stability decision unit 5, whereon decision is made whether the condition given by the expression (1), i.e., ΔT≧α1, is satisfied or not (step S15).

When it is determined in the step S15 that ΔT≧α1 (i.e., when the decision step S15 results in affirmation "YES"), it is determined in a step S16 that the behavior of the motor vehicle is unstable or that a prognostic sign of the behavior of the motor vehicle becoming unstable exists. By contrast, when it is found in the step S15 that ΔT<α1 (i.e., when the decision step S15 results in negation "NO"), it is then determined that the behavior of the motor vehicle is stable (step S17), whereon the processing routine shown in FIG. 2 comes to an end.

As can be understood from the above, by detecting the unstable state of behavior of the motor vehicle on the basis of the actual side slip angle β and the actual alignment torque Ta, it is possible to effectively detect the unstable state of behavior of the motor vehicle even in the state where the grip force of the tire has been lowered.

Figure 3:
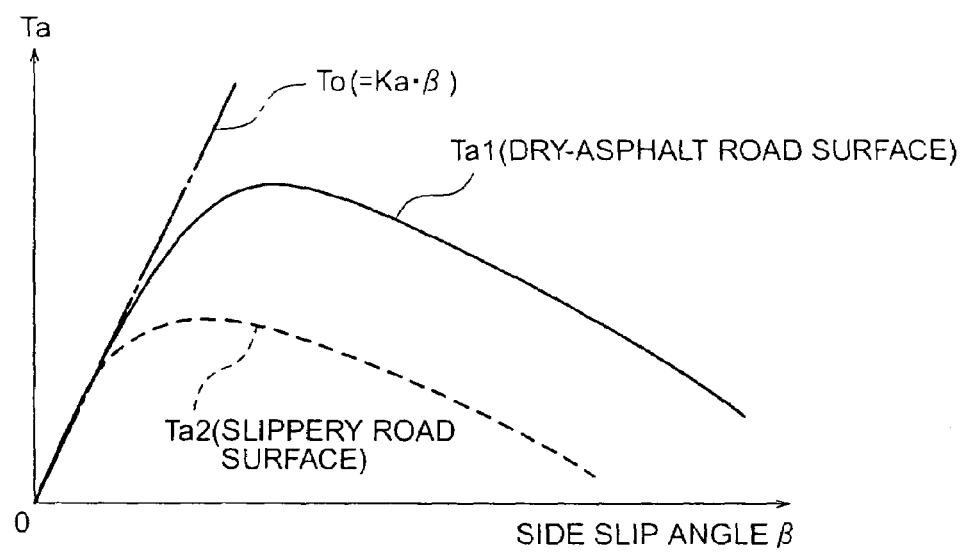
FIG. 3 is a characteristic diagram for graphically illustrating characteristic of an alignment torque for a side slip angle when a friction coefficient of a road surface changes in the system according to the first embodiment of the invention.

FIG. 3 is a characteristic diagram for graphically illustrating in what manner the actual alignment torque (Ta) changes as a function of the actual side slip angle (β).

In this figure, the actual side slip angle β is taken along the abscissa while the actual alignment torque Ta is taken along the ordinate. Further, in the figure, a single-dotted line curve represents the normal alignment torque To, a solid line curve represents an actual alignment torque Ta1 when the motor vehicle is running on a road surface covered with dry asphalt (hereinafter also referred to as the dry asphalt road surface), and a broken line curve represents an actual alignment torque Ta2 when the motor vehicle is traveling on a slippery road surface.

As can be seen in FIG. 3, the characteristic curve (see broken line curve) representing the actual alignment torque Ta2 on the slippery road surface begins to fall at the actual side slip angle β of a smaller value when compared with the actual alignment torque Ta1 on the dry asphalt road surface represented by the solid line characteristic curve. However, in a range where the actual side slip angle β is much smaller than the value mentioned above, linearity of the actual alignment torque Ta2 on the slippery road surface which substantially conforms to the normal alignment torque To is sustained as is the case with the actual alignment torque Ta1.

For the reason mentioned above, in the range or region where the value of the actual side slip angle β is small, there can be made use of the gain of the normal alignment torque To for the side slip angle β (the slope of the curve To shown in FIG. 3) which gain is preset in dependence on the motor vehicle concerned.

In general, in conjunction with the torque/slip-angle characteristic, it is safe to say that although the actual alignment torque Ta and the side slip angle β bear the proportional relation to each other in the region where the side slip angle β is small, the actual alignment torque Ta becomes small as the side slip angle β increases. By taking advantage of this feature, it is possible to arithmetically determine the normal value on the basis of the straight-line slope (slope of To) and the side slip angle β in the region where the value of the side slip angle β is small to thereby identify the unstable state of the motor vehicle behavior when the deviation of the actual measured value from the normal value increases (i.e., when the slope of the actual alignment torque Ta for the side slip angle β differs remarkably from the slope of the approximate straight line).

In this way, the unstable state of the motor vehicle behavior or the prognostic sign thereof in the slip/locked state of tires which could not be detected with the conventional apparatus can be ascertained by detecting the actual alignment torque Ta and the side slip angle β actually taking place in the motor vehicle to thereby arithmetically determine the normal alignment torque To and then comparing the actual alignment torque Ta with the normal alignment torque To.

To say in another way, by detecting the change of the behavior of the motor vehicle on the basis of the actual alignment torque Ta and the actual side slip angle β, it is possible to detect the unstable state of the motor vehicle behavior or the prognostic sign thereof by taking advantage of such characteristics of the torque/slip-angle ratio (gain Ka) that the torque and the slip angle are in a linear relation to each other, i.e., the actual alignment torque Ta bears a proportional relation to the side slip angle β, in the region where the actual side slip angle β is small, while in the region where the actual side slip angle β is large, the actual alignment torque Ta decreases as a function of the actual side slip angle β.

More specifically, the value of the normal alignment torque To is determined on the basis of the straight-line slope (gain Ka) and the actual side slip angle β in the region where the value of the actual side slip angle β is small, whereon the value of the actual alignment torque Ta is compared with that of the normal alignment torque To. When the alignment torque deviation $\Delta T$ (=|To−Ta|) is greater than the predetermined value $\alpha 1$ inclusive, it is then determined that the behavior of the motor vehicle is unstable.

Embodiment 2

In the motor vehicle state detecting system according to the first embodiment of the invention, the normal alignment torque To is arithmetically determined by using the torque/slip-angle ratio (gain Ka) to thereby make decision that the motor vehicle is in the unstable state when the alignment torque deviation $\Delta T$ of the actual alignment torque Ta from the normal alignment torque To is greater than the predetermined value $\alpha 1$ inclusive thereof. By contrast, in the motor vehicle state detecting system according to a second embodiment of the present invention, such arrangement is adopted that the rate of change (hereinafter also referred to simply as the change rate) of the actual alignment torque Ta for the side slip angle $\beta$ is arithmetically determined or alternatively measured to thereby make decision that the motor vehicle is in the unstable state when the torque/slip-angle change rate (i.e., change rate of the actual alignment torque relative to the actual side slip angle) departs from a predetermined range.

Figure 4:
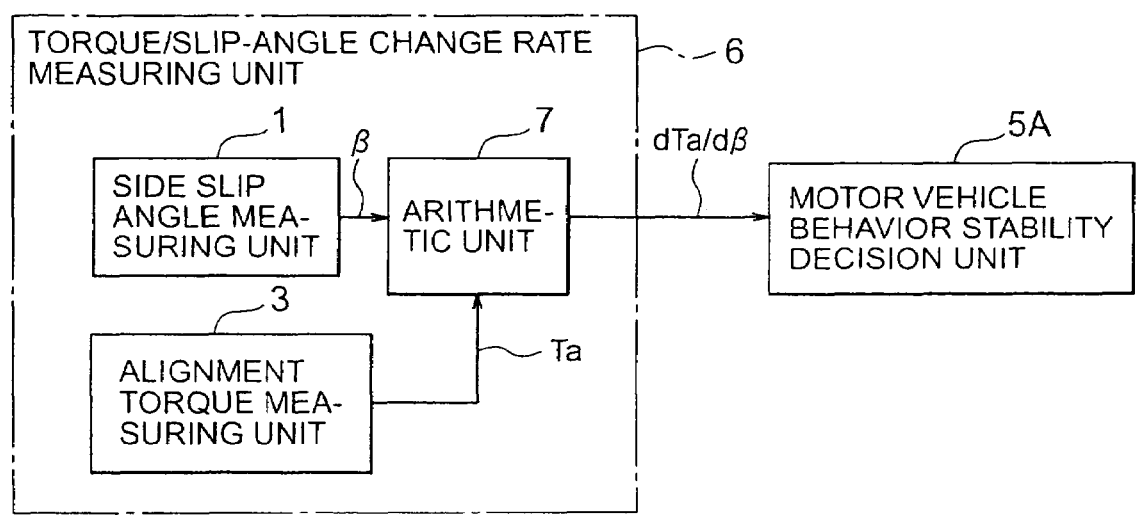
FIG. 4 is a block diagram showing schematically a major portion of the motor vehicle state detecting system according to a second embodiment of the present invention.

FIG. 4 is a schematic block diagram showing generally a major portion of the motor vehicle state detecting system according to the second embodiment of the invention which is so arranged as to make decision concerning the stability of behavior of the motor vehicle on the basis of comparison between the torque/slip-angle change rate and the predetermined range. Incidentally, components same as or equivalent to those described hereinbefore by reference to FIG. 1 are denoted by like reference symbols affixed with "A" as the case may be. Repeated description in detail of those components will be omitted.

Now, referring to FIG. 4, reference numeral 6 denotes a torque/slip-angle change rate measuring unit which is comprised of the side slip angle measuring unit 1, the alignment torque measuring unit 3 and an arithmetic unit 7. The arithmetic unit 7 is so designed as to arithmetically determine (or alternatively measure) the change rate of the actual alignment torque Ta for the actual side slip angle $\beta$ in terms of the torque/slip-angle change rate $dTa/d\beta$.

The torque/slip-angle change rate $dTa/d\beta$ arithmetically determined by the arithmetic unit 7 incorporated in the torque/slip-angle change rate measuring unit 6 is inputted to a motor vehicle behavior stability decision unit 5A to be utilized in making decision as to the stability of behavior of the motor vehicle.

The motor vehicle behavior stability decision unit 5A includes a reference value setting means (not shown) which is designed to set a predetermined range as the reference for comparison with the torque/slip-angle change rate $dTa/d\beta$ in dependence on the type of the motor vehicle concerned. When the torque/slip-angle change rate $dTa/d\beta$ departs from the predetermined range, the motor vehicle behavior stability decision unit 5A decides that the behavior of the motor vehicle is unstable.

In general, the actual alignment torque Ta bears at least approximately a proportional relation to the actual side slip angle $\beta$ so long as the motor vehicle is in the stable running state. However, when the behavior of the motor vehicle approaches to the stability limit mentioned hereinbefore, magnitude of the actual alignment torque Ta decreases to a level where the proportional relation to the actual side slip angle $\beta$ can no more be maintained, as described previously by reference to FIG. 3. By taking advantage of this feature of behavior, it is possible to make decision as to the unstable state of the motor vehicle.

The arithmetic unit 7 incorporated in the torque/slip-angle change rate measuring unit 6 may be so designed as to determine the torque/slip-angle change rate $dTa/d\beta$ by measuring the actual alignment torque Ta in correspondence to the side slip angle $\beta$ actually measured.

The motor vehicle behavior stability decision unit 5A compares the torque/slip-angle change rate $dTa/d\beta$ with the predetermined range preset in dependence on the motor vehicle concerned, to thereby decide that the behavior of the motor vehicle is unstable when the torque/slip-angle change rate $dTa/d\beta$ lies outside of the predetermined range. Mathematically, this decision can be made in accordance with the following expression (2):

$$dTa/d\beta \geq \alpha 2U \text{ or } dTa/d\beta \leq \alpha 2L \qquad (2)$$

Figure 5:
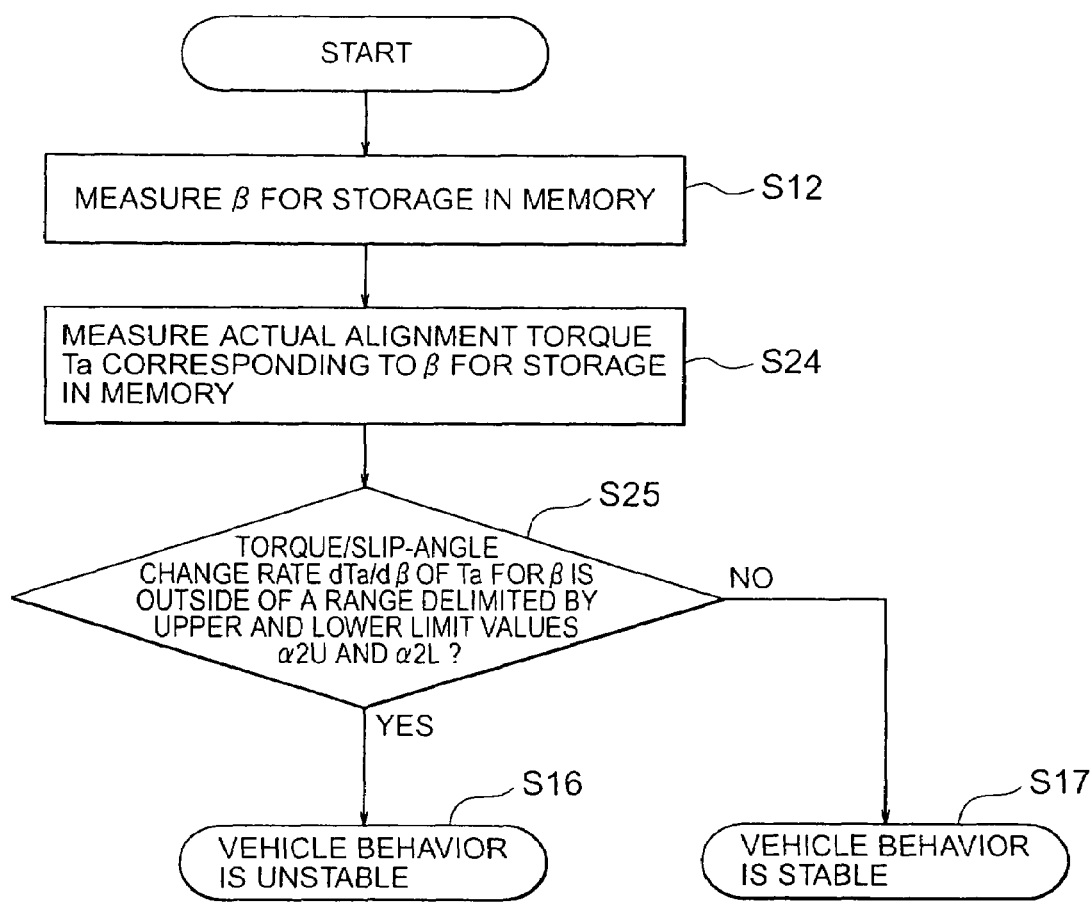
FIG. 5 is a flow chart for illustrating vehicle behavior decision operation performed by the motor vehicle state detecting system according to the second embodiment of the invention.

Next, referring to a flow chart shown in FIG. 5, description will be directed to the operation performed by the motor vehicle state detecting system according to the second embodiment of the invention. In FIG. 5, the steps S12, S16 and S17 represent the processings similar to those described hereinbefore by reference to FIG. 2.

At first, the actual side slip angle $\beta$ is measured by means of the arithmetic unit 7 incorporated in the torque/slip-angle change rate measuring unit 6 to be stored in a memory in a step S12, which is then followed by a step S24 where the actual alignment torque Ta corresponding to the actual side slip angle $\beta$ is measured in terms of the torque/slip-angle change rate $dTa/d\beta$ which is then stored in the memory as well.

In succession, in a step S25, the motor vehicle behavior stability decision unit 5A fetches the torque/slip-angle change rate $dTa/d\beta$ measured or determined by the torque/slip-angle change rate measuring unit 6 to thereby make decision whether or not the torque/slip-angle change rate $dTa/d\beta$ departs from the predetermined range defined by the upper limit value $\alpha 2U$ and the lower limit value $\alpha 2L$, respectively.

When it is determined in the step S25 that the torque/slip-angle change rate $dTa/d\beta$ departs from the predetermined range (i.e., when the decision step S25 results in affirmation "YES"), it is determined in a step S16 that the behavior of the motor vehicle is unstable or that a prognostic sign indicating that the behavior of the motor vehicle will become unstable exists. By contrast, when it is found in the step S25 that the torque/slip-angle change rate $dTa/d\beta$ lies within the predetermined range (i.e., when the decision step S25 results in negation "NO"), it is then determined that the behavior of the motor vehicle is stable (step S17), whereupon the processing routine shown in FIG. 5 comes to an end.

As can be seen from the above, by detecting the unstable state of the behavior of the motor vehicle on the basis of the actual alignment torque Ta really taking place in the motor vehicle concerned, it is possible to detect the unstable state of the behavior of the motor vehicle with high effectiveness even in the situation where the grip force of tire is small.

As described previously by reference to FIG. 3, the actual alignment torque Ta to which the motor vehicle running on the slippery road surface is subjected to becomes small when the actual side slip angle $\beta$ is relatively small. However, in the region where the actual side slip angle $\beta$ becomes further small, the linearity of the actual alignment torque Ta which conforms to the slope of the normal alignment torque To is sustained. Thus, the range of the torque/slip-angle change rate (gain) can be used for making decision concerning the stability of the behavior of the motor vehicle similarly to the case where the motor vehicle is running on a dry-asphalt (not slippery) road surface.

Embodiment 3

In the motor vehicle state detecting system according to the second embodiment of the invention, the torque/slip-angle change rate measuring unit 6 is employed for making available the torque/slip-angle change rate $dTa/d\beta$. By contrast, in the case of the motor vehicle state detecting system according to a third embodiment of the present invention, time-based change rates of the actual side slip angle $\beta$ and the actual alignment torque Ta, respectively, are measured and subjected to division processing for thereby determining the torque/slip-angle change rate $dTa/d\beta$.

Figure 6:
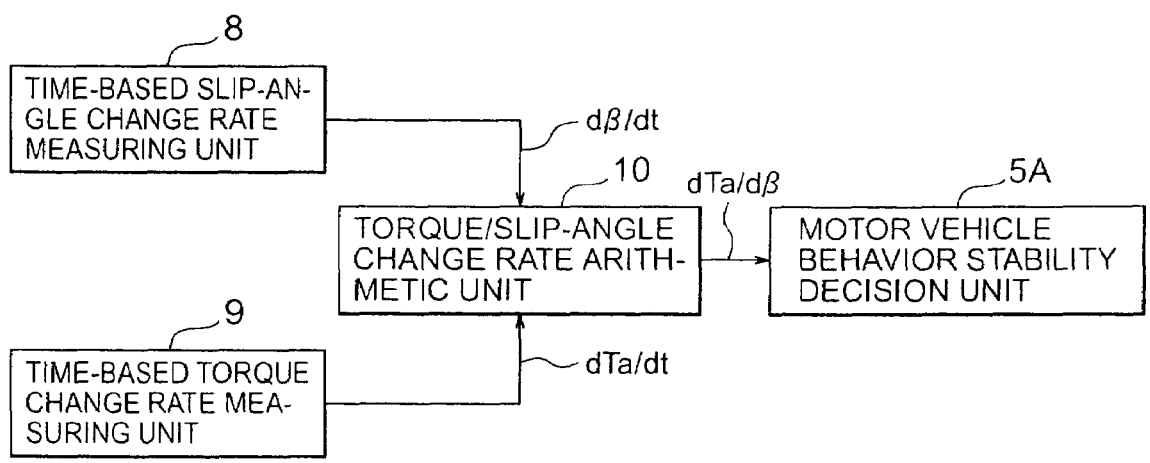
FIG. 6 is a block diagram showing schematically a major portion of the motor vehicle state detecting system according to a third embodiment of the present invention.

FIG. 6 is a block diagram showing generally and schematically a major portion of the motor vehicle state detecting system according to the third embodiment of the invention in which the torque/slip-angle change rate $dTa/d\beta$ is determined on the basis of the time-based change rates of the actual side slip angle $\beta$ and the actual alignment torque Ta, respectively.

Referring to FIG. 6, the arithmetic means for determining the stability decision parameter is comprised of a time-based slip-angle change rate measuring unit 8 for determining the time-based change rate of the actual side slip angle $\beta$ in the form of the time-based slip-angle change rate $d\beta/dt$, a time-based torque change rate measuring unit 9 for determining the time-based change rate of the actual alignment torque Ta in the form of $d\beta/dt$, i.e., the time-based slip-angle change rate, and a torque/slip-angle change rate arithmetic unit 10 for arithmetically determining the torque/slip-angle change rate $dTa/d\beta$ by dividing the time-based torque change rate $dTa/dt$ by the time-based slip-angle change rate $d\beta/dt$.

Now, referring to FIG. 6, operation of the motor vehicle state detecting system according to the instant embodiment of the invention will be described.

As mentioned previously, the motor vehicle behavior stability decision unit 5A determines the state of the motor vehicle by taking advantage of the behavior feature that the proportional relation of the actual alignment torque Ta relative to the actual side slip angle $\beta$ can no more be sustained or held when the actual alignment torque Ta approaches to the stability limit of the motor vehicle.

The time-based slip-angle change rate measuring unit 8 may be so designed as to measure the time-based slip-angle change rate $d\beta/dt$ of the actual side slip angle $\beta$ by resorting to measurement of e.g. the ground speed in both the longitudinal and transverse directions periodically at a predetermined time interval.

Further, the time-based torque change rate measuring unit 9 may be so designed as to measure the time-based torque change rate $dTa/dt$ by measuring the actual alignment torque Ta at a predetermined time interval.

The time-based torque change rate measuring unit 9 may be constituted by a load cell mounted on the steering column for measuring the actual alignment torque periodically at a predetermined time interval.

The torque/slip-angle change rate arithmetic unit 10 is so designed as to divide the time-based torque change rate $dTa/dt$ by the time-based slip-angle change rate $d\beta/dt$ to thereby arithmetically determine the ratio of the change rate of the actual alignment torque Ta to that of the actual side slip angle $\beta$, i.e., the torque/slip-angle change rate $dTa/d\beta$ in accordance with the undermentioned expression (3):

$$(dTa/dt)/(d\beta/dt)=dTa/d\beta \qquad (3)$$

In this conjunction, the motor vehicle behavior stability decision unit 5A is so designed as to decide that the behavior of the motor vehicle is in the unstable state or the prognostic state thereof when the torque/slip-angle change rate $dTa/d\beta$ is outside of the predetermined range (see the expression (2) described previously) and output an unstable state detection signal.

Figure 7:
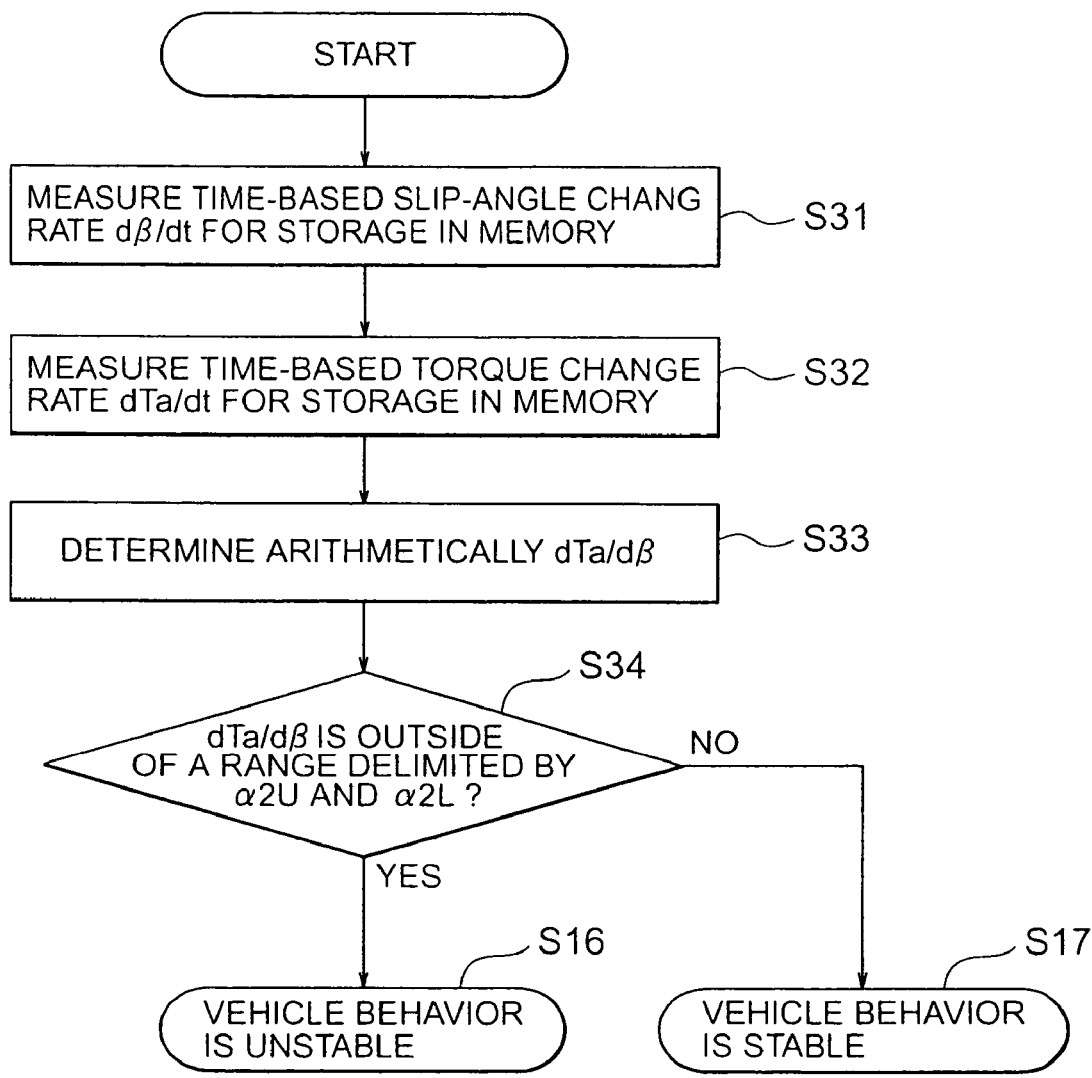
FIG. 7 is a flow chart for illustrating vehicle behavior decision operation performed by the motor vehicle state detecting system according to the third embodiment of the invention.

Next, referring to a flow chart of FIG. 7, description will be directed to the operation performed by the motor vehicle state detecting system according to the third embodiment of the invention shown in FIG. 6. In FIG. 7, the steps S16 and S17 represent the processings similar to those described hereinbefore by reference to FIGS. 2 and 5.

At first, the time-based change rate $d\beta/dt$ of the actual side slip angle $\beta$ (i.e., time-based slip-angle change rate $d\beta/dt$) is measured to be stored in a memory in a step S31, which is then followed by a step S32 where the time-based change rate $dTa/dt$ of the actual alignment torque Ta (i.e., time-based torque change rate $dTa/dt$) is measured, which is also stored in the memory.

In succession, in a step S33, the time-based torque change rate $dTa/dt$ is divided by the time-based slip-angle change rate $d\beta/dt$ to thereby determine the change rate (rate of change) of the actual alignment torque Ta relative to that of the actual side slip angle $\beta$ (i.e., torque/slip-angle change rate $dTa/d\beta$).

Subsequently, the motor vehicle behavior stability decision unit 5A compares the torque/slip-angle change rate $dTa/d\beta$ with the predetermined range (delimited by the upper limit value $\alpha2U$ and the lower limit value $\alpha2L$, respectively) (step S34) to thereby make decision that the behavior of the motor vehicle is unstable when the torque/slip-angle change rate $dTa/d\beta$ is outside of the predetermined range (step S16) while deciding that the behavior of the motor vehicle is stable when the torque/slip-angle change rate $dTa/d\beta$ falls within the predetermined range mentioned above (step S17).

In this way, by computing the torque/slip-angle change rate $dTa/d\beta$ from the time-based change rate of the actual alignment torque Ta and that of the actual side slip angle $\beta$, there can be obtained advantageous actions and effects similar to those of the embodiments described hereinbefore.

At this juncture, it should further be added that even in the case where it is impossible to directly measure (or determine arithmetically) the torque/slip-angle change rate $dTa/d\beta$, this change rate can arithmetically be derived from the time-based change rates of the actual alignment torque Ta and the actual side slip angle $\beta$, respectively.

Embodiment 4

In the case of the motor vehicle state detecting system according to the third embodiment of the invention, the time-based change rates of the actual side slip angle $\beta$ and the actual alignment torque Ta, respectively, are used for arithmetically determining the torque/slip-angle change rate $dTa/d\beta$. In the motor vehicle state detecting system according to a fourth embodiment of the present invention, change rates of the actual side slip angle $\beta$ and the actual alignment torque Ta, respectively, for the travel distance of the motor vehicle (i.e., distance the motor vehicle has traveled) are used.

Figure 8:
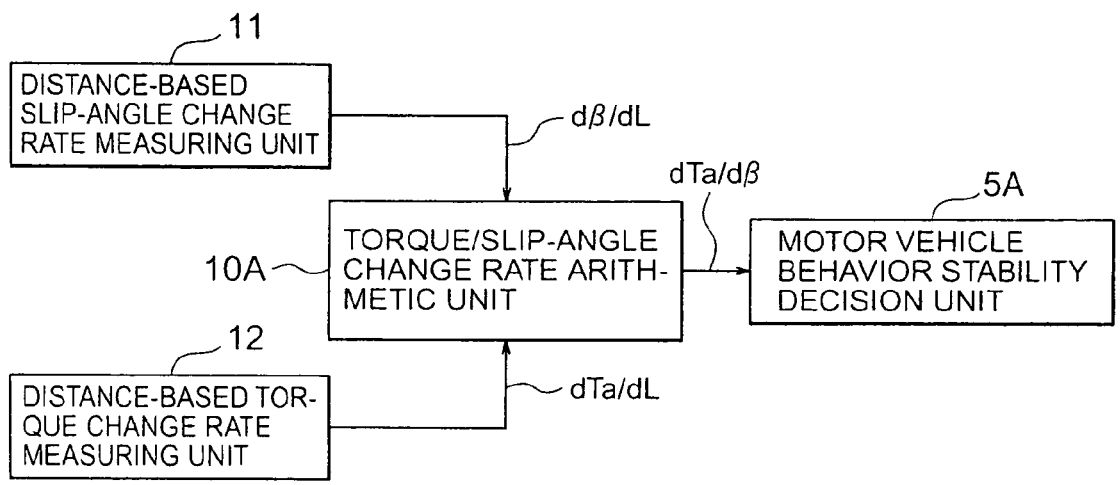
FIG. 8 is a block diagram showing schematically a major portion of the motor vehicle state detecting system according to a fourth embodiment of the present invention.

FIG. 8 is a block diagram showing generally and schematically a major portion of the motor vehicle state detecting system according to the fourth embodiment of the invention in which the change rates of the actual side slip angle β and the actual alignment torque Ta, respectively, for the travel distance of the motor vehicle are used.

In FIG. 8, reference numeral 5A denotes a motor vehicle behavior stability decision unit similar to that described hereinbefore in conjunction with FIG. 6. A torque/slip-angle change rate arithmetic unit 10A is equivalent to the torque/slip-angle change rate arithmetic unit 10 also described previously.

In this case, the arithmetic means for determining the stability decision parameter is comprised of a distance-based slip-angle change rate measuring unit 11 for determining the change rate of the actual side slip angle β for the travel distance L of the motor vehicle in the form of the distance-based slip-angle change rate dβ/dL, a distance-based torque change rate measuring unit 12 for determining the change rate of the actual alignment torque Ta for the travel distance L in the form of the distance-based torque change rate dTa/dL, and a torque/slip-angle change rate arithmetic unit 10A for arithmetically determining the torque/slip-angle change rate dTa/dβ by dividing the distance-based torque change rate dTa/dL by the distance-based slip-angle change rate dβ/dL.

The distance-based slip-angle change rate measuring unit 11 includes a travel distance measuring unit (or arithmetic unit) for determining a distance L the motor vehicle has traveled. This distance is referred to as the travel distance. The distance-based torque change rate measuring unit 12 may be constituted by a load cell mounted on the steering column for measuring the actual alignment torque periodically every predetermined travel distance.

Now, referring to FIG. 8, operation of the motor vehicle state detecting system according to the fourth embodiment of the invention will_e described.

The distance-based slip-angle change rate measuring unit 11 may be so designed as to arithmetically determine the distance-based slip-angle change rate dβ/dL by resorting to measurement of e.g. the ground speed in both the longitudinal and transverse directions periodically every predetermined travel distance. Further, the distance-based torque change rate measuring unit 12 may be so designed as to arithmetically determine the distance-based torque change rate dTa/dL by measuring the actual alignment torque Ta every predetermined travel distance.

On the other hand, the torque/slip-angle change rate arithmetic unit 10A is so designed as to divide the distance-based torque change rate dTa/dL by the distance-based slip-angle change rate dβ/dL to thereby arithmetically determine the torque/slip-angle change rate dTa/dβ in accordance with the undermentioned expression (4):

$$(dTa/dL)/(d\beta/dL) = dTa/d\beta \quad (4)$$

Further, the motor vehicle behavior stability decision unit 5A is so designed as to check whether or not the torque/slip-angle change rate dTa/dβ falls within a predetermined range and decide that the behavior of the motor vehicle is in the unstable state when the torque/slip-angle change rate dTa/dβ is outside of the predetermined range.

Figure 9:
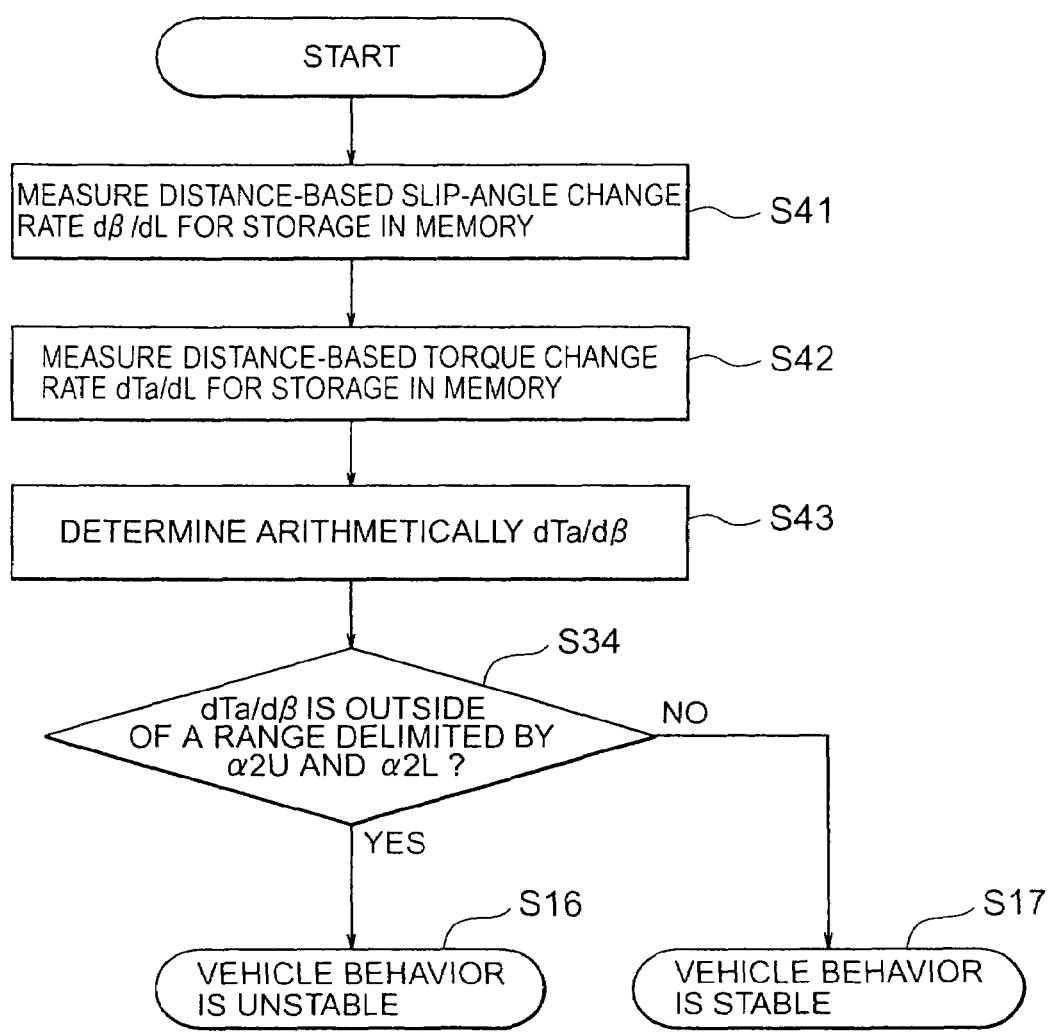
FIG. 9 is a flow chart for illustrating vehicle behavior decision operation performed by the motor vehicle state detecting system according to the fourth embodiment of the invention.

Next, referring to a flow chart of FIG. 9, description will be directed to the operation performed by the motor vehicle state detecting system according to the fourth embodiment of the invention shown in FIG. 8. In FIG. 9, the steps S34, S16 and S17 represent the processings similar to those described hereinbefore by reference to FIG. 7.

At first, the distance-based slip-angle change rate dβ/dL is measured to be stored in a memory in a step S41, which is then followed by a step S42 where the distance-based torque change rate dTa/dL is measured, which is also stored in the memory.

In succession, in a step S43, the distance-based torque change rate dTa/dL is divided by the distance-based slip-angle change rate dβ/dL to thereby determine the torque/slip-angle change rate dTa/dβ.

Subsequently, the motor vehicle behavior stability decision unit 5A compares the torque/slip-angle change rate dTa/dβ with the predetermined range (delimited by the upper limit value α2U and the lower limit value α2L, respectively) (step S34) to thereby make decision that the behavior of the motor vehicle is unstable when the torque/slip-angle change rate dTa/dβ is outside of the predetermined range (step S16) while deciding that the behavior of the motor vehicle is stable when the torque/slip-angle change rate dTa/dβ falls within the predetermined range mentioned above (step S17).

In the motor vehicle state detecting system according to the instant embodiment of the invention, advantageous actions and effects comparable to those mentioned previously can be obtained. Furthermore, even in the case where it is impossible to directly measure (or determine arithmetically) the torque/slip-angle change rate dTa/dβ, the latter can arithmetically be determined.

Embodiment 5

In the motor vehicle state detecting system according to the third embodiment of the invention, the time-based slip-angle change rate measuring unit 8 (see FIG. 6) is employed for making available the torque/slip-angle change rate dTa/dβ. In the motor vehicle state detecting system according to a fifth embodiment of the present invention, the time-based slip-angle change rate dβ/dt is arithmetically determined on the basis of outputs of various relevant sensors.

Figure 10:
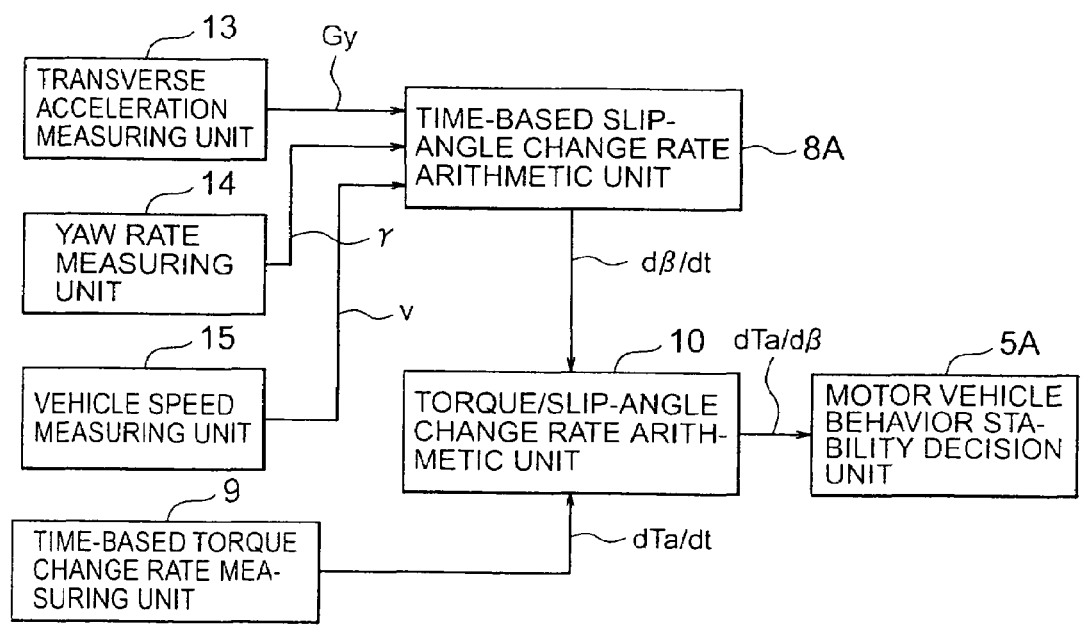
FIG. 10 is a block diagram showing schematically a major portion of the motor vehicle state detecting system according to a fifth embodiment of the present invention.

FIG. 10 is a block diagram showing schematically a major portion of the motor vehicle state detecting system according to the fifth embodiment of the present invention in which a time-based slip-angle change rate arithmetic unit 8A is employed. In the figure, components similar to those described previously in conjunction with FIG. 6 are denoted by like reference symbols.

The motor vehicle state detecting system according to the instant embodiment of the invention includes as the sensors a transverse acceleration measuring unit 13 for detecting actual acceleration Gy of the motor vehicle in the transverse direction thereof, a yaw rate measuring unit 14 for detecting acceleration of the motor vehicle in the yaw direction thereof (actual yaw rate) γ and a vehicle speed measuring unit 15 for detecting running speed of the motor vehicle in the traveling direction as an actual vehicle speed v.

In the case of the instant embodiment of the invention, the time-based slip-angle change rate arithmetic unit 8A is so designed as to arithmetically determine the time-based slip-angle change rate dβ/dt on the basis of the actual transverse acceleration Gy, the actual yaw rate (time-based differential value of the velocity or speed of the motor vehicle in the yaw direction) γ and the actual vehicle speed v (hereinafter also referred to simply as the vehicle speed).

Now, referring to FIG. 10, operation of the motor vehicle state detecting system according to the fifth embodiment of the invention will be described.

The transverse acceleration measuring unit 13 may be constituted by e.g. an accelerometer which is so disposed as to detect the acceleration of the motor vehicle in the transverse direction and so designed as to detect the transverse acceleration Gy to be stored in a memory.

Further, the yaw rate measuring unit 14 is so designed as to detect the actual yaw rate γ which is also stored in the memory. Similarly, the vehicle speed measuring unit 15 is designed to detect the actual vehicle speed v for storage in the memory.

The time-based slip-angle change rate arithmetic unit 8A is so designed as to arithmetically determine the time-based slip-angle change rate dβ/dt on the basis of the actual transverse acceleration Gy, the actual yaw rate γ and the actual vehicle speed v in accordance with the undermentioned expression (5):

$$v(d\beta/dt+\gamma)=Gy \text{ and hence } d\beta/dt=(Gy/v-\gamma) \quad (5)$$

Further, the time-based torque change rate measuring unit 9 is adapted to measure the time-based torque change rate dTa/dt.

In succession, the torque/slip-angle change rate arithmetic unit 10 divides the time-based torque change rate dTa/dt by the time-based slip-angle change rate dβ/dt to thereby arithmetically determine the torque/slip-angle change rate dTa/dβ in accordance with the expression (3) mentioned hereinbefore.

Subsequently, the motor vehicle behavior stability decision unit 5A compares the torque/slip-angle change rate dTa/dβ with the predetermined range delimited by the upper limit value α2U and the lower limit value α2L, respectively, to thereby decide whether or not the behavior of the motor vehicle is in the unstable state or in the stable state.

Figure 11:
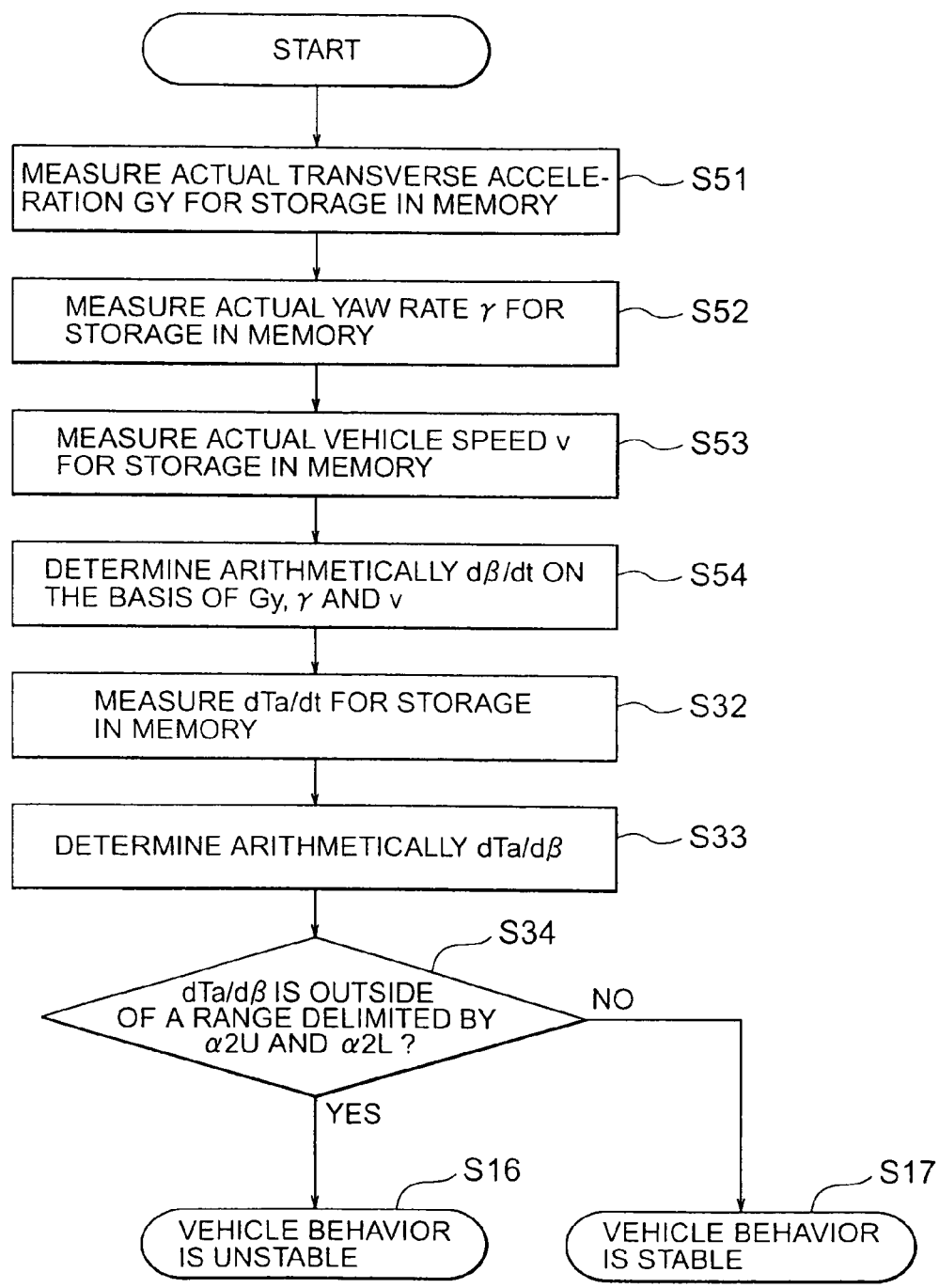
FIG. 11 is a flow chart for illustrating vehicle behavior decision operation performed by the motor vehicle state detecting system according to the fifth embodiment of the invention.

Next, referring to a flow chart shown in FIG. 11, description will be made of the operation performed by the motor vehicle state detecting system according to the fifth embodiment of the invention shown in FIG. 10. In FIG. 11, the steps S32, S33, S34, S16 and S17 represent the processings similar to those described herein before by reference to FIG. 7.

At first, the actual transverse acceleration Gy of the motor vehicle is measured to be stored in the memory in a step S51, which is then followed by a step S52 where the actual yaw rate γ is measured to be stored in the memory. The actual vehicle speed v is also measured for storage in the memory in a step S53.

In succession, the time-based slip-angle change rate dβ/dt is arithmetically determined in accordance with the above expression (5) on the basis of the actual transverse acceleration Gy, the actual yaw rate γ and the actual vehicle speed v, the result of which is stored in the memory (step S54). Further, the time-based torque change rate dTa/dt is measured for storage in the memory (step S32).

Next, in a step S33, the time-based torque change rate dTa/dt is divided by the time-based slip-angle change rate dβ/dt to thereby determine the torque/slip-angle change rate dTa/dβ.

Subsequently, the torque/slip-angle change rate dTa/dβ is compared with the predetermined range (step S34) to thereby make decision that the behavior of the motor vehicle is unstable when the torque/slip-angle change rate dTa/dβ deviates from the predetermined range (step S16) while deciding that the behavior of the motor vehicle is stable when the torque/slip-angle change rate dTa/dβ falls within the predetermined range mentioned above (step S17).

In this manner, even in the case where it is impossible to directly measure the time-based slip-angle change rate dβ/dt, this change rate dβ/dt can arithmetically be determined by measuring the transverse acceleration Gy, the yaw rate γ and the vehicle speed v. Thus, the torque/slip-angle change rate dTa/dβ can arithmetically be determined and essentially same actions and effects as those described hereinbefore can be obtained.

Embodiment 6

In the motor vehicle state detecting system according to the third embodiment of the invention, no consideration is paid to the processing procedure which is to be executed when the time-based slip-angle change rate dβ/dt is smaller than the lower limit permissible value. In the motor vehicle state detecting system according to a sixth embodiment of the present invention, such arrangement is adopted that the division arithmetic processing executed by the torque/slip-angle change rate arithmetic unit 10 (see FIG. 6) is inhibited when the time-based slip-angle change rate dβ/dt becomes smaller than the lower limit permissible value, to thereby prevent occurrence of the overflow.

Figure 12:
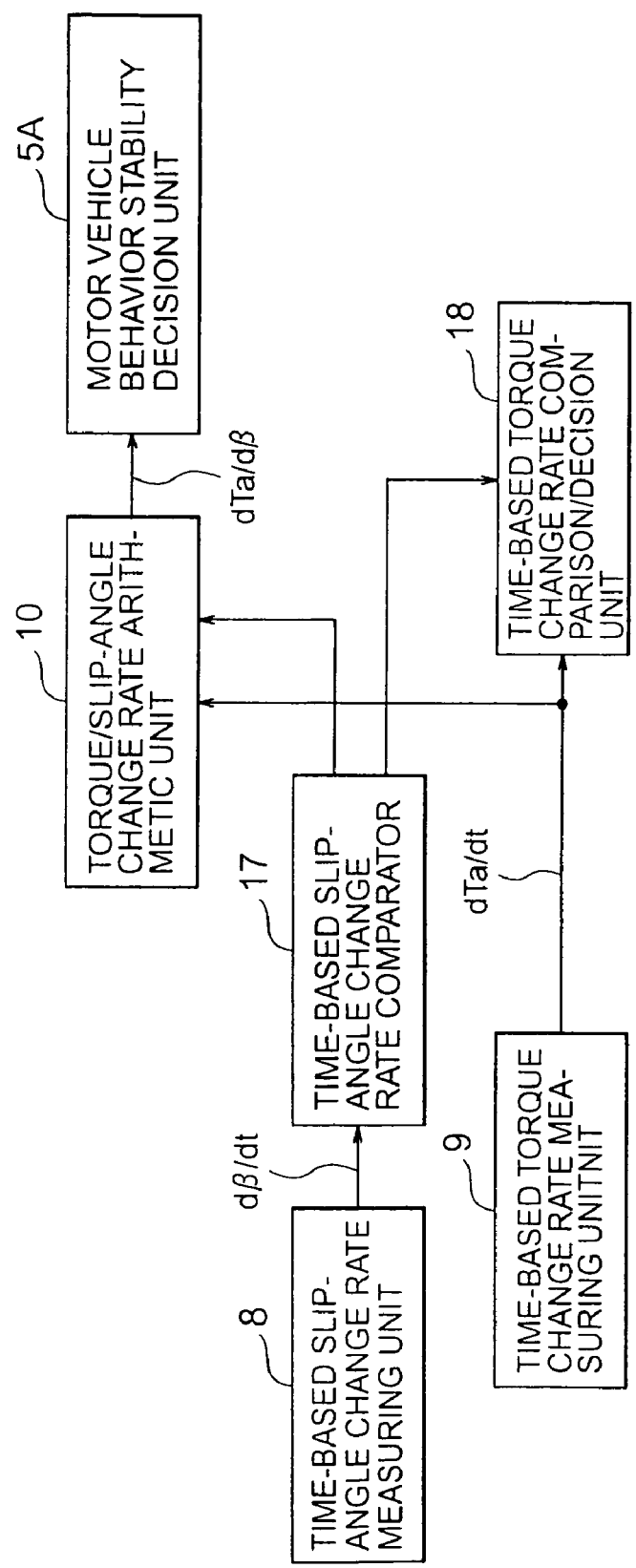
FIG. 12 is a block diagram showing schematically a major portion of the motor vehicle state detecting system according to a sixth embodiment of the present invention.

FIG. 12 is a block diagram showing generally a major portion of the motor vehicle state detecting system according to the sixth embodiment of the present invention in which the division arithmetic executed by the torque/slip-angle change rate arithmetic unit 10 is inhibited when the time-based slip-angle change rate dβ/dt is small.

In FIG. 12, components similar to those described previously in conjunction with FIG. 6 are denoted by like reference symbols.

Referring to the figure, a time-based slip-angle change rate comparator 17 is inserted between the time-based slip-angle change rate measuring unit 8 and the torque/slip-angle change rate arithmetic unit 10 with a time-based torque change rate comparison/decision unit 18 being connected to the output of the time-based slip-angle change rate comparator 17.

The time-based slip-angle change rate comparator 17 is so designed that it ordinarily supplies the time-based slip-angle change rate dβ/dt to the torque/slip-angle change rate arithmetic unit 10 to validate the arithmetic operation (division processing) of the torque/slip-angle change rate arithmetic unit 10.

On the other hand, when the time-based slip-angle change rate dβ/dt is smaller than the lower limit permissible value, the time-based slip-angle change rate comparator 17 inhibits the division processing executed by the torque/slip-angle change rate arithmetic unit 10 by invalidating or disabling the torque/slip-angle change rate arithmetic unit 10 while outputting the result of the above-mentioned comparison (i.e., dβ/dt<lower limit permissible value) to the time-based torque change rate comparison/decision unit 18 to thereby enable the operation of the time-based torque change rate comparison/decision unit 18.

The time-based slip-angle change rate comparator 17 is comprised of a lower limit value setting means for setting the lower limit permissible value for the time-based slip-angle change rate dβ/dt in dependence on the motor vehicle concerned, and a division arithmetic inhibiting means for disabling the division arithmetic executed by the torque/slip-angle change rate arithmetic unit 10 when the value of the time-based slip-angle change rate dβ/dt becomes smaller than the lower limit permissible value.

On the other hand, the time-based torque change rate comparison/decision unit 18 is comprised of a predetermined change rate setting means for setting a predetermined change rate for the time-based torque change rate dTa/dt in dependence on the motor vehicle concerned and a comparison means for comparing the time-based torque change rate dTa/dt with a predetermined change rate. Incidentally, the function of the time-based torque change rate comparison/decision unit 18 may be incarnated as a function of the motor vehicle behavior stability decision unit 5A.

In operation, when it is decided by the time-based slip-angle change rate comparator 17 that the value of the time-based slip-angle change rate $d\beta/dt$ becomes smaller than the lower limit permissible value, operation of the time-based torque change rate comparison/decision unit 18 is validated in place of the torque/slip-angle change rate arithmetic unit 10 and the motor vehicle behavior stability decision unit 5A. In that case, the time-based torque change rate comparison/decision unit 18 makes decision that the behavior of the motor vehicle is unstable so long as the time-based torque change rate dTa/dt reaches or exceeds the predetermined change rate value.

In general, when the absolute value of the time-based slip-angle change rate $d\beta/dt$ of the motor vehicle is smaller than the lower limit permissible value and when the absolute value of the time-based torque change rate dTa/dt is smaller than the predetermined change rate value, then it can be determined that the motor vehicle is scarcely moving in the lateral or transverse direction and thus the motor vehicle is in the stable state.

By contrast, if the absolute value of the time-based torque change rate dTa/dt exceeds the predetermined change rate value, the behavior of the motor vehicle is then identified as being in the unstable state, even if the absolute value of the time-based slip-angle change rate $d\beta/dt$ is smaller than the lower limit permissible value inclusive.

Furthermore, even if the time-based slip-angle change rate $d\beta/dt$ is greater than the lower limit permissible value inclusive, the behavior of the motor vehicle is regarded as being in the stable state so far as the torque/slip-angle change rate $dTa/d\beta$ falls within the predetermined range. However, if the torque/slip-angle change rate $dTa/d\beta$ lies outside of the predetermined range, it is then determined that the motor vehicle is in the unstable state.

Next, description will turn to operation of the motor vehicle state detecting system according to the sixth embodiment of the invention shown in FIG. 12.

At first, the time-based slip-angle change rate measuring unit 8 measures the time-based slip-angle change rate $d\beta/dt$ while the time-based torque change rate measuring unit 9 measures the time-based torque change rate dTa/dt.

The time-based slip-angle change rate comparator 17 compares the time-based slip-angle change rate $d\beta/dt$ with the lower limit permissible value to supply the time-based slip-angle change rate $d\beta/dt$ to the torque/slip-angle change rate arithmetic unit 10 when the value of the time-based slip-angle change rate $d\beta/dt$ is greater than the lower limit permissible value inclusive. In response thereto, the torque/slip-angle change rate arithmetic unit 10 performs the ordinary division arithmetic in accordance with the expression (3) mentioned hereinbefore.

Subsequently, the motor vehicle behavior stability decision unit 5A compares the torque/slip-angle change rate $dTa/d\beta$ with the predetermined range mentioned above to decide that the behavior of the motor vehicle is in the unstable state when the torque/slip-angle change rate $dTa/d\beta$ lies outside of the predetermined range (see expression (2)).

On the other hand, when the value of the time-based slip-angle change rate $d\beta/dt$ is smaller than the lower limit permissible value, the time-based slip-angle change rate comparator 17 inhibits the time-based slip-angle change rate $d\beta/dt$ from being supplied to the torque/slip-angle change rate arithmetic unit 10 (and hence the division arithmetic represented by the expression (3)). Further, the result of the comparison is supplied to the time-based torque change rate comparison/decision unit 18.

In this manner, the time-based torque change rate comparison/decision unit 18 is put into operation in place of the motor vehicle behavior stability decision unit 5A, wherein the state of the motor vehicle is detected on the basis of the result of the comparison performed by the time-based torque change rate comparison/decision unit 18.

More specifically, the time-based torque change rate comparison/decision unit 18 compares the time-based torque change rate dTa/dt with a predetermined change rate to decide that the behavior of the motor vehicle is unstable when the time-based torque change rate dTa/dt is greater than the above-mentioned predetermined change rate inclusive.

Figure 13:
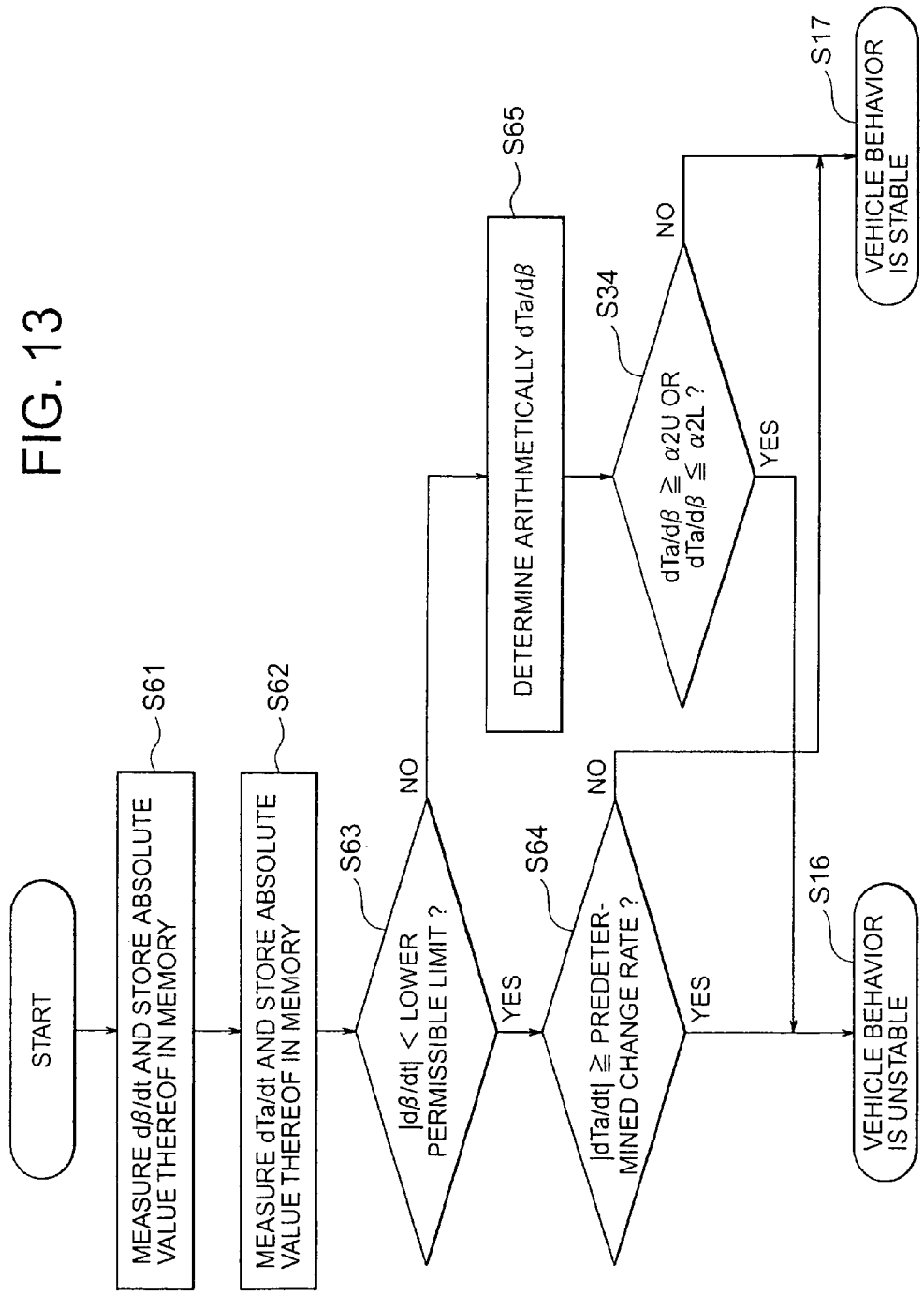
FIG. 13 is a flow chart for illustrating vehicle behavior decision operation performed by the motor vehicle state detecting system according to the sixth embodiment of the invention.

Next, referring to a flow chart shown in FIG. 13, description will be made of the operation performed by the motor vehicle state detecting system according to the sixth embodiment of the invention shown in FIG. 12. In FIG. 13, the steps S34, S16 and S17 represent the processings similar to those described hereinbefore.

At first, the time-based slip-angle change rate $d\beta/dt$ is measured and the absolute value thereof is stored in the memory (step S61). Further, the time-based torque change rate dTa/dt is measured and the absolute value thereof is stored in the memory (step S62).

Subsequently, decision is made whether or not the absolute value of the time-based slip-angle change rate $d\beta/dt$ is smaller than the lower limit permissible value in a step S63. When it is determined that $|d\beta/dt|$<lower limit permissible value (i.e., when the step S63 is "YES"), then the time-based torque change rate comparison/decision unit 18 is validated or put into operation, whereon decision is made whether or not the absolute value of the time-based torque change rate dTa/dt is greater than the above-mentioned predetermined change rate inclusive thereof in a step S64.

When the decision step S64 results in that $|dTa/dt|\geq$predetermined change rate, i.e., "YES", it is then determined that the behavior of the motor vehicle is in the unstable state (step S16), while it is decided that the motor vehicle is in the stable state (step S17) when $|dTa/dt|$<predetermined change rate, i.e., when the step S64 is "NO", whereon the processing routine shown in FIG. 13 is terminated.

On the other hand, when the decision steps S63 results in that $|d\beta/dt|\geq$lower limit permissible value, i.e., "NO", then the torque/slip-angle change rate arithmetic unit 10 is put into operation to arithmetically determine the torque/slip-angle change rate $dTa/d\beta$ (step S65). In succession, it is checked by the motor vehicle behavior stability decision unit 5A in a step S34 whether or not the torque/slip-angle change rate $dTa/d\beta$ lies outside of the predetermined range.

Finally, in dependence on whether or not the torque/slip-angle change rate $dTa/d\beta$ lies outside of the predetermined range, the unstable state or the stable state of the behavior of the motor vehicle is decided (step S16 or S17).

As is apparent from the above, according to the teaching of the invention incarnated in the instant embodiment, the division arithmetic performed by the torque/slip-angle change rate arithmetic unit 10 is inhibited or disabled when the value of the time-based slip-angle change rate $d\beta/dt$ is smaller than the lower limit permissible value, and the state of the motor vehicle is determined on the basis of only the time-based torque change rate dTa/dt.

By virtue of this feature, occurrence of overflow due to the division arithmetic executed by the torque/slip-angle change rate arithmetic unit 10 can be suppressed while ensuring detection of the unstable state of the motor vehicle or the prognostic state thereof, even when the time-based slip-angle change rate dβ/dt is small.

Embodiment 7

In the case of the motor vehicle state detecting system according to the fourth embodiment of the invention, no consideration has been paid to the processing procedure which can be executed when the distance-based slip-angle change rate dβ/dL is smaller than the lower limit permissible value. In the motor vehicle state detecting system according to a seventh embodiment of the present invention, arrangement is made such that the division arithmetic processing executed by the torque/slip-angle change rate arithmetic unit 10A (see FIG. 8) is inhibited when the distance-based slip-angle change rate dβ/dL becomes smaller than the lower limit permissible value, to thereby prevent occurrence of overflow.

Figure 14:
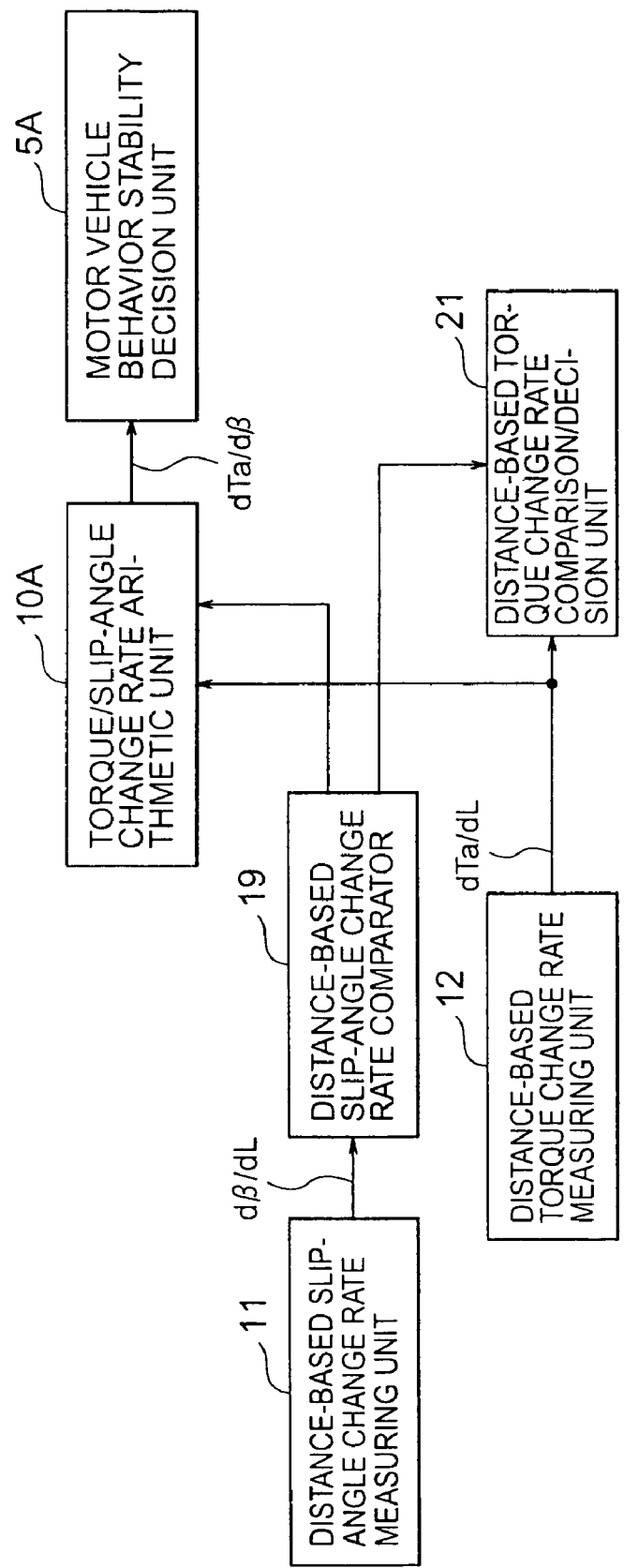
FIG. 14 is a block diagram showing schematically a major portion of the motor vehicle state detecting system according to a seventh embodiment of the present invention.

FIG. 14 is a block diagram showing generally a major portion of the motor vehicle state detecting system according to the seventh embodiment of the invention in which the division arithmetic executed by the torque/slip-angle change rate arithmetic unit 10A is inhibited when the distance-based slip-angle change rate dβ/dL is small.

In FIG. 14, components similar to those described previously in conjunction with FIG. 8 are denoted by like reference symbols.

Referring to the figure, a distance-based slip-angle change rate comparator 19 is inserted between the distance-based slip-angle change rate measuring unit 11 and the torque/slip-angle change rate arithmetic unit 10A, wherein a distance-based torque change rate comparison/decision unit 21 is connected to the output of the distance-based slip-angle change rate comparator 19.

The distance-based slip-angle change rate comparator 19 is so designed that it ordinarily supplies the distance-based slip-angle change rate dβ/dL to the torque/slip-angle change rate arithmetic unit 10A to validate the arithmetic operation (division processing) of the torque/slip-angle change rate arithmetic unit 10A.

On the other hand, when the distance-based slip-angle change rate dβ/dL is smaller than a lower limit permissible value, the distance-based slip-angle change rate comparator 19 inhibits the division processing executed by the torque/slip-angle change rate arithmetic unit 10A by disabling the torque/slip-angle change rate arithmetic unit 10A while outputting the result of the above-mentioned comparison (i.e., dβ/dL<lower limit permissible value) to the distance-based torque change rate comparison/decision unit 21 to thereby enable the operation of the distance-based torque change rate comparison/decision unit 21.

The distance-based slip-angle change rate comparator 19 is comprised of a lower limit value setting means for setting the lower limit permissible value for the distance-based slip-angle change rate dβ/dL in dependence on the motor vehicle concerned and a division arithmetic inhibiting means for inhibiting the division arithmetic operation executed by the torque/slip-angle change rate arithmetic unit 10A when the value of the distance-based slip-angle change rate dβ/dL becomes smaller than the lower limit permissible value.

On the other hand, the distance-based torque change rate comparison/decision unit 21 is comprised of a predetermined change rate setting means for setting a predetermined change rate for the distance-based torque change rate dTa/dL in dependence on the motor vehicle concerned and a comparison means for comparing the distance-based torque change rate dTa/dL with a predetermined change rate. Incidentally, the distance-based torque change rate comparison/decision unit 21 may be realized as a part of the motor vehicle behavior stability decision unit 5A.

In operation, when it is decided by the distance-based slip-angle change rate comparator 19 that the value of the distance-based slip-angle change rate dβ/dL becomes smaller than the lower limit permissible value, operation of the distance-based torque change rate comparison/decision unit 21 is validated in place of the torque/slip-angle change rate arithmetic unit 10A and the motor vehicle behavior stability decision unit 5A. In that case, the distance-based torque change rate comparison/decision unit 21 makes decision that the behavior of the motor vehicle is unstable when the distance-based torque change rate dTa/dL becomes greater than the predetermined change rate value inclusive.

In general, when the absolute value of the distance-based slip-angle change rate dβ/dL of the motor vehicle is smaller than the lower limit permissible value and when that of the distance-based torque change rate dTa/dL is smaller than the predetermined change rate value, then it can be determined that the motor vehicle is scarcely moving in the lateral or transverse direction and thus the motor vehicle is in the stable state.

On the other hand, if the absolute value of the distance-based torque change rate dTa/dL reaches or exceeds the predetermined change rate value, it is then determined that the behavior of the motor vehicle is in the unstable state, even if the absolute value of the distance-based slip-angle change rate dβ/dL is smaller than the lower limit permissible value inclusive.

Furthermore, even if the distance-based slip-angle change rate dβ/dL is greater than the lower limit permissible value inclusive, the motor vehicle can be regarded as being in the stable state so far as the torque/slip-angle change rate dTa/dβ lies within the predetermined range. However, if the torque/slip-angle change rate dTa/dβ lies outside of the predetermined range, it is then determined that the motor vehicle is in the unstable state.

Referring to FIG. 14, the distance-based slip-angle change rate measuring unit 11 is designed to measure the distance-based slip-angle change rate dβ/dL while the distance-based torque change rate measuring unit 12 is designed to measure the distance-based torque change rate dTa/dL.

The distance-based slip-angle change rate comparator 19 outputs the result of the comparison to the torque/slip-angle change rate arithmetic unit 10A when the distance-based slip-angle change rate dβ/dL is greater than the lower limit permissible value inclusive while outputting that result to the distance-based torque change rate comparison/decision unit 21 when the distance-based slip-angle change rate dβ/dL is smaller than the lower limit permissible value.

On the other hand, the torque/slip-angle change rate arithmetic unit 10A is so designed as to divide the distance-based torque change rate dTa/dL by the distance-based slip-angle change rate dβ/dL to thereby arithmetically determine the torque/slip-angle change rate dTa/dβ in accordance with the expression (4) mentioned previously.

The distance-based torque change rate comparison/decision unit 21 decides that the behavior of the motor vehicle is unstable when the distance-based torque change rate dTa/dL is greater than the above-mentioned predetermined change rate inclusive.

Figure 15:
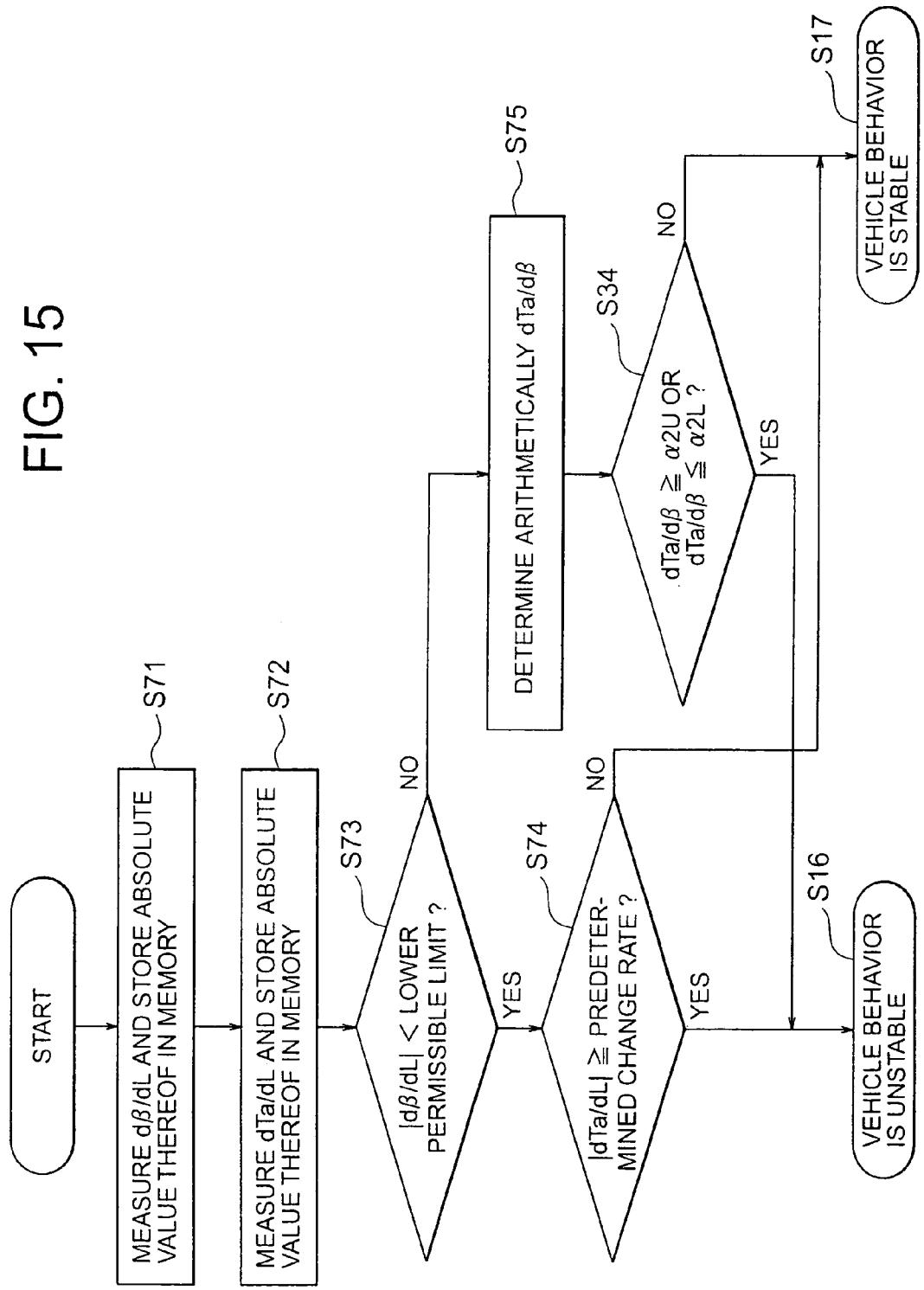
FIG. 15 is a flow chart for illustrating vehicle behavior decision operation performed by the motor vehicle state detecting system according to the seventh embodiment of the invention.

Next, referring to a flow chart shown in FIG. 15, description will be made of the operation performed by the motor vehicle state detecting system according to the seventh embodiment of the invention shown in FIG. 14. In FIG. 15, the steps S34, S16 and S17 represent the processings similar to those described hereinbefore.

At first, the distance-based slip-angle change rate $d\beta/dL$ is measured and the absolute value thereof is stored in the memory (step S71). Further, the distance-based torque change rate $dTa/dL$ is measured and the absolute value thereof is stored in the memory (step S72).

Subsequently, decision is made whether or not the absolute value of the distance-based slip-angle change rate $d\beta/dL$ is smaller than the lower limit permissible value in a step S73. When it is determined that $|d\beta/dL|<$lower limit permissible value (i.e., when the step S73 results in "YES"), then the distance-based torque change rate comparison/decision unit 21 is validated or put into operation, for making decision whether or not the absolute value of the distance-based torque change rate $dTa/dL$ is greater than the predetermined change rate inclusive (step S74).

When the decision step S74 results in that $|dTa/dL|\geq$predetermined change rate, i.e., "YES", it is then determined that the behavior of the motor vehicle is in the unstable state (step S16), while it is decided that the motor vehicle is in the stable state (step S17) when $|dTa/dL|<$predetermined change rate, i.e., when the step S74 is "NO", where on the processing routine shown in FIG. 15 is terminated.

On the other hand, when the decision steps S73 results in that $|d\beta/dL|\geq$lower limit permissible value, i.e., "NO", then the torque/slip-angle change rate arithmetic unit 10A is put into operation to arithmetically determine the torque/slip-angle change rate $dTa/d\beta$ (step S75). In succession, it is checked by the motor vehicle behavior stability decision unit 5A whether or not the torque/slip-angle change rate $dTa/d\beta$ lies outside of the predetermined range (step S34).

Finally, in dependence on whether or not the torque/slip-angle change rate $dTa/d\beta$ lies outside of the predetermined range, the unstable state or the stable state of the behavior of the motor vehicle is decided (step S16 or S17).

As is apparent from the above, according to the teaching of the invention incarnated in the seventh embodiment, the division arithmetic performed by the torque/slip-angle change rate arithmetic unit 10A is inhibited or disabled when the value of the distance-based slip-angle change rate $d\beta/dL$ is smaller than the lower limit permissible value, and the state of the motor vehicle is determined on the basis of only the distance-based torque change rate $dTa/dL$.

By virtue of this feature, occurrence of overflow due to the division arithmetic executed by the torque/slip-angle change rate arithmetic unit 10A can be suppressed while ensuring detection of the unstable state of the motor vehicle or the prognostic state thereof, even in the case where the distance-based slip-angle change rate $d\beta/dL$ is small.

Embodiment 8

In the case of the motor vehicle state detecting system according to the fifth embodiment of the invention, no consideration has been paid to the processing which is executed when the time-based slip-angle change rate $d\beta/dt$ is smaller than the lower limit permissible value. In the motor vehicle state detecting system according to an eighth embodiment of the present invention, arrangement is made such that the division arithmetic processing executed by the torque/slip-angle change rate arithmetic unit 10 (see FIG. 10) is inhibited when the time-based slip-angle change rate $d\beta/dt$ becomes smaller than the lower limit permissible value, to thereby prevent occurrence of overflow, similarly to the motor vehicle state detecting system according to the sixth embodiment described previously.

Figure 16:
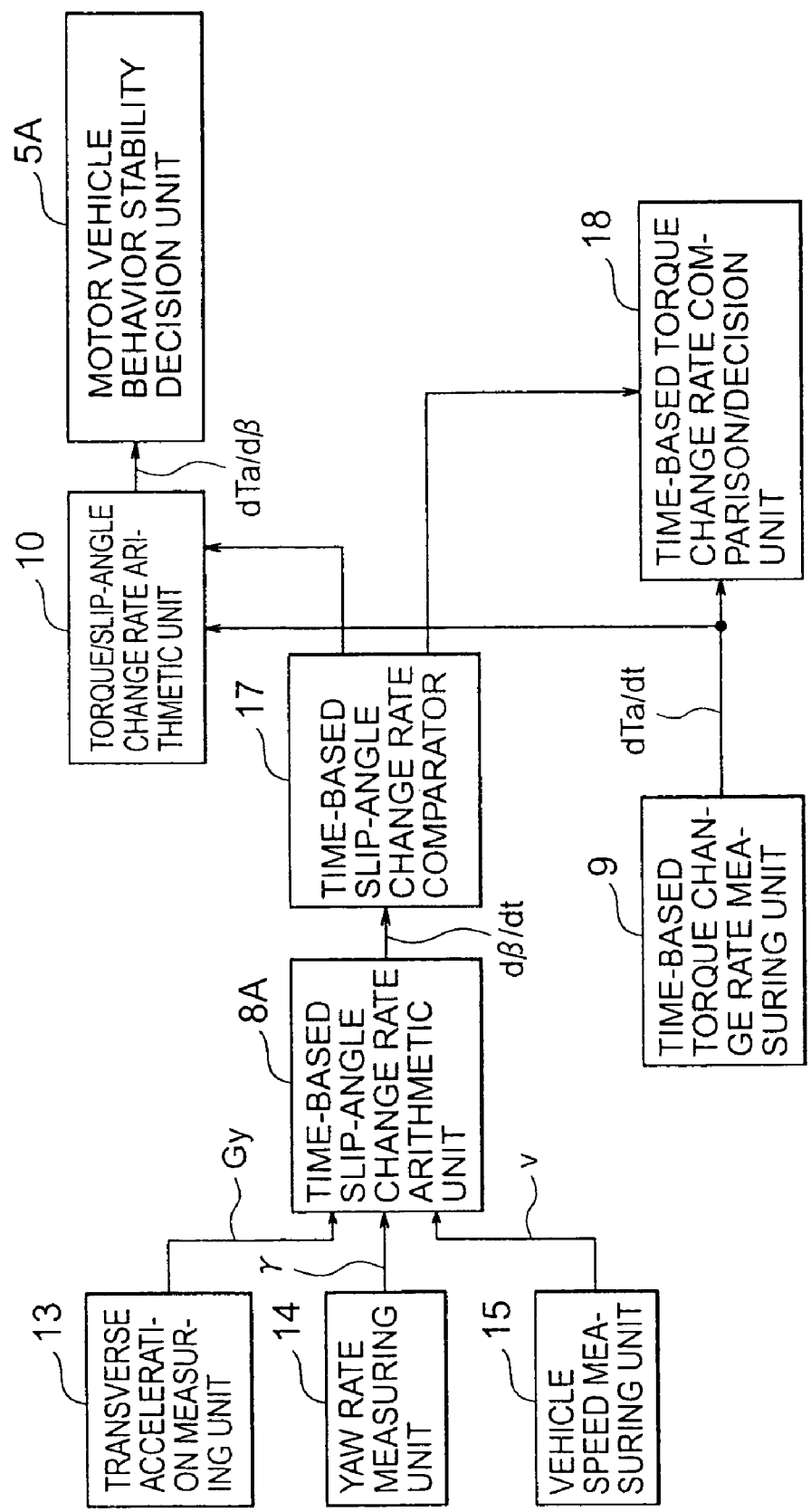
FIG. 16 is a block diagram showing schematically a major portion of the motor vehicle state detecting system according to an eighth embodiment of the present invention.

FIG. 16 is a block diagram showing generally a major portion of the motor vehicle state detecting system according to the eighth embodiment of the present invention in which the division arithmetic executed by the torque/slip-angle change rate arithmetic unit 10 is inhibited when the time-based slip-angle change rate $d\beta/dt$ is small.

In FIG. 16, components similar to those described previously in conjunction with FIGS. 10 and 12 are denoted by like reference symbols.

Referring to the figure, the time-based slip-angle change rate comparator 17 is inserted between the time-based slip-angle change rate arithmetic unit 8A and the torque/slip-angle change rate arithmetic unit 10, wherein the time-based torque change rate comparison/decision unit 18 is connected to the output of the time-based slip-angle change rate comparator 17.

The time-based slip-angle change rate comparator 17 is so designed that it ordinarily supplies the time-based slip-angle change rate $d\beta/dt$ to the torque/slip-angle change rate arithmetic unit 10 to validate the arithmetic operation (division processing) of the torque/slip-angle change rate arithmetic unit 10.

On the other hand, when the time-based slip-angle change rate $d\beta/dt$ is smaller than the lower limit permissible value, the time-based slip-angle change rate comparator 17 inhibits the division processing executed by the torque/slip-angle change rate arithmetic unit 10 by invalidating or disabling the torque/slip-angle change rate arithmetic unit 10 while outputting the result of the comparison (i.e., $d\beta/dt<$lower limit permissible value) to the time-based torque change rate comparison/decision unit 18 to thereby enable the operation of the time-based torque change rate comparison/decision unit 18.

The time-based slip-angle change rate comparator 17 is comprised of a lower limit value setting means for setting the lower limit permissible value for the time-based slip-angle change rate $d\beta/dt$ in dependence on the motor vehicle concerned, and a division arithmetic inhibiting means for disabling the division arithmetic executed by the torque/slip-angle change rate arithmetic unit 10 when the value of the time-based slip-angle change rate $d\beta/dt$ becomes smaller than the lower limit permissible value.

On the other hand, the time-based torque change rate comparison/decision unit 18 is comprised of a predetermined change rate setting means for setting a predetermined change rate for the time-based torque change rate $dTa/dt$ in dependence on the motor vehicle concerned and a comparison means for comparing the time-based torque change rate $dTa/dt$ with a predetermined change rate. Incidentally, the function of the time-based torque change rate comparison/decision unit 18 may be incarnated as a function of the motor vehicle behavior stability decision unit 5A as is the case with the embodiments described previously.

In operation, when it is decided by the time-based slip-angle change rate comparator 17 that the value of the time-based slip-angle change rate $d\beta/dt$ becomes smaller than the lower limit permissible value, operation of the time-based torque change rate comparison/decision unit 18 is validated in place of the torque/slip-angle change rate arithmetic unit 10 and the motor vehicle behavior stability decision unit 5A. In that case, the time-based torque change rate comparison/decision unit 18 makes decision that the behavior of the motor vehicle is unstable so long as the time-based torque change rate $dTa/dt$ reaches or exceeds the predetermined change rate value.

In general, when the absolute value of the time-based slip-angle change rate $d\beta/dt$ of the motor vehicle which is arithmetically determined on the basis of the transverse acceleration Gy, the yaw rate $\gamma$ and the vehicle speed v is smaller than the lower limit permissible value and when the absolute value of the time-based torque change rate dTa/dt is smaller than the predetermined change rate value, it can be determined that the behavior of the motor vehicle is in the stable state.

By contrast, if the absolute value of the time-based torque change rate dTa/dt is equal to or exceeds the predetermined change rate value, the behavior of the motor vehicle can then be identified as being in the unstable state, even if the absolute value of the time-based slip-angle change rate $d\beta/dt$ is smaller than the lower limit permissible value inclusive.

Furthermore, even if the time-based slip-angle change rate $d\beta/dt$ is equal to or greater than the lower limit permissible value inclusive, the behavior of the motor vehicle can be regarded as being in the stable state so far as the torque/slip-angle change rate $dTa/d\beta$ remains within the predetermined range. However, if the torque/slip-angle change rate $dTa/d\beta$ lies outside of the predetermined range, it is then detected that the behavior of the motor vehicle is in the unstable state.

More specifically, in conjunction with the torque (or acceleration)/angle (actual side slip angle $\beta$) characteristic, it is safe to say that although the torque and the angle bear the proportional relation to each other in the region where the angle is comparatively small, the torque becomes small as the angle increases. By taking advantage of this feature (torque/slip angle), it is possible to arithmetically determine the normal value on the basis of the straight-line slope and the angle in the region where the value of the angle is small to thereby identify the unstable state of the behavior of the motor vehicle when the deviation of the actual measured value from the normal value increases (i.e., when the slope of the torque for the angle differs remarkably from the slope of the approximate straight line.

Referring to FIG. 16, the transverse acceleration measuring unit 13 is so designed as to detect the transverse acceleration Gy of the motor vehicle to be stored in a memory. Further, the yaw rate measuring unit 14 is so designed as to detect the acceleration $\gamma$ in the yaw direction which is also stored in the memory. Similarly, the vehicle speed measuring unit 15 is designed to detect the actual vehicle speed v for storage in the memory.

The time-based slip-angle change rate arithmetic unit 8A is so designed as to arithmetically determine the time-based slip-angle change rate $d\beta/dt$ on the basis of the transverse acceleration Gy, the yaw rate $\gamma$ and the vehicle speed v in accordance with the expression (5) mentioned hereinbefore.

Further, the time-based torque change rate measuring unit 9 is designed to measure the time-based torque change rate dTa/dt.

The time-based slip-angle change rate comparator 17 compares the time-based slip-angle change rate $d\beta/dt$ with the lower limit permissible value to output the result of the comparison to the time-based torque change rate comparison/decision unit 18 when the value of the time-based slip-angle change rate $d\beta/dt$ is smaller than the lower limit permissible value or alternatively to the torque/slip-angle change rate arithmetic unit 10 when the value of the time-based slip-angle change rate $d\beta/dt$ is greater than the lower limit permissible value inclusive.

The torque/slip-angle change rate arithmetic unit 10 is so designed as to divide the time-based torque change rate dTa/dt by the time-based slip-angle change rate $d\beta/dt$ to thereby arithmetically determine the torque/slip-angle change rate $dTa/d\beta$ in accordance with the expression (3) mentioned hereinbefore.

On the other hand, the time-based torque change rate comparison/decision unit 18 compares the time-based torque change rate dTa/dt with the predetermined change rate to thereby decide that the behavior of the motor vehicle is unstable when the torque/slip-angle change rate $dTa/d\beta$ is greater than the predetermined change rate inclusive.

The motor vehicle behavior stability decision unit 5A compares the torque/slip-angle change rate $dTa/d\beta$ with the predetermined range, to thereby decide that the behavior of the motor vehicle is in the unstable state when the torque/slip-angle change rate $dTa/d\beta$ lies outside of the predetermined range (refer to the expression (2)).

Figure 17:
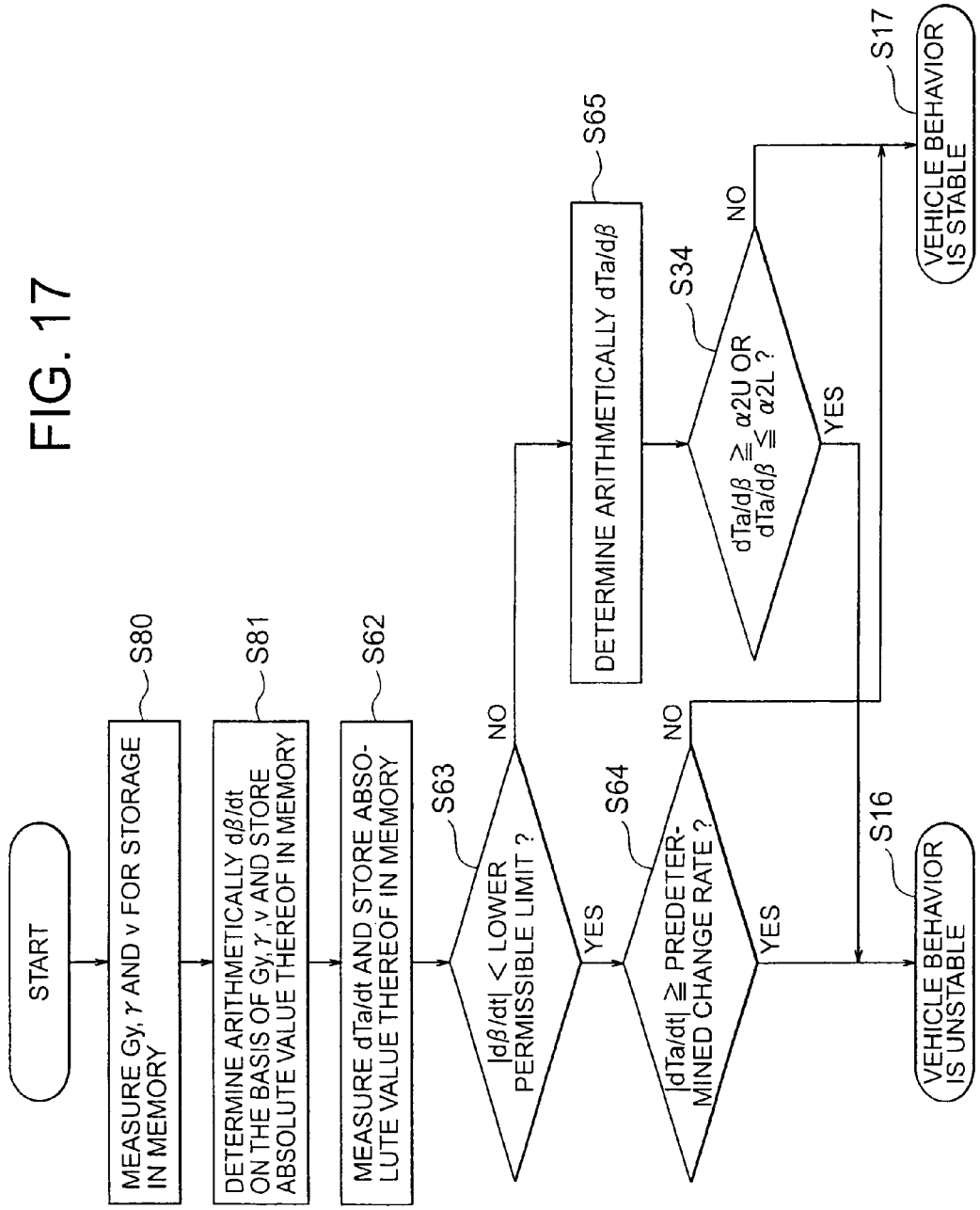
FIG. 17 is a flow chart for illustrating vehicle behavior decision operation performed by the motor vehicle state detecting system according to the eighth embodiment of the invention.

Next, referring to a flow chart shown in FIG. 17, description will be made of the operation performed by the motor vehicle state detecting system according to the eighth embodiment of the invention shown in FIG. 16. In FIG. 17, the steps S62, S63, S64, S34, S16 and S17 represent the processings similar to those described hereinbefore by reference to FIG. 13.

At first, the transverse acceleration Gy, the yaw rate $\gamma$ and the vehicle speed v are measured to be respectively stored in the memory in a step S80, which is then followed by a step S81 where the time-based slip-angle change rate $d\beta/dt$ is arithmetically determined on the basis of the transverse acceleration Gy, the yaw rate $\gamma$ and the vehicle speed v.

Further, the time-based torque change rate dTa/dt is also measured to be stored in the memory in a step S62.

Subsequently, decision is made whether or not the absolute value of the time-based slip-angle change rate $d\beta/dt$ is smaller than the lower limit permissible value in a step S63. When the step S63 results in $|d\beta/dt|<$lower limit permissible value (i.e., "YES"), the processing proceeds to a step S64. By contrast, when it is determined that $|d\beta/dt|\geq$lower limit permissible value (i.e., when the step S63 results in "NO"), the processing proceeds to a step S65.

When the decision step S64 results in that $|dTa/dt|\geq$predetermined change rate, i.e., "YES", it is then determined by the time-based torque change rate comparison/decision unit 18 that the behavior of the motor vehicle is in the unstable state (step S16), while it is determined that the behavior of the motor vehicle is in the stable state (step S17) when the step S64 results in that $|dTa/dt|<$predetermined change rate, i.e., "NO".

On the other hand, the torque/slip-angle change rate arithmetic unit 10 arithmetically determines the torque/slip-angle change rate $dTa/d\beta$ $(=(dTa/dt)/(d\beta/dt))$ in the step S65. Subsequently, the motor vehicle behavior stability decision unit 5A compares the torque/slip-angle change rate $dTa/d\beta$ with the predetermined range (step S34) to determine that the behavior of the motor vehicle is unstable (step S16) when the torque/slip-angle change rate $dTa/d\beta$ is outside of the predetermined range (i.e., when the step S34 results in "YES") while determining that the behavior of the motor vehicle is stable (step S17) when the torque/slip-angle change rate $dTa/d\beta$ lies within the predetermined range mentioned above (i.e., when the step S34 results in "NO").

As can be seen from the above, even in the situation where the grip force of tire is small, it is possible to detect the unstable state of the behavior of the motor vehicle with high effectiveness on the basis of only the time-based torque change rate dTa/dt conforming to the actual alignment torque Ta when the time-based slip-angle change rate $d\beta/dt$ is small.

As described previously by reference to FIG. 3, the alignment torque to which the motor vehicle running on the slippery road surface is subjected to decreases at a relatively small side slip angle. However, in the region where the side slip angle becomes further small, the linearity of the actual alignment torque Ta which conforms to the slope of the normal alignment torque To is sustained. Thus, the stability of the behavior of the motor vehicle can be decided on the basis of the torque/slip-angle change rate dTa/tβ by using the predetermined range (reference for comparison) similarly to the case where the motor vehicle is running on a dry-asphalt (not slippery) road surface.

Furthermore, even in the case where it is impossible to measure the time-based slip-angle change rate dβ/dt, this change rate dβ/dt can arithmetically be determined by measuring the transverse acceleration Gy, the yaw rate γ and the vehicle speed v. Thus, essentially same actions and effects as those described hereinbefore can be obtained.

By virtue of this feature, occurrence of overflow due to the division arithmetic executed by the torque/slip-angle change rate arithmetic unit 10 can be suppressed while detection of the unstable state of the motor vehicle can be ensured even if the time-based slip-angle change rate dβ/dt is small.

Embodiment 9

In the motor vehicle state detecting systems described above in conjunction with the first to eighth embodiments of the invention, the actual side slip angle β is used as the actual measured value of the first parameter. In the motor vehicle state detecting system according to a ninth embodiment of the present invention, an actual steering angle θ of the steering wheel manipulated by the driver is used.

Figure 18:
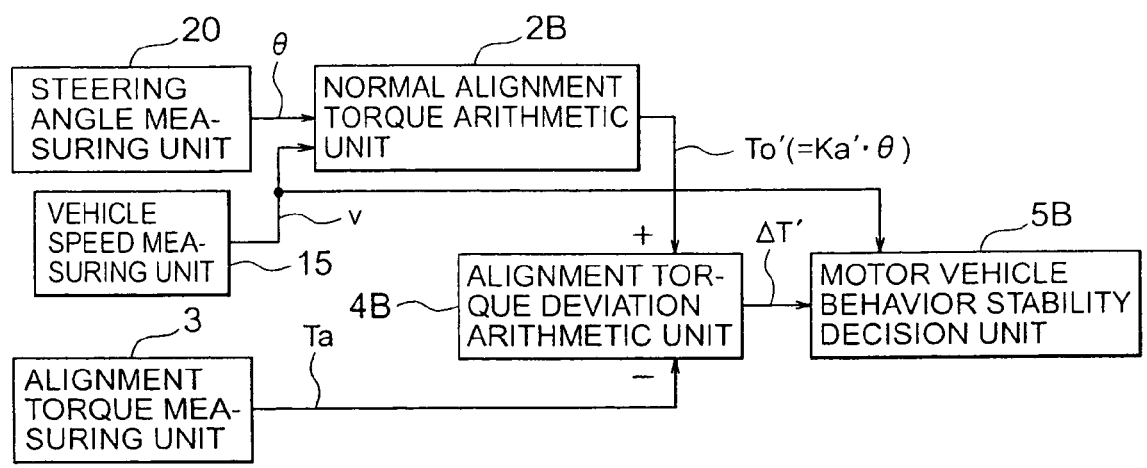
FIG. 18 is a block diagram showing schematically a major portion of the motor vehicle state detecting system according to a ninth embodiment of the present invention.

FIG. 18 is a schematic block diagram showing generally a major portion of the motor vehicle state detecting system according to the ninth embodiment of the invention in which the actual steering angle θ is used in place of the actual side slip angle β. In the figure, the contents same as or equivalent to those described hereinbefore by reference to FIG. 1 are denoted by like reference symbols affixed with "B" or "'" in succession to the symbols as the case may be.

In the motor vehicle state detecting system according to the instant embodiment of the invention, a steering angle measuring unit 20 is provided for detecting the steering angle θ instead of the side slip angle measuring unit 1. Additionally, a vehicle speed measuring unit 15 is provided in association with the normal alignment torque arithmetic unit 2B and the motor vehicle behavior stability decision unit 5B.

In general, the actual alignment torque applied to the motor vehicle bears an approximately proportional relation to the actual steering angle θ so long as the motor vehicle is in the stable running state. However, when the running state of the motor vehicle approaches to the stability limit, magnitude of the actual alignment torque decreases for the reason described hereinbefore, rendering it impossible to sustain the above-mentioned proportional relation to the actual steering angle θ. Accordingly, by taking advantage of this feature, it is possible to detect the state of the motor vehicle on the basis of the steering angle θ.

Referring to FIG. 18, the steering angle measuring unit 20 is designed to measure the steering manipulation from a neutral point of the steering wheel of the motor vehicle as the steering angle θ. The steering angle measuring unit 20 can be implemented by an optical sensor or the like mounted on the steering column.

Further, the alignment torque measuring unit 3 is designed to measure the actual alignment torque Ta, while the vehicle speed measuring unit 15 is designed to detect the vehicle speed v. The detected values outputted from these units are also stored in the memory. On the other hand, the normal alignment torque arithmetic unit 2B includes a torque/steering-angle setting means (not shown) for setting the torque/steering-angle ratio (=gain Ka') and is designed to arithmetically determine a normal alignment torque To' (=Ka'·θ) set in dependence on the steering angle θ and the vehicle speed v on the basis of the gain Ka' for the steering angle θ.

Further, provided is an alignment torque deviation arithmetic unit 4B which is so designed or programmed as to arithmetically determine an absolute value of deviation of the actual alignment torque Ta from the normal alignment torque To' (=Ka'·θ) (i.e., error or difference between the normal alignment torque To' and the actual alignment torque Ta). More specifically, the alignment torque deviation arithmetic unit 4B arithmetically determines a deviation ΔT' of alignment torque (hereinafter also referred to as the alignment torque deviation ΔT') in accordance with ΔT'=|To'−Ta|).

The motor vehicle behavior stability decision unit 5B includes a predetermined deviation setting means which is designed for setting a predetermined deviation quantity α2 serving as a reference for comparison in dependence on the species of the motor vehicle concerned and the speed v thereof, to thereby compare the alignment torque deviation ΔT' with the predetermined deviation quantity α2. When the above-mentioned comparison shows that the alignment torque deviation ΔT' is greater than the predetermined deviation quantity α2 inclusive, i.e., when the condition given by the undermentioned expression (6) is satisfied, it is then determined that the behavior of the motor vehicle is unstable.

$$|Ka'\cdot\theta - Ta| \geq \alpha2 \qquad (6)$$

Figure 19:
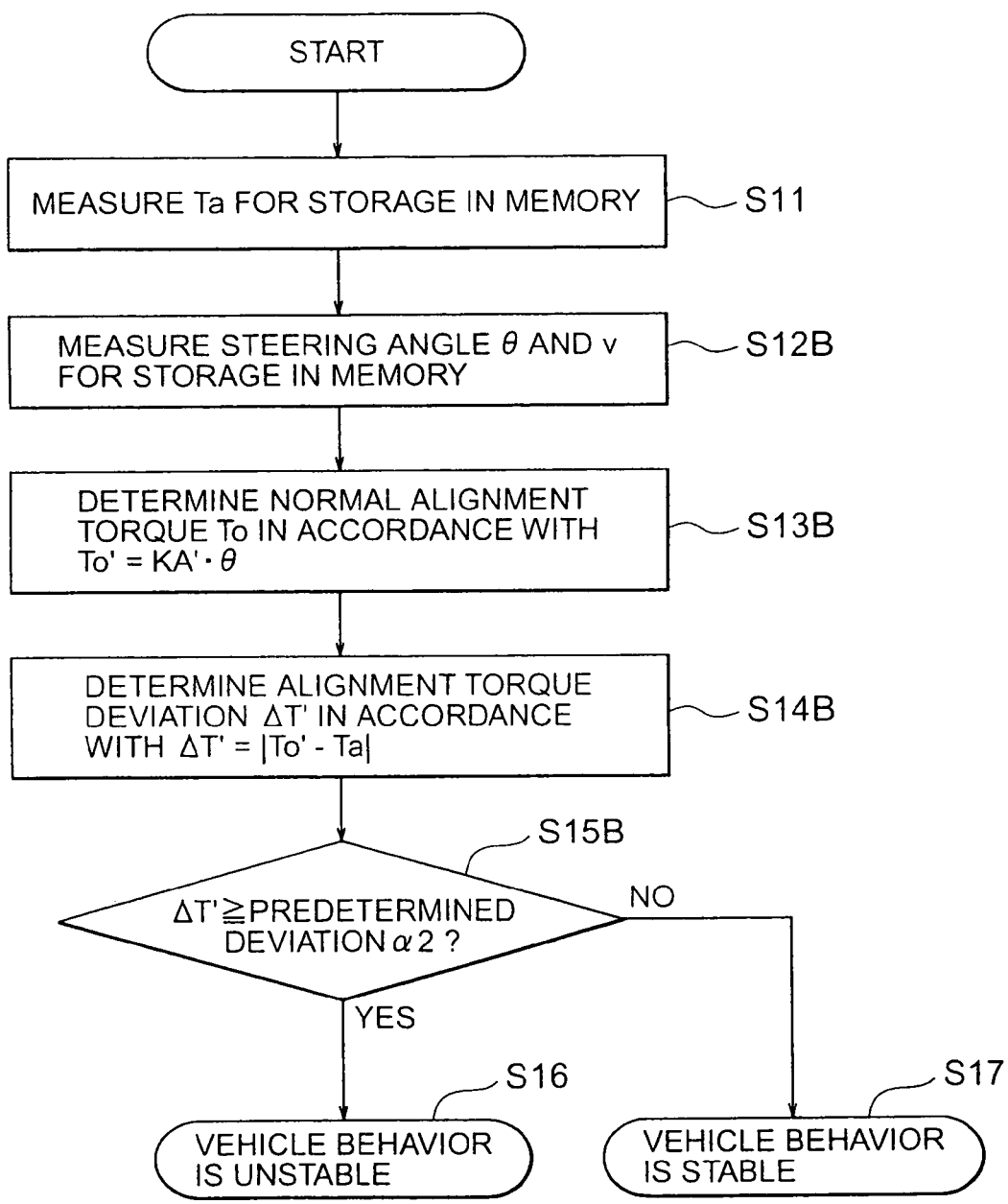
FIG. 19 is a flow chart for illustrating vehicle behavior decision operation performed by the motor vehicle state detecting system according to the ninth embodiment of the invention.

Next, description will be directed to the operation performed by the motor vehicle state detecting system according to the instant embodiment of the invention by reference to a flow chart shown in FIG. 19 together with FIG. 18. In FIG. 19, processing steps corresponding to those described hereinbefore by reference to FIG. 2 are denoted by like reference symbols affixed with "B".

Referring to FIG. 19, the actual alignment torque Ta is firstly measured by means of the alignment torque measuring unit 3, the value of the actual alignment torque as measured being then stored in a memory incorporated in the alignment torque deviation arithmetic unit 4B (step S11).

On the other hand, the steering angle θ is measured by the steering angle measuring unit 20 while the vehicle speed v is measured by the vehicle speed measuring unit 15. The detected values of the steering angle and the vehicle speed are then stored in the memory incorporated in the normal alignment torque arithmetic unit 2B (step S12B). At this juncture, it should however be added that the vehicle speed v is additionally stored in a memory incorporated in the motor vehicle behavior stability decision unit 5B as well.

Subsequently, the normal alignment torque arithmetic unit 2B multiplies the actual steering angle θ by the gain Ka' of the alignment torque for the steering angle to thereby arithmetically determine the normal alignment torque To' (step S13B).

In succession, the alignment torque deviation arithmetic unit 4B subtracts the actual alignment torque Ta from the normal alignment torque To' to thereby acquire the absolute value of the difference resulting from the subtraction, i.e., the alignment torque deviation ΔT' (step S14B).

Finally, the alignment torque deviation ΔT' and the predetermined deviation quantity α1 preset in dependence on the motor vehicle concerned and the vehicle speed v are compared with each other by means of the motor vehicle behavior stability decision unit 5B, whereon decision is made whether the condition given by the expression (6), i.e., ΔT'≧α2, is satisfied or not in a step S15B.

When the decision step S15B results in that ΔT'≧α2 (i.e., "YES"), it is then determined in a step S16 that the behavior of the motor vehicle is unstable or there exists a prognostic sign of the behavior of the motor vehicle becoming unstable. By contrast, when it is found in the step S15B that ΔT'<α2 (i.e., when the step S15B results in "NO"), it is then determined that the behavior of the motor vehicle is stable (step S17), whereon the processing routine shown in FIG. 19 comes to an end.

As can be understood from the above, by detecting the unstable state of the motor vehicle behavior on the basis of the actual steering angle θ, the vehicle speed v and the actual alignment torque Ta, it is possible to effectively detect the unstable state of the motor vehicle behavior even in the state where the grip force of the tire has lowered, as is the case with the embodiments described hereinbefore.

Figure 20:
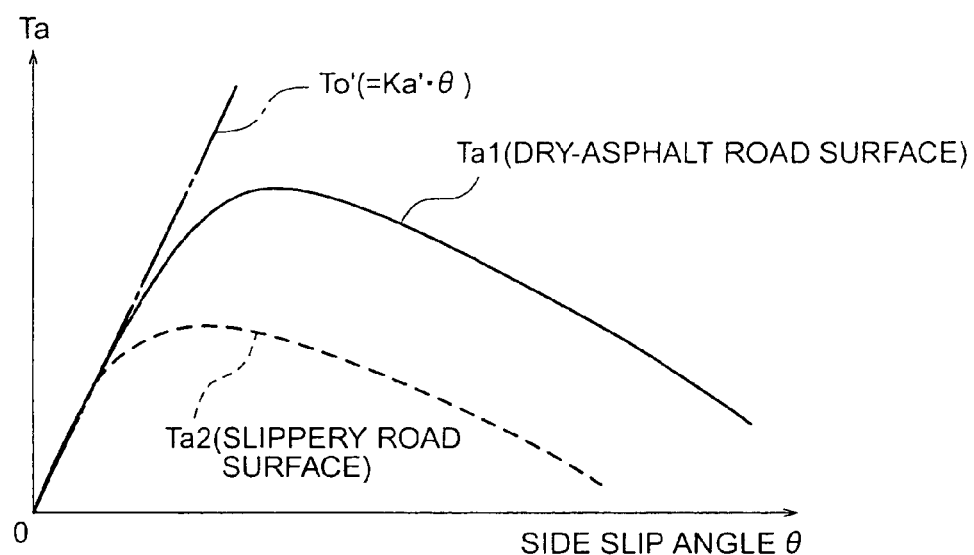
FIG. 20 is a characteristic diagram for graphically illustrating characteristic of an alignment torque for a steering angle when a friction coefficient of a road surface changes in the system according to the ninth embodiment of the invention.

FIG. 20 is a characteristic diagram for graphically illustrating in what manner the actual alignment torque (Ta) changes as a function of the steering angle (θ). This figure corresponds to FIG. 3 referred to hereinbefore.

In FIG. 20, the steering angle θ is taken along the abscissa while the actual alignment torque Ta is taken along the ordinate. Further, in the figure, a single-dotted line curve represents the normal alignment torque To', a solid line curve represents an actual alignment torque Ta1 in the case where the motor vehicle is running on a road surface covered with dry asphalt (hereinafter also referred to as the dry asphalt road surface), and a broken line curve represents an actual alignment torque Ta2 when the motor vehicle is traveling on a slippery road surface.

As can be seen in FIG. 20, the characteristic curve (broken line curve) representing the actual alignment torque Ta2 on the slippery road surface begins to fall at the steering angle θ of a smaller value when compared with the actual alignment torque Ta1 on the dry asphalt road surface represented by the solid line characteristic curve. However, in a range where the steering angle θ is much smaller than the value mentioned above, linearity of the actual alignment torque Ta2 on the slippery road surface which substantially conforms to the normal alignment torque To' is sustained, as is with the case of the actual alignment torque Ta1.

For the reason mentioned above, in the range or region where the value of the steering angle θ is small, there can be made use of the gain of the normal alignment torque To' (the slope of the curve To' in FIG. 20) for the actual steering angle θ as preset in dependence on the motor vehicle concerned.

In this manner, the unstable state of the motor vehicle behavior or the prognostic sign thereof in the slip/locked state of tires which could not be ascertained with the conventional apparatus can be detected by detecting the actual alignment torque Ta, the vehicle speed v and the steering angle θ actually taking place in the motor vehicle to thereby arithmetically determine the normal alignment torque To' and comparing the actual alignment torque Ta with the normal alignment torque To'.

Additionally, even in the case where the side slip angle β of the motor vehicle can not be measured, it is possible to detect the unstable state of the motor vehicle behavior or the prognostic sign thereof by using the vehicle speed v and the steering angle θ.

Embodiment 10

In the case of the motor vehicle state detecting system according to the ninth embodiment of the invention described above, the unstable state of the motor vehicle is decided on the basis of the alignment torque deviation ΔT' of the actual alignment torque Ta from the normal alignment torque To'. In the motor vehicle state detecting system according to a tenth embodiment of the present invention, arrangement is made such that ratio of the rate of change (hereinafter also referred to simply as the change rate) of the actual alignment torque Ta for the steering angle θ is arithmetically determined or alternatively measured to thereby make decision that the motor vehicle is in the unstable state when the torque/steering-angle change rate departs from a predetermined range.

Figure 21:
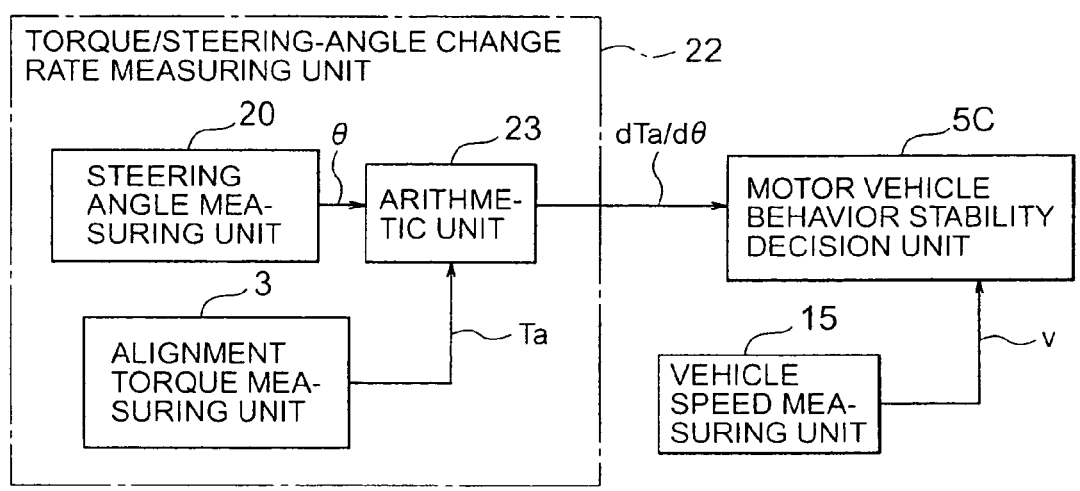
FIG. 21 is a block diagram showing schematically a major portion of the motor vehicle state detecting system according to a tenth embodiment of the present invention.

FIG. 21 is a schematic block diagram showing generally a major portion of the motor vehicle state detecting system according to the tenth embodiment of the invention which is so arranged as to make decision concerning the stability of the behavior of the motor vehicle on the basis of comparison between the torque/steering-angle change rate and the predetermined range. Incidentally, components or items same as or equivalent to those described hereinbefore by reference to FIGS. 4 and 18 are denoted by like reference symbols affixed with "C" as the case may be. Repeated description in detail of those components will be omitted.

Now, referring to FIG. 21, reference numeral 22 denotes a torque/steering-angle change rate measuring unit which is comprised of the steering angle measuring unit 20, the alignment torque measuring unit 3 and an arithmetic unit 23. The arithmetic unit 23 is so designed as to arithmetically determine (or alternatively measure) the change rate of the actual alignment torque Ta for the actual steering angle θ in terms of the torque/steering-angle change rate dTa/dθ.

The torque/steering-angle change rate dTa/dθ arithmetically determined by the arithmetic unit 23 incorporated in the torque/steering-angle change rate measuring unit 22 is inputted to a motor vehicle behavior stability decision unit 5C to be utilized in making decision as to the stability of the behavior of the motor vehicle.

Further, the vehicle speed v outputted from the vehicle speed measuring unit 15 is also inputted to the motor vehicle behavior stability decision unit 5C to be utilized for setting a reference value (predetermined range) for comparative determination of the behavior of the motor vehicle.

The motor vehicle behavior stability decision unit 5C includes a predetermined range setting means (not shown) which is so designed as to set a predetermined range as the reference for comparison with the torque/steering-angle change rated Ta/dθ independence on the type of the motor vehicle concerned and the vehicle speed v. When the torque/steering-angle change rate dTa/dθ departs from the predetermined range, the motor vehicle behavior stability decision unit 5C decides that the behavior of the motor vehicle is unstable.

In general, the actual alignment torque Ta bears at least approximately a proportional relation to the actual steering angle θ so long as the motor vehicle is in the stable running state. However, when the behavior of the motor vehicle approaches to the stability limit, magnitude of the actual alignment torque Ta decreases to a level where the proportional relation to the steering angle θ can no more be maintained, as described previously by reference to FIG. 20. By taking advantage of this feature of the vehicle behavior, it is possible to make decision as to the unstable state of the motor vehicle.

The arithmetic unit 23 incorporated in the torque/steering-angle change rate measuring unit 22 may be so designed as to determine the torque/steering-angle change rate $dTa/d\theta$ by measuring the actual alignment torque Ta in correspondence to the steering angle $\theta$ actually measured.

The motor vehicle behavior stability decision unit 5C compares the torque/steering-angle change rate $dTa/d\theta$ with the predetermined range to thereby decide that the behavior of the motor vehicle is unstable when the torque/steering-angle change rate $dTa/d\theta$ lies outside of the predetermined range. Mathematically, this decision can be made in accordance with the following expression (7):

$$dTa/d\theta \geq \alpha 2U' \text{ or } dTa/d\theta \leq \alpha 2L' \qquad (7)$$

Figure 22:
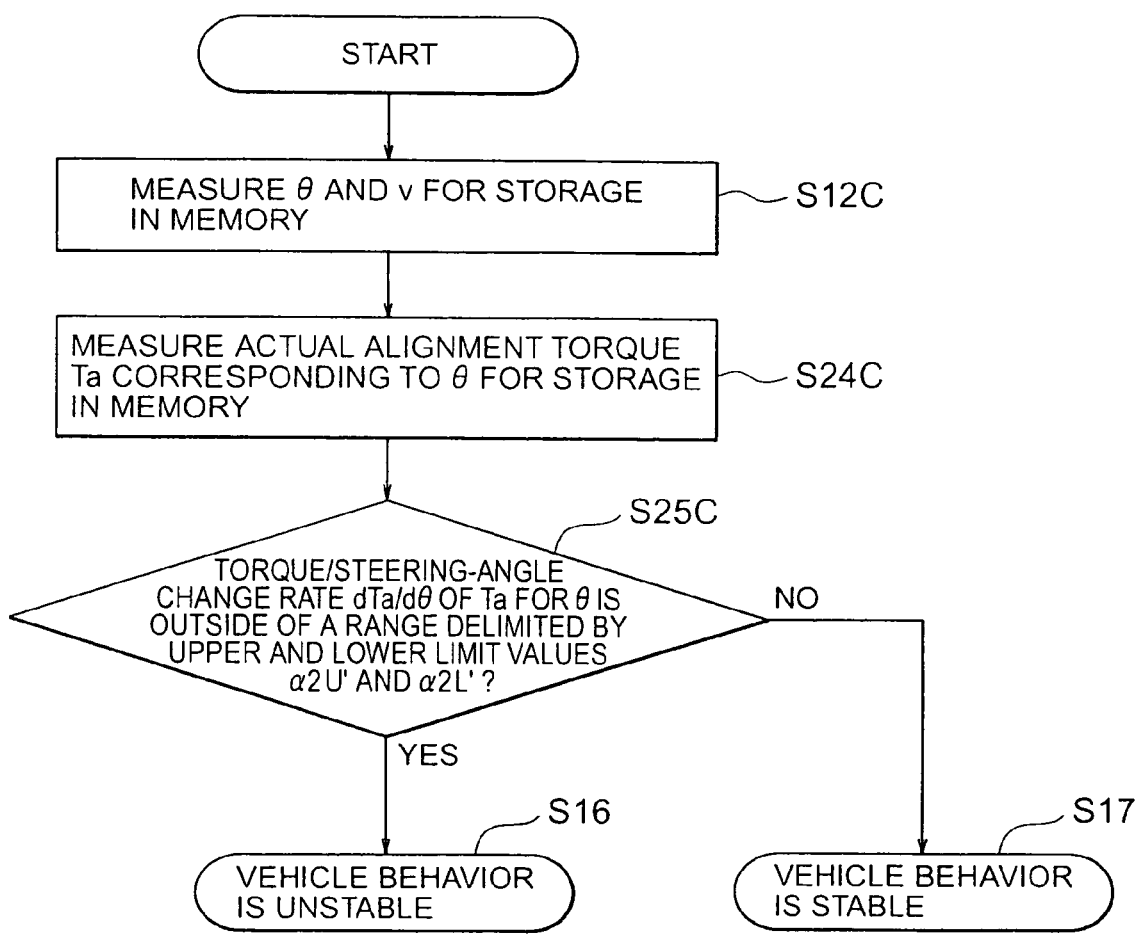
FIG. 22 is a flow chart for illustrating vehicle behavior decision operation performed by the motor vehicle state detecting system according to the tenth embodiment of the invention.

Next, referring to a flow chart shown in FIG. 22, description will be made of the operation performed by the motor vehicle state detecting system according to the tenth embodiment of the invention. Incidentally, in FIG. 22, processing steps corresponding to those described hereinbefore by reference to FIG. 5 are denoted by like reference symbols affixed with "C".

At first, a measured value of the actual steering angle $\theta$ is stored in a memory by means of the arithmetic unit 23 incorporated in the torque/steering-angle change rate measuring unit 22 in a step S12C, which is then followed by a step S24C where the actual alignment torque Ta corresponding to the actual steering angle $\theta$ is measured in terms of the torque/steering-angle change rate $dTa/d\theta$ which is then stored in the memory.

In succession, in a step S25C, the motor vehicle behavior stability decision unit 5C fetches the torque/steering-angle change rate $dTa/d\theta$ measured by the torque/steering-angle change rate measuring unit 22 to thereby make decision whether or not the torque/steering-angle change rate $dTa/d\theta$ departs from the predetermined range defined by the upper limit value $\alpha 2U'$ and the lower limit value $\alpha 2L'$, respectively.

When it is determined in the step S25C that the torque/steering-angle change rate $dTa/d\theta$ departs from the predetermined range (i.e., when the decision step S25C results in "YES"), it is then determined in a step S16 that the behavior of the motor vehicle is unstable or that a prognostic sign indicating that the behavior of the motor vehicle will become unstable is observed. By contrast, when it is found in the step S25C that the torque/steering-angle change rate $dTa/d\theta$ lies within the predetermined range (i.e., when the step S25C results in "NO"), it is then determined that the behavior of the motor vehicle is stable (step S17), whereupon the processing routine shown in FIG. 22 comes to an end.

As can be seen from the above, by detecting the unstable state of the behavior of the motor vehicle on the basis of the actual steering angle $\theta$ and the actual alignment torque Ta really taking place in the motor vehicle concerned, it is possible to detect the unstable state of the behavior of the motor vehicle with high effectiveness even in the situation where the grip force of tire is small.

As described previously by reference to FIG. 20, the actual alignment torque Ta to which the motor vehicle running on the slippery road surface is subjected to becomes small when the steering angle $\theta$ is relatively small. However, in the region where the actual steering angle $\theta$ becomes further small, the linearity of the actual alignment torque Ta which conforms to the slope of the normal alignment torque To is sustained. Thus, the range of the torque/steering-angle change rate (gain) can be used for making decision concerning the stability of the behavior of the motor vehicle similarly to the case where the motor vehicle is running on a dry-asphalt (not slippery) road surface.

Embodiment 11

In the case of the motor vehicle state detecting system according to the tenth embodiment of the invention, the torque/steering-angle change rate measuring unit 22 is employed for making available the torque/steering-angle change rate $dTa/d\theta$. By contrast, in the case of the motor vehicle state detecting system according to an eleventh embodiment of the present invention, time-based change rates of the actual steering angle e and the actual alignment torque Ta, respectively, are measured and subjected to division processing for thereby determining the torque/steering-angle change rate $dTa/d\theta$.

Figure 23:
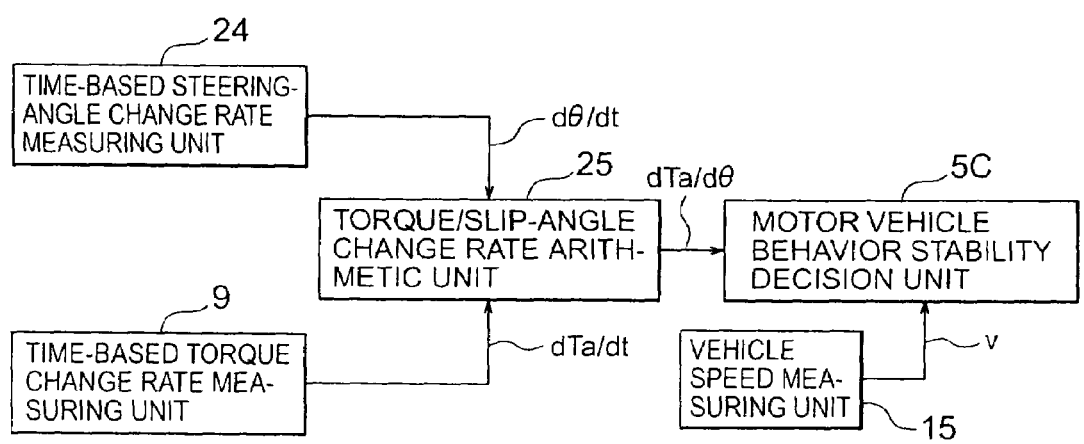
FIG. 23 is a block diagram showing schematically a major portion of the motor vehicle state detecting system according to an eleventh embodiment of the present invention.

FIG. 23 is a block diagram showing generally and schematically a major portion of the motor vehicle state detecting system according to the eleventh embodiment of the invention in which the torque/steering-angle change rate $dTa/d\theta$ is determined on the basis of the time-based change rates of the actual steering angle $\theta$ and the actual alignment torque Ta, respectively.

Referring to FIG. 23, the arithmetic means for determining the parameter for the stability decision is comprised of a time-based steering-angle change rate measuring unit 24 for determining the time-based change rate of the actual steering angle $\theta$ in the form of the time-based steering-angle change rate $d\theta/dt$, a time-based torque change rate measuring unit 9 for determining the time-based change rate of the actual alignment torque Ta in the form of $dTa/dt$, i.e., the time-based torque change rate, and a torque/steering-angle change rate arithmetic unit 25 for arithmetically determining the torque/steering-angle change rate $dTa/d\theta$ by dividing the time-based torque change rate $dTa/dt$ by the time-based steering-angle change rate $d\theta/dt$.

Further, the vehicle speed v actually measured is inputted to the motor vehicle behavior stability decision unit 5C, as is the case with the embodiments described hereinbefore.

Now, referring to FIG. 23, operation of the motor vehicle state detecting system according to the instant embodiment of the invention will be described.

As mentioned previously, the motor vehicle behavior stability decision unit 5C determines the state of the motor vehicle by taking advantage of the feature that the proportional relation of the actual alignment torque Ta to the actual steering angle $\theta$ can no more be sustained or held when the actual alignment torque Ta approaches to the stability limit of the motor vehicle.

The time-based steering-angle change rate measuring unit 24 may be so designed as to measure the time-based steering angle change rate $d\theta/dt$ of the steering angle $\theta$ (steering angular velocity) of the motor vehicle.

The time-based steering-angle change rate measuring unit 24 may be constituted by an optical sensor or the like mounted on the steering column.

Further, the time-based torque change rate measuring unit 9 is so designed as to measure the actual alignment torque Ta at a predetermined time interval to thereby make available the time-based torque change rate Ta/dt.

The torque/steering-angle change rate arithmetic unit 25 is so designed as to divide the time-based torque change rate $dTa/dt$ by the time-based steering angle change rate $d\theta/dt$ to thereby arithmetically determine the ratio of the change rate of the actual alignment torque Ta to that of the actual steering angle θ, i.e., the torque/steering-angle change rate dTa/dθ, in accordance with the undermentioned expression (8):

$$(dTa/dt)/(d\theta/dt)=dTa/d\theta \tag{8}$$

The motor vehicle behavior stability decision unit 5C is so designed as to decide that the behavior of the motor vehicle is in the unstable state or the prognostic state thereof when the torque/steering-angle change rate dTa/dθ is outside of the predetermined range (see the expression (7) described previously) and output an unstable state detection signal.

Figure 24:
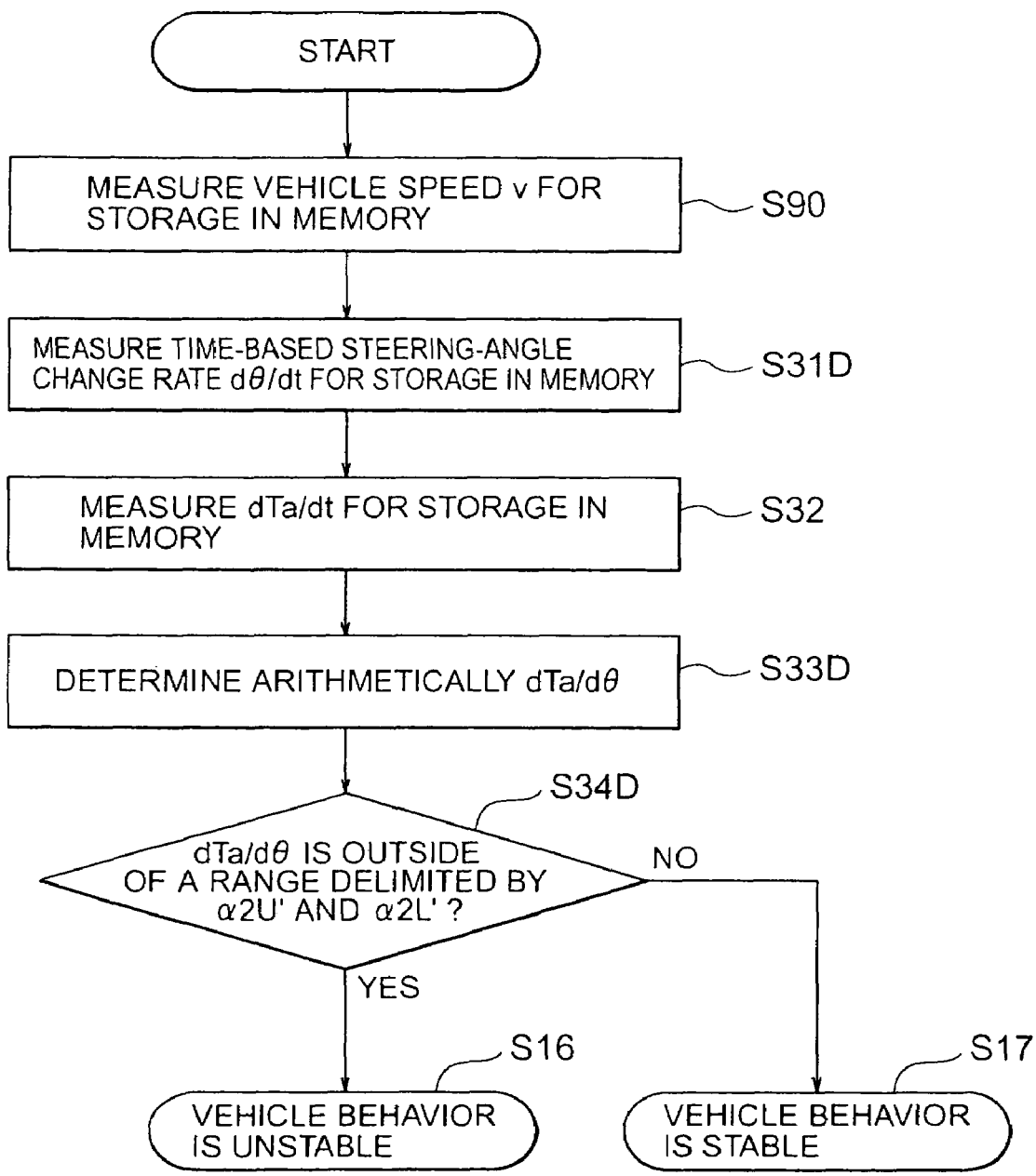
FIG. 24 is a flow chart for illustrating vehicle behavior decision operation performed by the motor vehicle state detecting system according to the eleventh embodiment of the invention.

Next, referring to a flow chart shown in FIG. 24, description will be made of the operation performed by the motor vehicle state detecting system according to the eleventh embodiment of the invention (see FIG. 23). Incidentally, in FIG. 24, processing steps which correspond to those described hereinbefore by reference to FIG. 7 are denoted by like reference symbols affixed with "D".

At first, the vehicle speed v is measured by the vehicle speed measuring unit 15 to be stored in a memory in a step S90, which is then followed by a step S31D where the time-based steering-angle change rate dθ/dt is measured, which is also stored in the memory. Additionally, the time-based torque change rate dTa/dt is measured to be stored in the memory in a step S32.

In succession, in a step S33D, the time-based torque change rate dTa/dt is divided by the time-based steering angle change rate dθ/dt to thereby arithmetically determine the change rate (rate of change) of the actual alignment torque Ta relative to that of the actual steering angle θ (i.e., torque/steering-angle change rate dTa/dθ).

Subsequently, the motor vehicle behavior stability decision unit 5C makes decision that the behavior of the motor vehicle is unstable (step S16) when the torque/steering-angle change rate dTa/dθ is outside of the predetermined range (delimited by the upper limit value α2U' and the lower limit value α2L', respectively) in a step S34D, while deciding that the behavior of the motor vehicle is stable (step S17) when the torque/steering-angle change rate dTa/dθ falls within the predetermined range mentioned above in the step S34D.

In this manner, by making use of the torque/steering-angle change rate dTa/dθ, there can be obtained advantageous action and effect similar to those of the embodiments described hereinbefore.

More specifically, even in the case where it is impossible to measure straightforwardly or directly (or determine arithmetically) the torque/steering-angle change rate dTa/dθ, this change rate can arithmetically be derived from the time-based change rates of the actual alignment torque Ta and the actual steering angle θ, respectively. Further, advantageous actions and effects similar to those described hereinbefore can be obtained.

Embodiment 12

In the case of the motor vehicle state detecting system according to the eleventh embodiment of the invention, the time-based change rates of the actual steering angle θ and the actual alignment torque Ta, respectively, are used for arithmetically determining the torque/steering-angle change rate dTa/dθ. In the motor vehicle state detecting system according to a twelfth embodiment of the present invention, change rates of the actual steering angle θ and the actual alignment torque Ta, respectively, for the travel distance of the motor vehicle are used.

Figure 25:
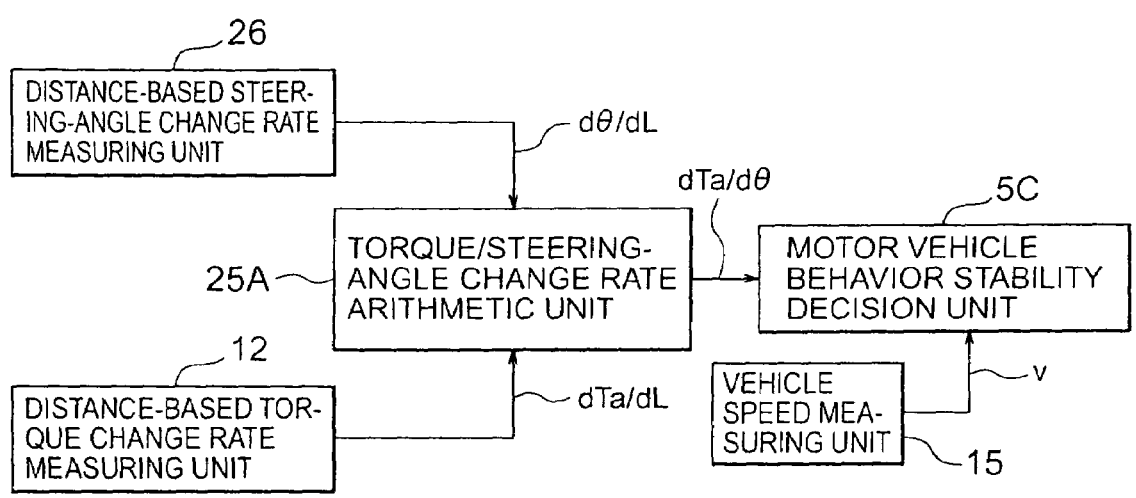
FIG. 25 is a block diagram showing schematically a major portion of the motor vehicle state detecting system according to a twelfth embodiment of the present invention.

FIG. 25 is a block diagram showing generally and schematically a major portion of the motor vehicle state detecting system according to the twelfth embodiment of the invention in which the change rates of the steering angle θ and the actual alignment torque Ta, respectively, for the travel distance of the motor vehicle are used.

In FIG. 25, the distance-based torque change rate measuring unit 12 and the motor vehicle behavior stability decision unit 5C are similar to those described hereinbefore in conjunction with FIGS. 8 and 23, respectively. A torque/steering-angle change rate arithmetic unit 25A corresponds to the torque/steering-angle change rate arithmetic unit 25 also described previously.

In the system now under consideration, the arithmetic means for determining the parameter for the stability decision is comprised of a distance-based steering-angle change rate measuring unit 26 for determining the change rate of the actual steering angle θ for the travel distance L of the motor vehicle in the form of the distance-based steering-angle change rate dθ/dL, a distance-based torque change rate measuring unit 12 for determining the change rate of the actual alignment torque Ta for the travel distance L in the form of the distance-based torque change rate dTa/dL, and a torque/steering-angle change rate arithmetic unit 25A for arithmetically determining the torque/steering-angle change rate dTa/dθ by dividing the distance-based torque change rate dTa/dL by the distance-based steering-angle change rate dθ/dL.

The distance-based steering-angle change rate measuring unit 26 includes a travel distance measuring unit (or arithmetic unit) for determining the distance L the motor vehicle has traveled or moved (travel distance). The distance-based steering-angle change rate measuring unit 26 may be constituted by an optical sensor or the like mounted on the steering column for the measurement of the steering angle.

Now, referring to FIG. 25, operation of the motor vehicle state detecting system according to the twelfth embodiment of the invention will be described.

The distance-based steering-angle change rate measuring unit 26 may be, for example, designed to arithmetically determine the distance-based steering-angle change rate dθ/dL by measuring e.g. the ground speed in both the longitudinal and transverse directions periodically every predetermined travel distance. Further, the distance-based torque change rate measuring unit 12 may be so designed as to arithmetically determine the distance-based torque change rate dTa/dL by measuring the actual alignment torque Ta every predetermined travel distance.

The torque/steering-angle change rate arithmetic unit 25A is designed to divide the distance-based torque change rate dTa/dL by the distance-based steering-angle change rate dθ/dL to thereby arithmetically determine the torque/steering-angle change rate dTa/dθ in accordance with the undermentioned expression (9):

$$(dTa/dL)/(d\theta/dL)=dTa/d\theta \tag{9}$$

The motor vehicle behavior stability decision unit 5C is designed to check whether or not the torque/steering-angle change rate dTa/dθ falls within a predetermined range to thereby decide that the behavior of the motor vehicle is in the unstable state when the torque/steering-angle change rate dTa/dθ is outside of the predetermined range.

Figure 26:
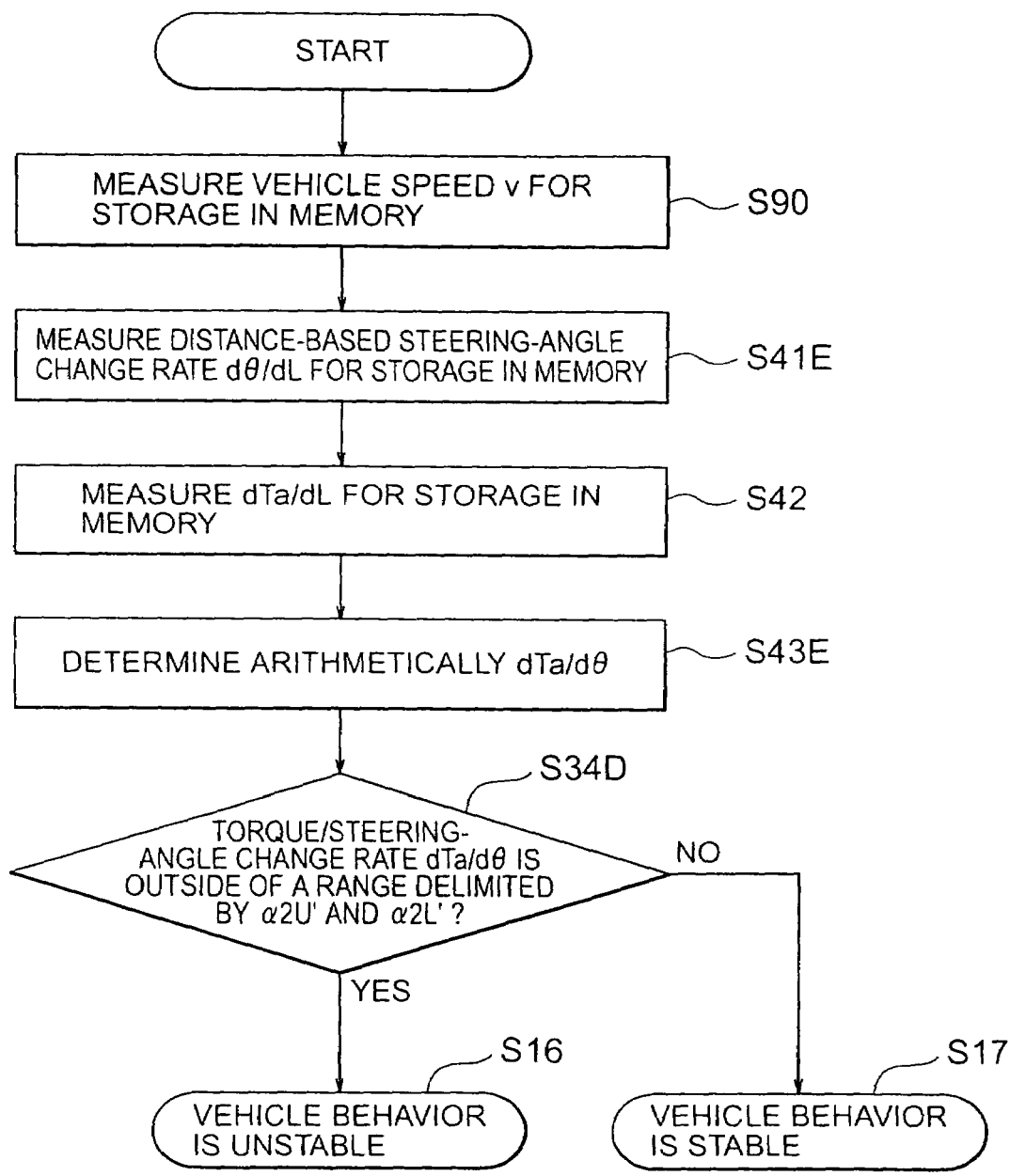
FIG. 26 is a flow chart for illustrating vehicle behavior decision operation performed by the motor vehicle state detecting system according to the twelfth embodiment of the invention.

Next, referring to a flow chart shown in FIG. 26, description will be directed to the operation performed by the motor vehicle state detecting system according to the twelfth embodiment of the invention shown in FIG. 25. In FIG. 26, the steps S90 and S34D represent the processings similar to those described hereinbefore by reference to FIG. 24 and steps S41E, S42 and S43E correspond, respectively, to the steps S41, S42 and S43 shown in FIG. 9.

At first, the vehicle speed v, the distance-based steering-angle change rate dθ/dL and the distance-based torque change rate dTa/dL are measured to be stored in a memory in steps S90, S41E and S42, respectively.

In succession, in a step S43E, the distance-based torque change rate dTa/dL is divided by the distance-based steering-angle change rate dθ/dL to thereby derive the torque/steering-angle change rate dTa/dθ.

Subsequently, the motor vehicle behavior stability decision unit 5C compares the torque/steering-angle change rate dTa/dθ with the predetermined range (delimited by the upper limit value α2U' and the lower limit value α2L', respectively) (step S34D) to thereby make decision whether the behavior of the motor vehicle is unstable (step S16) or stable (step S17).

In the motor vehicle state detecting system according to the instant embodiment of the invention, advantageous actions and effects comparable to those mentioned previously can be obtained. Furthermore, even in the case where it is impossible to measure directly or straightforwardly (or determine arithmetically) the torque/steering-angle change rate dTa/dθ, this rate can arithmetically be determined by the division arithmetic and compared with the predetermined range conforming to the vehicle speed v to thereby decide the stability or instability of the behavior of the motor vehicle.

Embodiment 13

In the case of the motor vehicle state detecting system according to the eleventh embodiment of the invention, no consideration is paid to the processing procedure which is to be executed when the time-based steering-angle change rate dθ/dt is smaller than the lower limit permissible value. In the motor vehicle state detecting system according to a thirteenth embodiment of the present invention, such arrangement is adopted that the division arithmetic processing executed by the torque/steering-angle change rate arithmetic unit 25 (see FIG. 23) is inhibited when the time-based steering-angle change rate dθ/dt becomes smaller than the lower limit permissible value, to thereby prevent occurrence of overflow.

Figure 27:
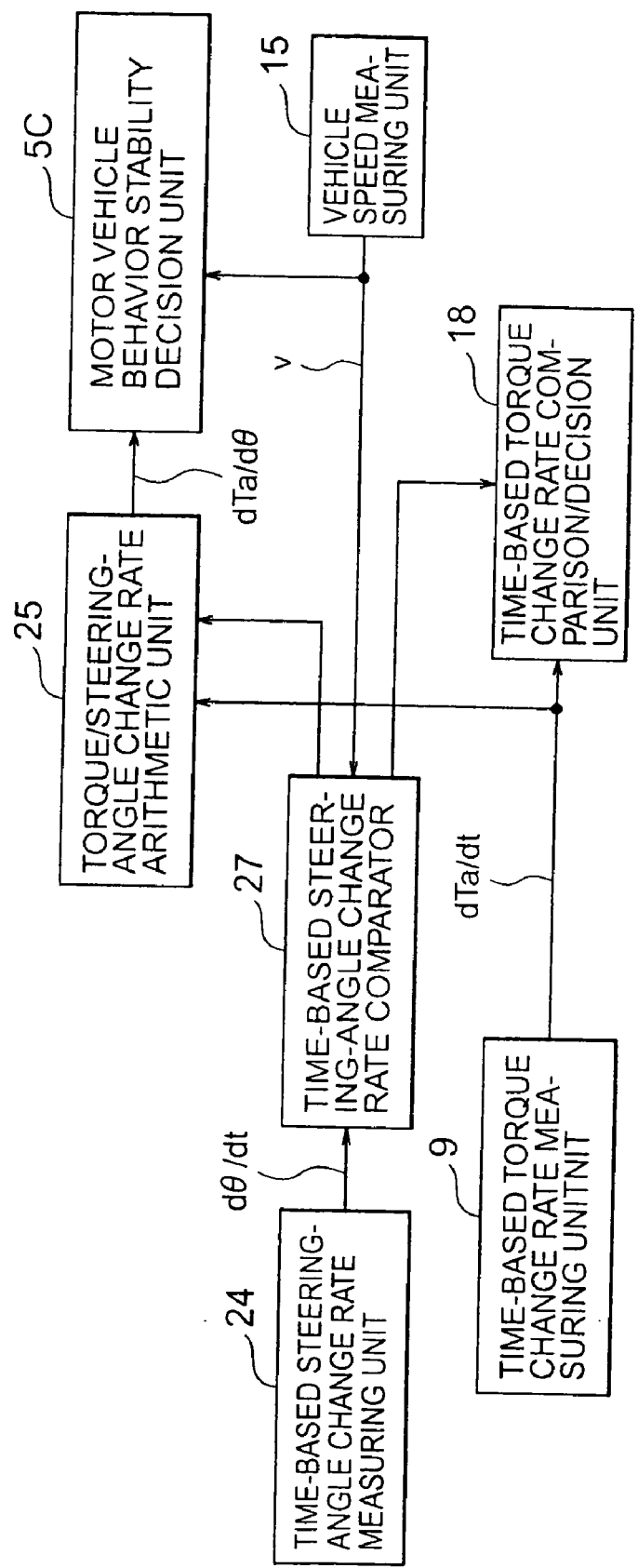
FIG. 27 is a block diagram showing schematically a major portion of the motor vehicle state detecting system according to a thirteenth embodiment of the present invention.

FIG. 27 is a block diagram showing generally a major portion of the motor vehicle state detecting system according to the thirteenth embodiment of the present invention in which the division arithmetic executed by the torque/steering-angle change rate arithmetic unit 25 is inhibited when the time-based steering-angle change rate dθ/dt is small.

In FIG. 27, components similar to those described previously in conjunction with FIGS. 12 and 23 are denoted by like reference symbols.

Referring to FIG. 27, a time-based steering-angle change rate comparator 27 is inserted between the time-based steering-angle change rate measuring unit 24 and the torque/steering-angle change rate arithmetic unit 25 with the time-based torque change rate comparison/decision unit 18 being connected to the output of the time-based steering-angle change rate comparator 27.

The time-based steering-angle change rate comparator 27 is so designed that it ordinarily supplies the time-based steering-angle change rate dθ/dt to the torque/steering-angle change rate arithmetic unit 25 to thereby validate the arithmetic operation (division processing) of the torque/steering-angle change rate arithmetic unit 25.

On the other hand, in the case where the time-based steering-angle change rate dθ/dt is smaller than the lower limit permissible value, the time-based steering-angle change rate comparator 27 inhibits the division processing executed by the torque/steering-angle change rate arithmetic unit 25 by invalidating or disabling the torque/steering-angle change rate arithmetic unit 25 while outputting the result of comparison (i.e., dθ/dt<lower limit permissible value) to the time-based torque change rate comparison/decision unit 18 to thereby enable the operation of the time-based torque change rate comparison/decision unit 18.

The time-based steering-angle change rate comparator 27 is comprised of a lower limit value setting means and a division arithmetic inhibiting means. The lower limit value setting means incorporated in the time-based steering-angle change rate comparator 27 is designed to set the lower limit permissible value for the time-based steering-angle change rate dθ/dt in dependence on the motor vehicle concerned and the vehicle speed v.

The division arithmetic inhibiting means incorporated in the time-based steering-angle change rate comparator 27 is designed to disable the division processing executed by the torque/steering-angle change rate arithmetic unit 25 when the value of the time-based steering-angle change rate dθ/dt becomes smaller than the above-mentioned lower limit permissible value.

The time-based torque change rate comparison/decision unit 18 is comprised of a predetermined change rate setting means for setting a predetermined change rate for the time-based torque change rate dTa/dt in dependence on the motor vehicle concerned and a comparison means for comparing the time-based torque change rate dTa/dt with the predetermined change rate mentioned above. Incidentally, the function of the time-based torque change rate comparison/decision unit 18 may be incarnated as a functional part of the motor vehicle behavior stability decision unit 5C.

In operation, when it is decided by the time-based steering-angle change rate comparator 27 that the value of the time-based steering-angle change rate dθ/dt becomes smaller than the lower limit permissible value, operation of the time-based torque change rate comparison/decision unit 18 is validated in place of the torque/steering-angle change rate arithmetic unit 25 and the motor vehicle behavior stability decision unit 5C. In that case, the time-based torque change rate comparison/decision unit 18 makes decision that the behavior of the motor vehicle is unstable in the case where the time-based torque change rate dTa/dt reaches or exceeds the predetermined change rate value.

In general, when the absolute value of the time-based steering-angle change rate dθ/dt of the motor vehicle is smaller than the lower limit permissible value and when the absolute value of the time-based torque change rate dTa/dt is smaller than the predetermined change rate value, then it can be determined that the motor vehicle is scarcely moving in the lateral or transverse direction and thus the motor vehicle is in the stable state.

By contrast, if the absolute value of the time-based torque change rate dTa/dt reaches or exceeds the predetermined change rate value, the behavior of the motor vehicle is then identified as being in the unstable state, even if the absolute value of the time-based steering-angle change rate dθ/dt is smaller than the lower limit permissible value inclusive.

Furthermore, even if the time-based steering-angle change rate dθ/dt is greater than the lower limit permissible value inclusive, the motor vehicle can be regarded as being in the stable state so far as the torque/steering-angle change rate dTa/dθ lies within the predetermined range. However, in the case where the torque/steering-angle change rate $dT_a/d\theta$ lies outside of the predetermined range, it is then determined that the motor vehicle is in the unstable state.

Next, description will turn to operation of the motor vehicle state detecting system according to the thirteenth embodiment of the invention shown in FIG. 27.

At first, the time-based steering-angle change rate measuring unit 24 measures the time-based steering-angle change rate $d\theta/dt$ while the time-based torque change rate measuring unit 9 measures the time-based torque change rate $dT_a/dt$.

The time-based steering-angle change rate comparator 27 compares the time-based steering change rate $d\theta/dt$ with the lower limit permissible value to supply the time-based steering-angle change rate $d\theta/dt$ to the torque/steering-angle change rate arithmetic unit 25 when the value of the time-based steering-angle change rate $d\theta/dt$ is greater than the lower limit permissible value inclusive. In response thereto, the torque/steering-angle change rate arithmetic unit 25 performs the ordinary division arithmetic in accordance with the expression (8) mentioned hereinbefore.

Subsequently, the motor vehicle behavior stability decision unit 5C compares the torque/steering-angle change rate $dT_a/d\theta$ with the predetermined range mentioned above to decide that the behavior of the motor vehicle is in the unstable state when the torque/steering-angle change rate $dT_a/d\theta$ lies outside of the predetermined range (see the expression (7)).

On the other hand, when the value of the time-based steering-angle change rate $d\theta/dt$ is smaller than the lower limit permissible value, the time-based steering-angle change rate comparator 27 inhibits the time-based steering-angle change rate $d\theta/dt$ from being supplied to the torque/steering-angle change rate arithmetic unit 25 (and hence the division arithmetic represented by the expression (8)). Further, the result of the comparison is supplied to the time-based torque change rate comparison/decision unit 18.

In this manner, the time-based torque change rate comparison/decision unit 18 is put into operation in place of the motor vehicle behavior stability decision unit 5C. Thus, the state of the motor vehicle is detected on the basis of the result of the comparison processing executed by the time-based torque change rate comparison/decision unit 18.

More specifically, the time-based torque change rate comparison/decision unit 18 compares the time-based torque change rate $dT_a/dt$ with the predetermined change rate to thereby decide that the behavior of the motor vehicle is unstable when the time-based torque change rate $dT_a/dt$ is greater than the above-mentioned predetermined change rate inclusive.

Figure 28:
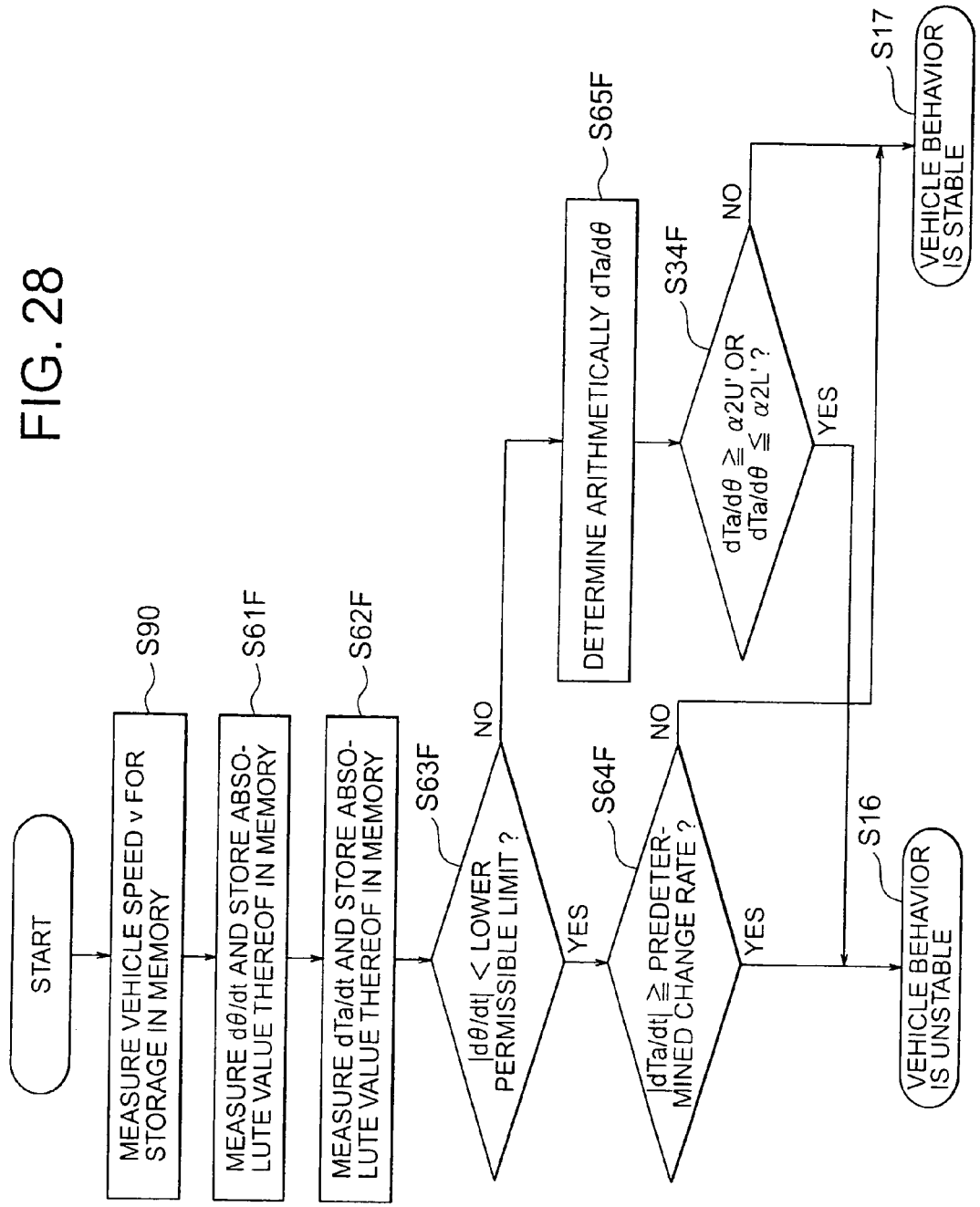
FIG. 28 is a flow chart for illustrating vehicle behavior decision operation performed by the motor vehicle state detecting system according to the thirteenth embodiment of the invention.

Next, referring to a flow chart shown in FIG. 28, description will be made of the operation performed by the motor vehicle state detecting system according to the thirteenth embodiment of the invention shown in FIG. 27. In FIG. 28, the step S90 represents the processing similar to that described hereinbefore by reference to FIG. 24. Further, steps S61F to S65F and S34F correspond, respectively to the steps S61 to S65 and S34 shown in FIG. 13.

At first, the vehicle speed v is measured to be stored in a memory (step S90) while the time-based steering-angle change rate $d\theta/dt$ is measured with the absolute value thereof being stored in the memory (step S61F). Further, the time-based torque change rate $dT_a/dt$ is measured and the absolute value thereof is stored in the memory (step S62).

Subsequently, decision is made whether or not the absolute value of the time-based steering-angle change rate $d\theta/dt$ is smaller than the lower limit permissible value in a step S63F. When it is determined that $|d\theta/dt|$<lower limit permissible value (i.e., when the step S63F results in "YES"), then the time-based torque change rate comparison/decision unit 18 is validated, whereon decision is made whether or not the absolute value of the time-based torque change rate $dT_a/dt$ is greater than the above-mentioned predetermined change rate inclusive in a step S64.

When the decision step S64 results in that $|dT_a/dt| \geq$ predetermined change rate, i.e., "YES", it is then determined that the behavior of the motor vehicle is in the unstable state (step S16), while it is decided that the motor vehicle is in the stable state (step S17) when $|dT_a/dt|$<predetermined change rate, i.e., when the step S64 results in "NO", whereon the processing routine shown in FIG. 28 is terminated.

On the other hand, when the decision steps S63 results in that $|d\theta/dt| \geq$ lower limit permissible value, i.e., "NO", then the torque/steering-angle change rate arithmetic unit 25 is put into operation to arithmetically determine the torque/steering-angle change rate $dT_a/d\theta$ (step S65F). In succession, it is checked by the motor vehicle behavior stability decision unit 5C in a step S34F whether or not the torque/steering-angle change rate $dT_a/d\theta$ lies outside of the predetermined range.

Finally, in dependence on whether or not the torque/steering-angle change rate $dT_a/d\theta$ lies outside of the predetermined range (i.e., whether the torque/steering-angle change rate $dT_a/d\theta$ is greater than the upper limit value $\alpha2U'$ inclusive or smaller than the lower limit value $\alpha2L'$ inclusive), the unstable state or the stable state of the behavior of the motor vehicle is decided (step S16 or S17).

As is apparent from the above, according to the teaching of the invention incarnated in the instant embodiment, the division arithmetic performed by the torque/steering-angle change rate arithmetic unit 25 is inhibited or disabled when the value of the time-based steering-angle change rate $d\theta/dt$ is smaller than the lower limit permissible value, and the state of the motor vehicle is determined on the basis of only the time-based torque change rate $dT_a/dt$.

By virtue of this feature, occurrence of overflow due to the division arithmetic executed by the torque/steering-angle change rate arithmetic unit 25 can be suppressed while detection of the unstable state of the motor vehicle or the prognostic state thereof can be ensured even in the case where the time-based steering-angle change rate $d\theta/dt$ is small.

Embodiment 14

In the motor vehicle state detecting system according to the twelfth embodiment of the invention, no consideration has been paid to the processing which is executed when the distance-based steering-angle change rate $d\theta/dL$ is smaller than the lower limit permissible value. In the motor vehicle state detecting system according to a fourteenth embodiment of the present invention, such arrangement is adopted that the division arithmetic processing executed by the torque/steering-angle change rate arithmetic unit 25A (see FIG. 25) is inhibited when the distance-based steering-angle change rate $d\theta/dL$ becomes smaller than the lower limit permissible value, to thereby prevent occurrence of overflow.

Figure 29:
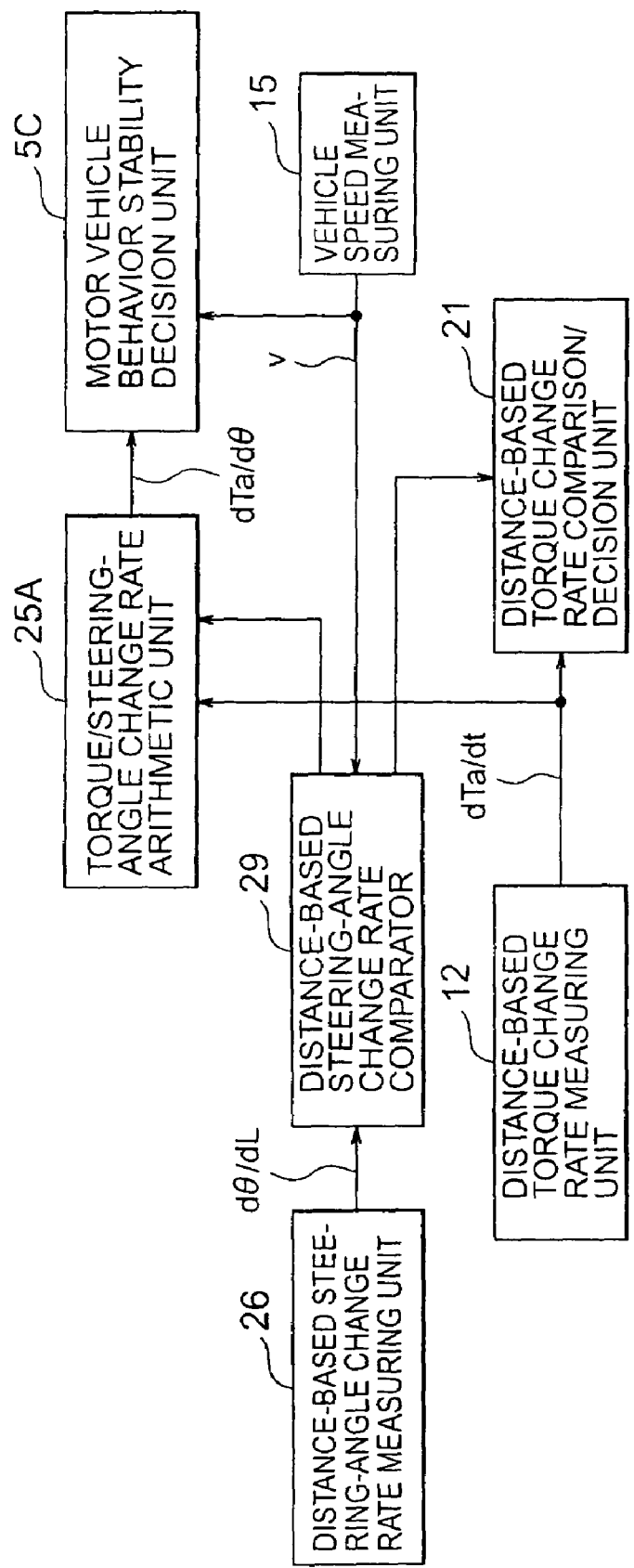
FIG. 29 is a block diagram showing schematically a major portion of the motor vehicle state detecting system according to a fourteenth embodiment of the present invention.

FIG. 29 is a block diagram showing generally a major portion of the motor vehicle state detecting system according to the fourteenth embodiment of the present invention in which the division arithmetic executed by the torque/steering-angle change rate arithmetic unit 25A is inhibited when the distance-based steering-angle change rate $d\theta/dL$ is small.

In FIG. 29, components similar to those described previously in conjunction with FIGS. 14 and 25 are denoted by like reference symbols.

Referring to the figure, a distance-based steering-angle change rate comparator 29 is inserted between the distance-based steering-angle change rate measuring unit 26 and the torque/steering-angle change rate arithmetic unit 25A with the distance-based torque change rate comparison/decision unit 21 being connected to the output of the distance-based steering-angle change rate comparator 29.

The distance-based steering-angle change rate comparator 29 is so designed that it ordinarily supplies the distance-based steering-angle change rate $d\theta/dL$ to the torque/steering-angle change rate arithmetic unit 25A to validate the arithmetic operation (division processing) of the torque/steering-angle change rate arithmetic unit 25A.

On the other hand, when the distance-based steering-angle change rate $d\theta/dL$ is smaller than the lower limit permissible value, the distance-based steering-angle change rate comparator 29 inhibits the division processing executed by the torque/steering-angle change rate arithmetic unit 25A by invalidating or disabling the torque/steering-angle change rate arithmetic unit 25A while outputting the result of the comparison (i.e., $d\theta/dL$<lower limit permissible value) to the distance-based torque change rate comparison/decision unit 21 to thereby enable the operation of the distance-based torque change rate comparison/decision unit 21.

The distance-based steering-angle change rate comparator 29 is comprised of a lower limit value setting means for setting the lower limit permissible value for the distance-based steering-angle change rate $d\theta/dL$ in dependence on the motor vehicle concerned and the vehicle speed v and a division arithmetic inhibiting means for inhibiting the division arithmetic operation executed by the torque/steering-angle change rate arithmetic unit 25A when the value of the distance-based steering-angle change rate $d\theta/dL$ becomes smaller than the lower limit permissible value.

On the other hand, the distance-based torque change rate comparison/decision unit 21 is comprised of a predetermined change rate setting means for setting a predetermined change rate for the distance-based torque change rate $dTa/dL$ in dependence on the motor vehicle concerned and a comparison means for comparing the distance-based torque change rate $dTa/dL$ with a predetermined change rate. Incidentally, the distance-based torque change rate comparison/decision unit 21 may be realized as a part of the motor vehicle behavior stability decision unit 5C.

In operation, when it is decided by the distance-based steering-angle change rate comparator 29 that the value of the distance-based steering-angle change rate $d\theta/dL$ is smaller than the lower limit permissible value, operation of the distance-based torque change rate comparison/decision unit 21 is validated in place of the torque/steering-angle change rate arithmetic unit 25A and the motor vehicle behavior stability decision unit 5C. In that case, the distance-based torque change rate comparison/decision unit 21 makes decision that the behavior of the motor vehicle is unstable when the distance-based torque change rate $dTa/dL$ is greater than the predetermined change rate value inclusive.

In general, when the absolute value of the distance-based steering-angle change rate $d\theta/dL$ of the motor vehicle is smaller than the lower limit permissible value and when that of the distance-based torque change rate $dTa/dL$ is smaller than the predetermined change rate value, then it can be determined that the motor vehicle is scarcely moving in the lateral or transverse direction and thus the motor vehicle is in the stable state.

On the other hand, if the absolute value of the distance-based torque change rate $dTa/dL$ reaches or exceeds the predetermined change rate value, it is then determined that the behavior of the motor vehicle is in the unstable state, even if the absolute value of the distance-based steering-angle change rate $d\theta/dL$ is smaller than the lower limit permissible value inclusive.

Furthermore, even if the distance-based steering-angle change rate $d\theta/dL$ is greater than the lower limit permissible value inclusive, the motor vehicle can be regarded as being in the stable state so far as the torque/steering-angle change rate $dTa/d\theta$ lies within the predetermined range. However, if the torque/steering-angle change rate $dTa/d\theta$ lies outside of the predetermined range, it is then determined that the motor vehicle is in the unstable state.

Referring to FIG. 29, the distance-based steering-angle change rate measuring unit 26 is designed to measure the distance-based steering-angle change rate $d\theta/dL$ while the distance-based torque change rate measuring unit 12 is designed to measure the distance-based torque change rate $dTa/dL$.

The distance-based steering-angle change rate comparator 29 outputs the result of the comparison to the torque/steering-angle change rate arithmetic unit 25A when the distance-based steering-angle change rate $d\theta/dL$ is greater than the lower limit permissible value inclusive while outputting the result of comparison to the distance-based torque change rate comparison/decision unit 21 when the distance-based steering-angle change rate $d\theta/dL$ is smaller than the lower limit permissible value.

The torque/steering-angle change rate arithmetic unit 25A is designed to divide the distance-based torque change rate $dTa/dL$ by the distance-based steering-angle change rate $d\theta/dL$ to thereby arithmetically determine the torque/steering-angle change rate $dTa/d\theta$ in accordance with the expression (9) mentioned previously.

Further, the distance-based torque change rate comparison/decision unit 21 is designed to decide that the behavior of the motor vehicle is in the instable state when the distance-based torque change rate $dTa/dL$ is greater than the predetermined change rate inclusive.

Figure 30:
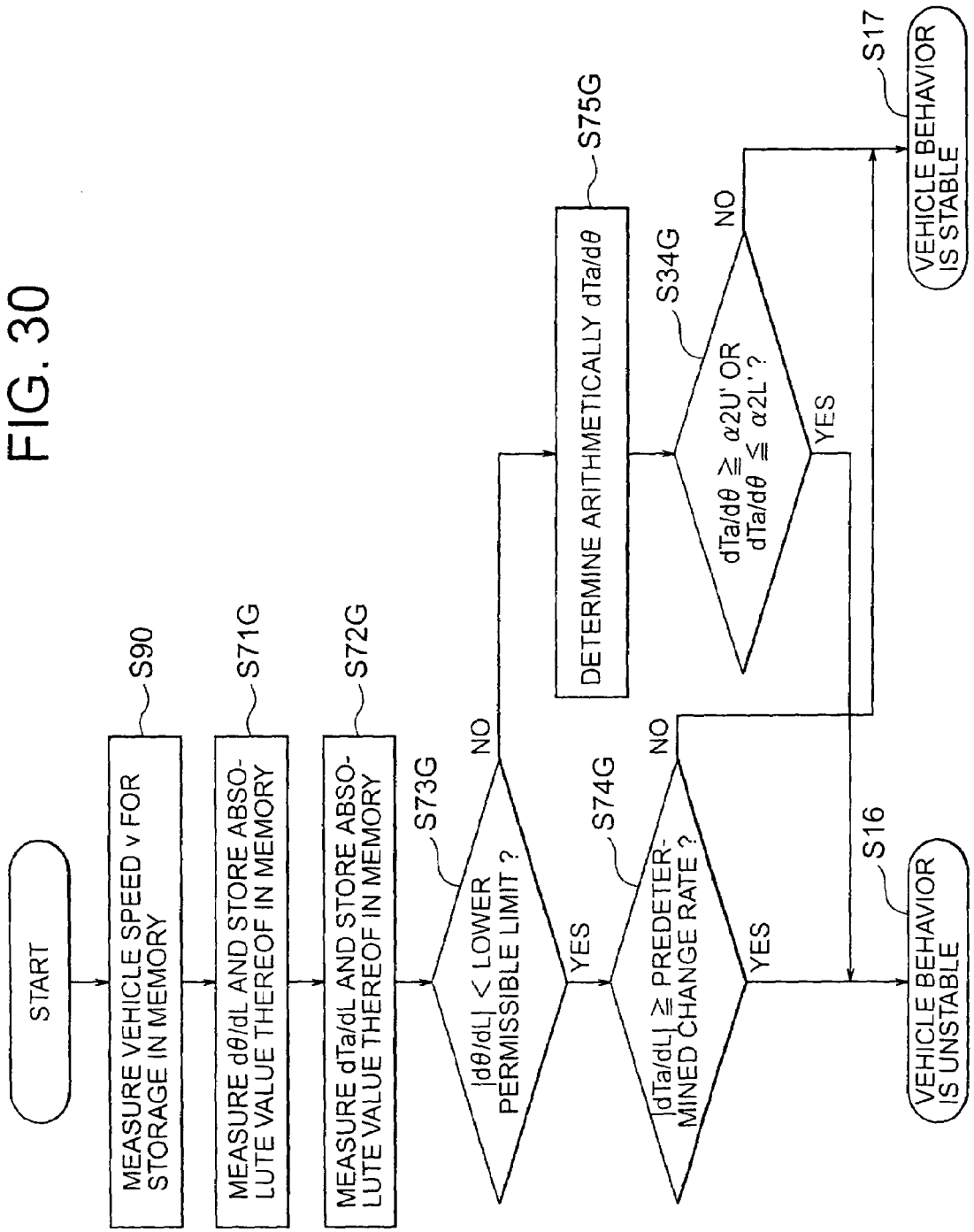
FIG. 30 is a flow chart for illustrating vehicle behavior decision operation performed by the motor vehicle state detecting system according to the fourteenth embodiment of the invention.

Next, referring to a flow chart shown in FIG. 30, description will be made of the operation performed by the motor vehicle state detecting system according to the fourteenth embodiment of the invention shown in FIG. 29. In FIG. 30, a step S90 represents the processings similar to those described hereinbefore and steps S71G to S75G and S34G correspond, respectively, to the steps S71 to S75 and S34 shown in FIG. 15.

At first, the vehicle speed v is measured and stored in a memory (step S90), while the distance-based steering-angle change rate $d\theta/dL$ is measured and the absolute value thereof is stored in the memory (step S71G). Further, the distance-based torque change rate $dTa/dL$ is measured and the absolute value thereof is stored in the memory (step S72G).

Subsequently, decision is made whether or not the absolute value of the distance-based steering-angle change rate $d\theta/dL$ is smaller than the lower limit permissible value in a step S73G. When it is determined that $|d\theta/dL|$<lower limit permissible value (i.e., when the step S73G is "YES"), then the distance-based torque change rate comparison/decision unit 21 is validated, whereon decision is made whether or not the absolute value of the distance-based torque change rate dTa/dL is greater than the above-mentioned predetermined change rate inclusive thereof in a step S74G.

When the decision step S74G results in that |dTa/dL|≧predetermined change rate, i.e., "YES", it is then determined that the behavior of the motor vehicle is in the unstable state (step S16), while it is decided that the motor vehicle is in the stable state (step S17) when |dTa/dL|<predetermined change rate, i.e., when the step S74G is "NO", whereon the processing routine shown in FIG. 30 comes to an end.

On the other hand, when the decision steps S73G results in that |dθ/dL|≧lower limit permissible value, i.e., "NO", then the torque/steering-angle change rate arithmetic unit 25A is put into operation to arithmetically determine the torque/steering-angle change rate dTa/dθ (step S75G). In succession, it is checked by the motor vehicle behavior stability decision unit 5C in a step S34G whether or not the torque/steering-angle change rate dTa/dθ lies outside of the predetermined range (refer to the expression (7) mentioned previously).

Finally, in dependence on whether or not the torque/steering-angle change rate dTa/dθ lies outside of the predetermined range, the unstable state or the stable state of the behavior of the motor vehicle is decided (step S16 or S17).

As is apparent from the above, according to the teaching of the invention incarnated in the instant embodiment, the division arithmetic performed by the torque/steering-angle change rate arithmetic unit 25A is inhibited when the value of the distance-based steering-angle change rate dθ/dL is smaller than the lower limit permissible value, and the state of the motor vehicle is determined on the basis of only the distance-based torque change rate dTa/dL.

By virtue of this feature, occurrence of overflow due to the division arithmetic processing executed by the torque/steering-angle change rate arithmetic unit 25A can be suppressed while detection of the unstable state of the motor vehicle can be ensured.

Embodiment 15

In the case of the motor vehicle state detecting system according to the first embodiment of the invention, the actual alignment torque Ta is used as the actual measured value of the second parameter. In the motor vehicle state detecting system according to a fifteenth embodiment of the present invention, actual transverse acceleration Gy which acts on the motor vehicle is used.

Figure 31:
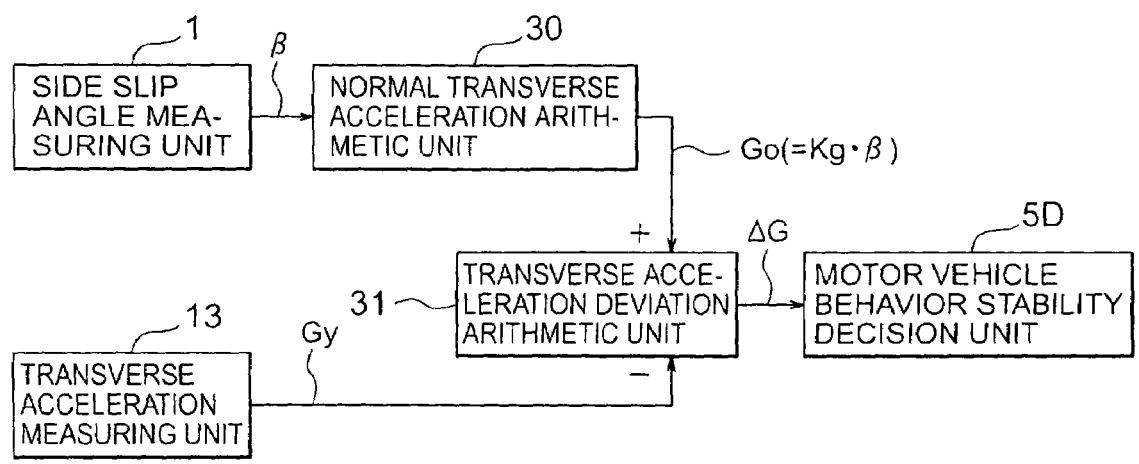
FIG. 31 is a block diagram showing schematically a major portion of the motor vehicle state detecting system according to a fifteenth embodiment of the present invention.

FIG. 31 is a schematic block diagram showing generally a major portion of the motor vehicle state detecting system according to the fifteenth embodiment of the invention in which the actual transverse acceleration Gy is used instead of the actual alignment torque Ta.

In the figure, the components same as or equivalent to those described hereinbefore by reference to FIGS. 1 and 10 are denoted by like reference symbols and components corresponding to those described previously are affixed with "D" in succession to the symbols.

In the motor vehicle state detecting system according to the instant embodiment of the invention, a transverse acceleration measuring unit 13 is disposed for detecting the actual transverse acceleration Gy instead of the alignment torque measuring unit 3 mentioned hereinbefore.

The transverse acceleration measuring unit 13 which constitutes a second detecting means is designed to detect the actual transverse acceleration Gy which is applied to the motor vehicle from the road surface in the course of running of the motor vehicle as an actual measured value of the second parameter.

A normal transverse acceleration arithmetic unit 30 which constitutes a normal value arithmetic means includes an acceleration/slip-angle ratio setting means (not shown) for setting an acceleration/slip-angle ratio (=gain Kg) and serves for arithmetically determining a normal transverse acceleration Go on the basis of the actual side slip angle β and the gain Kg.

The acceleration/slip-angle ratio setting means incorporated in the normal transverse acceleration arithmetic unit 30 serves to set in advance a ratio of the transverse acceleration Gy to the side slip angle β of the motor vehicle as the acceleration/slip-angle ratio (gain Kg) in dependence on the type of the motor vehicle concerned.

Thus, the normal transverse acceleration arithmetic unit 30 is capable of arithmetically determining the normal transverse acceleration Go (=Kg·β) for the actual side slip angle β by multiplying the actual side slip angle β by the gain Kg.

Further, a transverse acceleration deviation arithmetic unit 31 is provided which is so designed as to arithmetically determine as a third parameter an absolute value of a deviation of the actual transverse acceleration Gy from the normal transverse acceleration Go (i.e., error or difference between the normal transverse acceleration Go and the actual transverse acceleration Gy). More specifically, the transverse acceleration deviation arithmetic unit 31 determines the acceleration deviation ΔG in accordance with ΔG=|Go−Gy|.

Further provided is a motor vehicle behavior stability decision unit 5D which includes a reference value setting means and a comparison means. The reference value setting means incorporated in the motor vehicle behavior stability decision unit 5D sets previously a predetermined deviation quantity α3 serving as a reference value for comparison with the acceleration deviation ΔG in dependence on the motor vehicle concerned.

The comparison means incorporated in the motor vehicle behavior stability decision unit 5D serves to compare the deviation ΔG of acceleration with a predetermined deviation quantity α3 to thereby decide that the behavior of the motor vehicle is unstable when the acceleration deviation ΔG is greater than the predetermined deviation quantity α3 inclusive thereof. The result of this decision is outputted as an unstable state detection signal.

Figure 33:
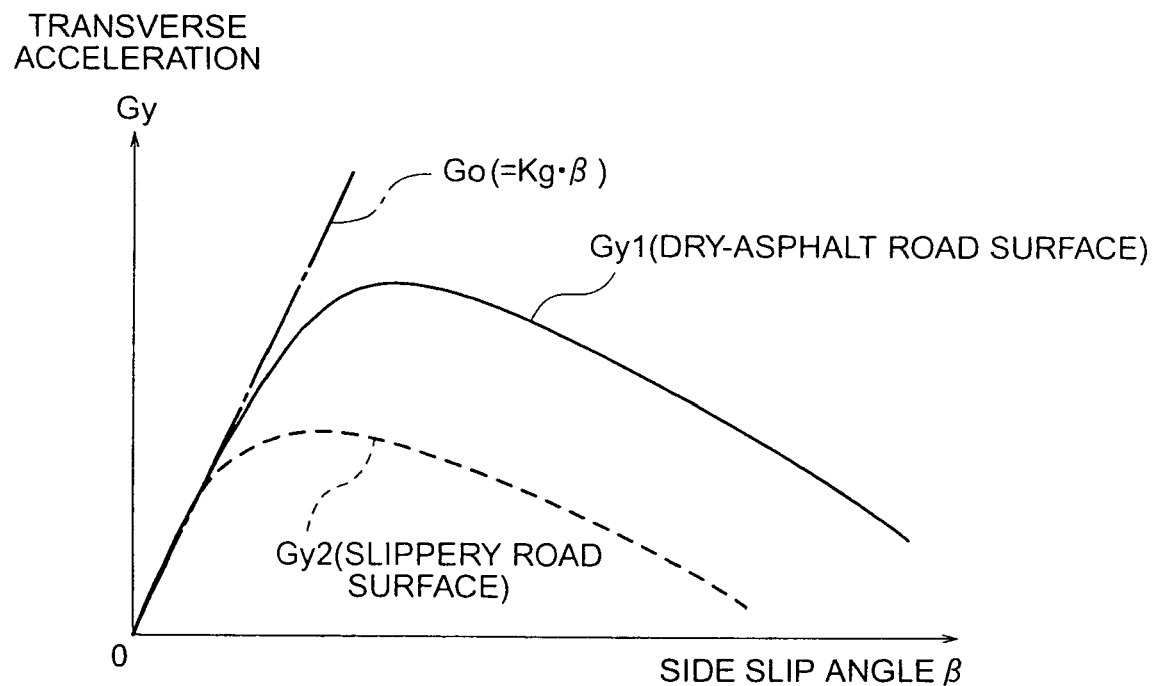
FIG. 33 is a characteristic diagram for graphically illustrating characteristic of a transverse acceleration for a side slip angle when a friction coefficient of a road surface changes in the system according to the fifteenth embodiment of the invention.

In general, the transverse acceleration Gy acting on the motor vehicle bears approximately a proportional relation to the side slip angle β so long as the motor vehicle is in the stable running state, as illustrated in FIG. 33. However, when the running state of the motor vehicle approaches to a stability limit, magnitude of the transverse acceleration Gy decreases for the reason described hereinbefore, rendering it impossible to sustain the above-mentioned proportional relation to the side slip angle β. Accordingly, by taking advantage of this feature, it is possible to detect the state of the motor vehicle on the basis of the transverse acceleration Gy and the side slip angle β.

In FIG. 31, the side slip angle measuring unit 1 is designed to measure the actual side slip angle β, while the transverse acceleration measuring unit 13 is designed to detect the transverse acceleration Gy. The detected values outputted from these units 1 and 13 are stored in the memory. On the other hand, the normal transverse acceleration arithmetic unit 30 is designed to arithmetically determine a normal transverse acceleration Go (=Kg·β) set in dependence on the side slip angle β on the basis of the gain Kg for the side slip angle β.

Further provided is a transverse acceleration deviation arithmetic unit 31 which is so designed as to arithmetically determine an absolute value of deviation of the actual transverse acceleration Gy from the normal transverse acceleration Go (=Kg·β) (i.e., error or difference between the normal transverse acceleration Go and the actual transverse acceleration Gy). The motor vehicle behavior stability decision unit 5D is designed to set a predetermined deviation quantity α3 serving as a reference for comparison and determine that the behavior of the motor vehicle is unstable when the actual transverse acceleration deviation ΔG is greater than the predetermined deviation quantity α3 inclusive, i.e., when the condition given by the undermentioned expression (10) is satisfied.

$$|Kg·β-Gy| \geq α3 \qquad (10)$$

Figure 32:
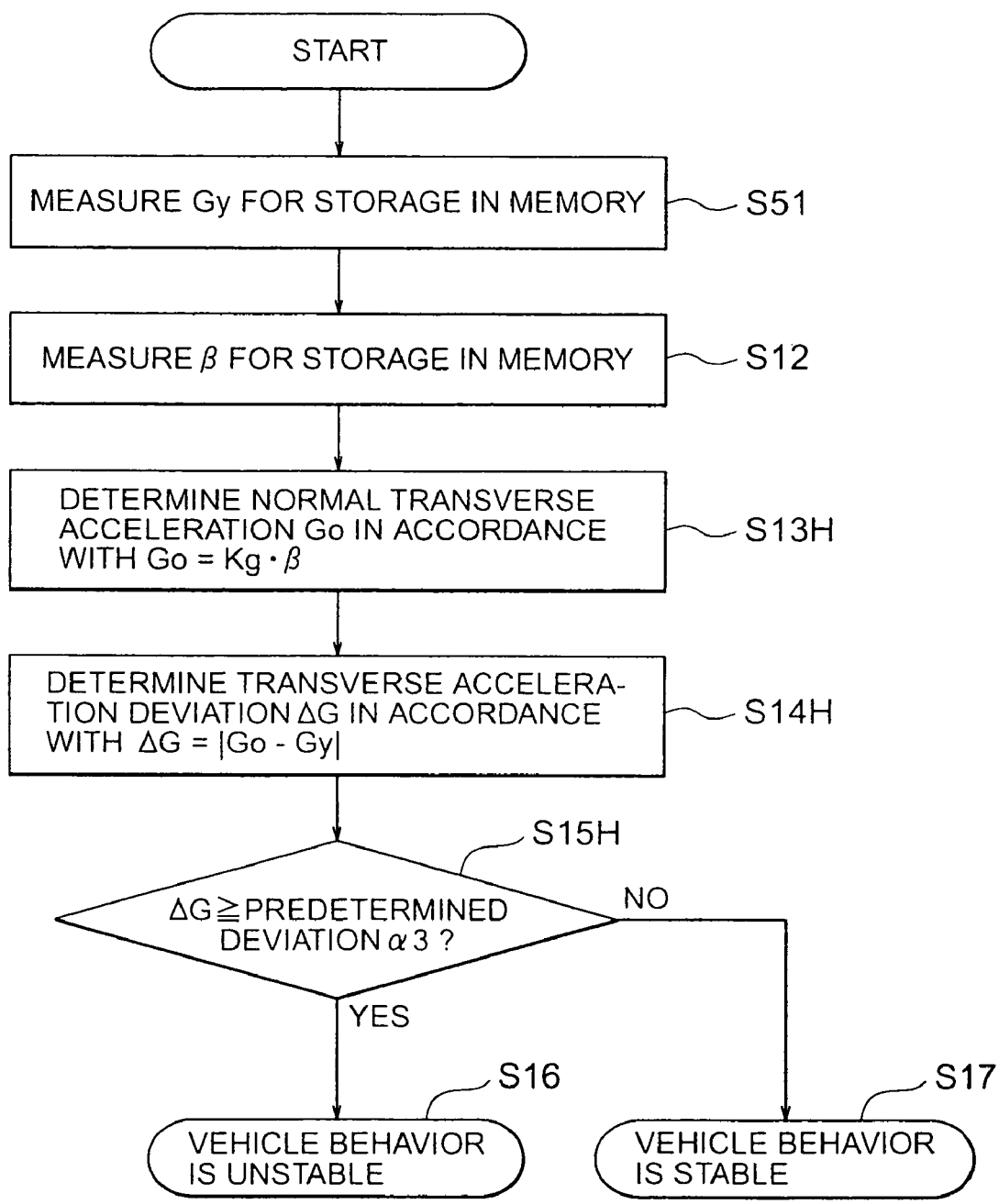
FIG. 32 is a flow chart for illustrating vehicle behavior decision operation performed by the motor vehicle state detecting system according to the fifteenth embodiment of the invention.

Next, description will be made of the operation performed by the motor vehicle state detecting system according to the fifteenth embodiment of the invention by reference to a flow chart shown in FIG. 32 together with FIG. 31. In FIG. 32, processing steps which are same as those described hereinbefore by reference to FIGS. 2 and 11 are denoted by like reference symbols while the processing steps which correspond to those shown in FIGS. 2 and 11 are denoted by like reference symbols affixed with "H".

Referring to FIG. 32, the actual transverse acceleration Gy is firstly measured by the transverse acceleration measuring unit 13 and the value of the actual transverse acceleration as measured is stored in a memory incorporated in the transverse acceleration deviation arithmetic unit 31 (step S51). On the other hand, the actual side slip angle β is measured by the side slip angle measuring unit 1. The value of the actual side slip angle as measured is then stored in a memory incorporated in the normal transverse acceleration arithmetic unit 30 (step S12).

In succession, the normal transverse acceleration arithmetic unit 30 multiplies the actual side slip angle β by the gain Kg of the transverse acceleration Gy for the side slip angle β to thereby arithmetically determine the normal transverse acceleration Go (step S13H).

Subsequently, the actual transverse acceleration Gy is subtracted from the normal transverse acceleration Go by means of the transverse acceleration deviation arithmetic unit 31, whereon the absolute value of the difference between the actual transverse acceleration Gy and the normal transverse acceleration Go is arithmetically derived as the transverse acceleration deviation ΔG (step S14H).

Finally, the transverse acceleration deviation ΔG and the predetermined deviation quantity α3 preset in dependence on the motor vehicle concerned are compared with each other by means of the motor vehicle behavior stability decision unit 5D, whereon decision is made whether the condition given by the expression (10), i.e., ΔG≥α3, is satisfied or not (step S15H).

When it is decided in the step S15H that ΔG≥α3 (i.e., "YES"), it is determined in a step S16 that the behavior of the motor vehicle is unstable, whereas when it is found in the step S15H that ΔG<α3 (i.e., "NO"), it is then determined that the behavior of the motor vehicle is stable (step S17), whereon the processing routine shown in FIG. 32 comes to an end.

As can be understood from the above, by detecting the unstable state of the motor vehicle behavior on the basis of the side slip angle β and the actual transverse acceleration Gy, it is possible to effectively detect the unstable state of the motor vehicle behavior even in the situation in which the grip force of the tire has been reduced, as is the case with the embodiments described hereinbefore.

FIG. 33 is a characteristic diagram for graphically illustrating in what manner the actual transverse acceleration (Gy) changes as a function of the side slip angle (β). This figure corresponds to FIGS. 3 and 20 mentioned hereinbefore.

In FIG. 33, the side slip angle β is taken along the abscissa while the actual transverse acceleration Gy is taken along the ordinate. Further, a single-dotted line curve represents the normal transverse acceleration Go, a solid line curve represents an actual transverse acceleration Gy1 when the motor vehicle is running on a dry asphalt road, and a broken line curve represents an actual transverse acceleration Gy2 when the motor vehicle is traveling on a slippery road surface.

As can be seen in FIG. 33, the characteristic curve (see broken line curve) representing the actual transverse acceleration Gy2 on the slippery road surface begins to fall at the actual side slip angle β of a smaller value when compared with the actual transverse acceleration Gy1 on the dry asphalt road surface represented by the solid line characteristic curve. However, in a range where the side slip angle β is much smaller than the value mentioned above, linearity of the actual transverse acceleration Gy2 on the slippery road surface which substantially conforms to the normal transverse acceleration Go is sust_ned similarly to the normal transverse acceleration Go.

Thus, it is safe to say that in the range or region where the value of the side slip angle β is sufficiently small, there can be made use of the gain (the slope of the curve Go in FIG. 33) for the side slip angle β of the normal transverse acceleration Go preset in dependence on the motor vehicle concerned.

More specifically, even though the transverse acceleration Gy and the side slip angle β bear at least approximately the proportional relation to each other in the range within which the side slip angle β is small, the transverse acceleration Gy becomes small as the side slip angle β increases. Thus, by taking advantage of this feature, it is possible to arithmetically determine the normal value on the basis of the straight-line slope (slope of Go) and the side slip angle β in the range where the value of the side slip angle β is small to thereby identify the unstable state of the motor vehicle behavior when the deviation of the measured value from the normal value increases (i.e., when the slope of the transverse acceleration Gy for the side slip angle β differs remarkably from the slope of the approximate straight line).

In this manner, the unstable state of the motor vehicle behavior or the prognostic sign thereof in the slip/locked state of tires which could not be detected with the conventional apparatus can be determined by detecting the actual transverse acceleration Gy and the side slip angle β actually taking place to thereby arithmetically determine the normal transverse acceleration Go and by comparing the actual transverse acceleration Gy with the normal transverse acceleration Go.

In this conjunction, it should be added that even in the case where it is impossible to measure the actual alignment torque Ta of the motor vehicle, the unstable state of the motor vehicle behavior or the prognostic sign thereof can be detected on the basis of the transverse acceleration Gy and the side slip angle β.

Embodiment 16

In the case of the motor vehicle state detecting system according to the fifteenth embodiment of the invention, the normal transverse acceleration Go is arithmetically determined by using the acceleration/slip-angle ratio (gain Kg) to make decision that the motor vehicle is in the unstable state when the deviation ΔG of the actual transverse acceleration Gy from the normal transverse acceleration Go is greater than the predetermined value α3 inclusive thereof. In the motor vehicle state detecting system according to a sixteenth embodiment of the present invention, such arrangement is adopted that a change rate dGy/dβ of the actual transverse acceleration Gy for the side slip angle β is arithmetically determined (or alternatively measured) to thereby determine that the motor vehicle is in the unstable state when the acceleration/slip-angle change rate dGy/dβ departs from a predetermined range.

Figure 34:
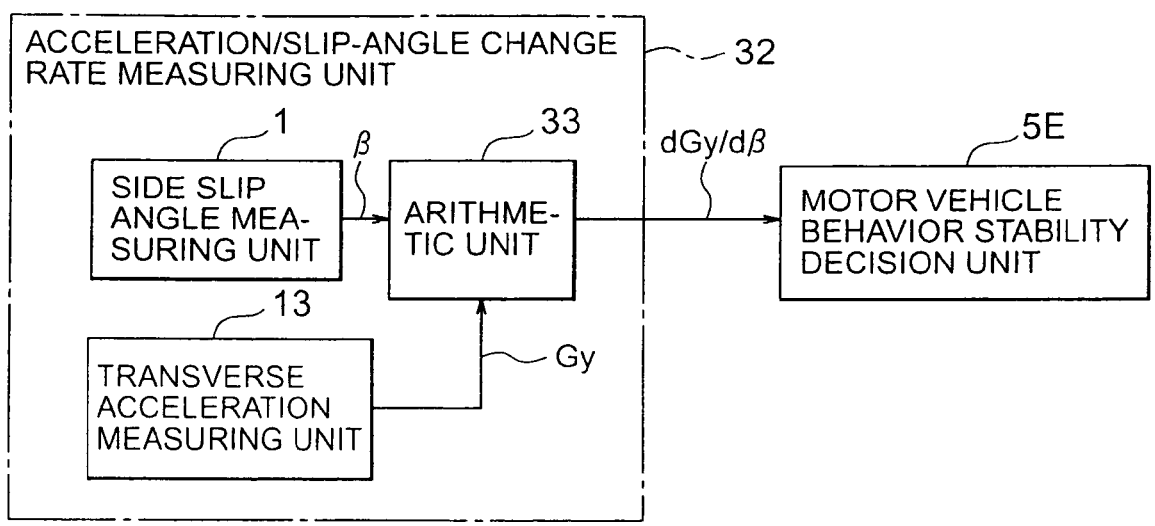
FIG. 34 is a block diagram showing schematically a major portion of the motor vehicle state detecting system according to a sixteenth embodiment of the present invention.

FIG. 34 is a schematic block diagram showing generally a major portion of the motor vehicle state detecting system according to the sixteenth embodiment of the invention which is so arranged as to make decision concerning the stability of behavior of the motor vehicle on the basis of comparison between the acceleration/slip-angle change rate dGy/dβ and the predetermined range. Incidentally, components same as or equivalent to those described hereinbefore are denoted by like reference symbols affixed with "E" as the case may be. Repeated description in detail of those components will be omitted.

Now, referring to FIG. 34, reference numeral 32 denotes an acceleration/slip-angle change rate measuring unit which is comprised of the side slip angle measuring unit 1, the transverse acceleration measuring unit 13 and an arithmetic unit 33. The arithmetic unit 33 is designed to arithmetically determine (or alternatively measure) the rate of change of the actual transverse acceleration Gy for the actual side slip angle β in terms of the acceleration/slip-angle change rate dGy/dβ.

The acceleration/slip-angle change rate dGy/dβ arithmetically determined by the arithmetic unit 33 incorporated in the acceleration/slip-angle change rate measuring unit 32 is inputted to a motor vehicle behavior stability decision unit 5E to be used in making decision as to the stability of behavior of the motor vehicle.

The motor vehicle behavior stability decision unit 5E includes a predetermined range setting means which is designed to set a predetermined range as a reference for the comparison with the acceleration/slip-angle change rate dGy/dβ in dependence on the type of the motor vehicle concerned. When the acceleration/slip-angle change rate dGy/dβ departs from the predetermined range, the motor vehicle behavior stability decision unit 5E determines that the behavior of the motor vehicle is unstable.

In general, the actual transverse acceleration Gy bears at least approximately a proportional relation to the actual side slip angle β so long as the motor vehicle is in the stable running state, as described previously in conjunction with FIG. 33. However, when the behavior of the motor vehicle approaches to the stability limit mentioned hereinbefore, magnitude of the actual transverse acceleration Gy decreases to a level where the proportional relation to the actual side slip angle β can no more be maintained. By taking advantage of this feature, it is possible to make decision as to the state of the motor vehicle.

The arithmetic unit 33 incorporated in the acceleration/slip-angle change rate measuring unit 32 may, for example, be designed to determine the acceleration/slip-angle change rate dGy/dβ by measuring the actual transverse acceleration Gy in correspondence to the side slip angle β actually measured.

The motor vehicle behavior stability decision unit 5E compares the acceleration/slip-angle change rate dGy/dβ with a predetermined range preset in dependence on the type of the motor vehicle concerned, to thereby determine that the behavior of the motor vehicle is unstable when the acceleration/slip-angle change rate dGy/dβ lies outside of the predetermined range. Mathematically, this decision can be expressed as follows:

$$dGy/d\beta \geq \alpha 4U \text{ or } dGy/d\beta \leq \alpha 4L \tag{11}$$

Figure 35:
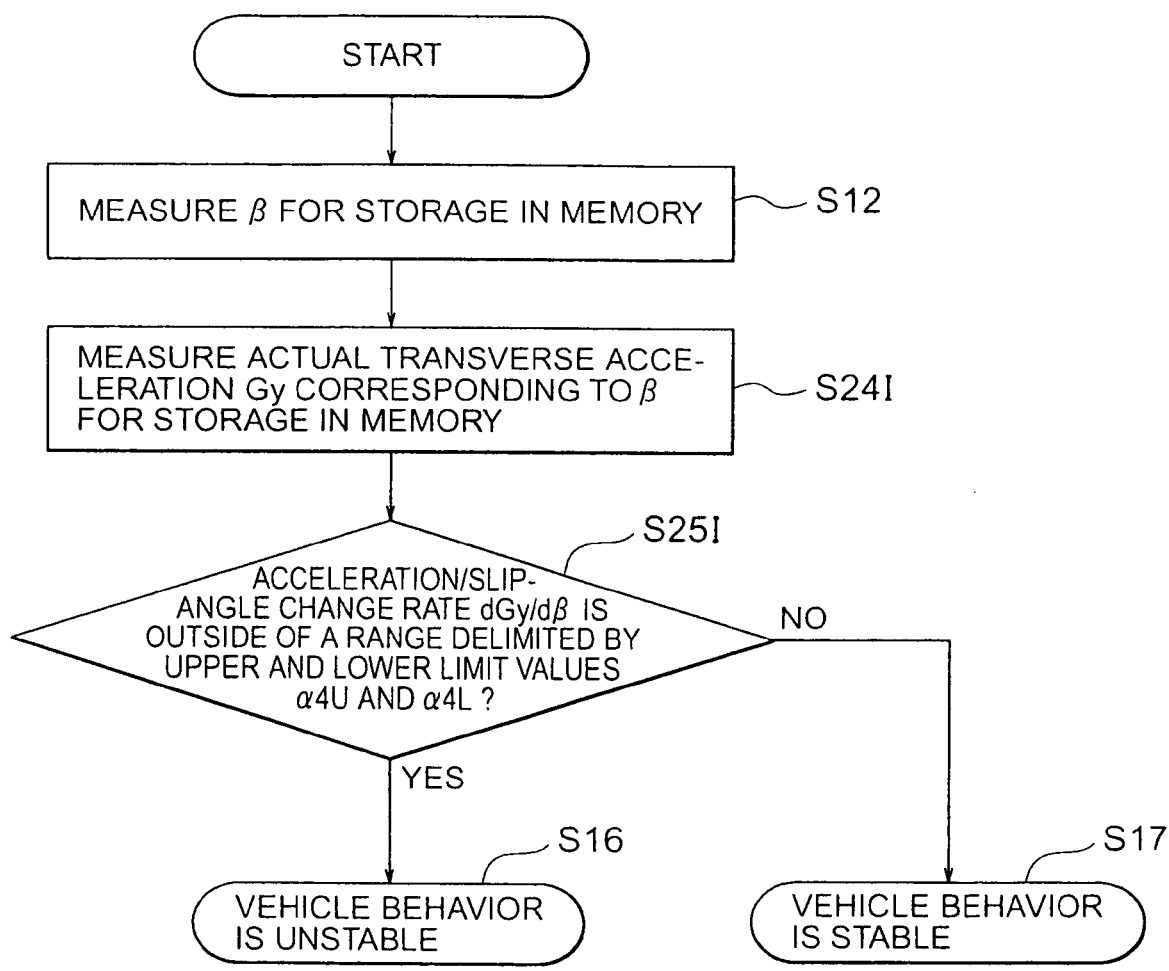
FIG. 35 is a flow chart for illustrating vehicle behavior decision operation performed by the motor vehicle state detecting system according to the sixteenth embodiment of the invention.

Next, referring to a flow chart shown in FIG. 35, description will be made of the operation performed by the motor vehicle state detecting system according to the sixteenth embodiment of the invention. In FIG. 35, the steps S12, S16 and S17 represent the processings similar to those described hereinbefore by reference to FIG. 5. Further, steps S24I and S25I correspond to the steps S24 and S25 described hereinbefore.

At first, the actual side slip angle β is measured to be stored in a memory in a step S12, which is then followed by a step S24I where the acceleration/slip-angle change rate dGy/dβ corresponding to the actual side slip angle β is measured to be stored in the memory as well.

In succession, in a step S25I, the motor vehicle behavior stability decision unit 5E fetches the acceleration/slip-angle change rate dGy/dβ to make decision whether or not the acceleration/slip-angle change rate dGy/dβ departs from the predetermined range defined by the upper limit value α4U and the lower limit value α4L, respectively.

When it is determined in the step S25I that the acceleration/slip-angle change rate dGy/dβ departs from the predetermined range (i.e., "YES"), it is determined in a step S16 that the behavior of the motor vehicle is unstable (or that a prognostic sign thereof exists). By contrast, when it is found in the step S25I that the acceleration/slip-angle change rate dGy/dβ lies within the predetermined range (i.e., "NO"), it is then determined that the behavior of the motor vehicle is stable (step S17), whereupon the processing routine shown in FIG. 35 comes to an end.

As is obvious from the above, by detecting the unstable state of the motor vehicle behavior on the basis of the side slip angle β and the actual transverse acceleration Gy really taking place in the motor vehicle concerned, it is possible to detect effectively the unstable state of the motor vehicle behavior even in the situation where the grip force of tire is reduced.

As described previously by reference to FIG. 33, the actual transverse acceleration Gy which acts on the motor vehicle running on the slippery road surface is low when the actual side slip angle β is relatively small. However, in the region where the actual side slip angle β is further lessened, linearity which conforms to the slope of the normal transverse acceleration Go is sustained. Thus, the range of the acceleration/slip-angle change rate (gain) of the normal transverse acceleration Go can be used for making decision concerning the stability of the motor vehicle behavior as is with the case of the motor vehicle running on a dry-asphalt (not slippery) road surface.

Embodiment 17

In the motor vehicle state detecting system according to the sixteenth embodiment of the invention, the acceleration/slip-angle change rate measuring unit 32 is employed for determining the acceleration/slip-angle change rate dGy/dβ. In the case of the motor vehicle state detecting system according to a seventeenth embodiment of the present invention, time-based change rates of the actual side slip angle β and the actual transverse acceleration Gy, respectively, are measured and subjected to division processing for thereby determining the acceleration/slip-angle change rate dGy/dβ.

Figure 36:
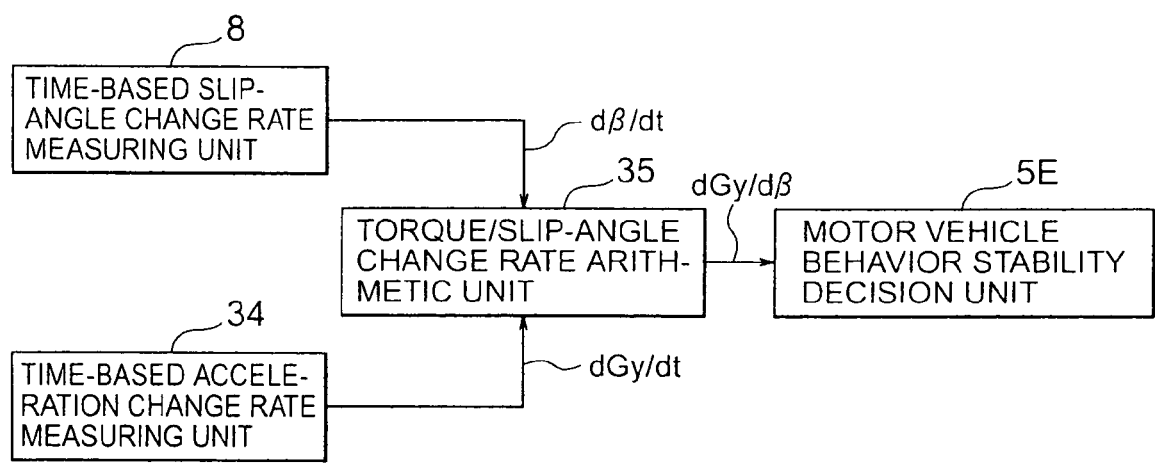
FIG. 36 is a block diagram showing schematically a major portion of the motor vehicle state detecting system according to a seventeenth embodiment of the present invention.

FIG. 36 is a block diagram showing generally and schematically a major portion of the motor vehicle state detecting system according to the seventeenth embodiment of the invention in which the acceleration/slip-angle change rate dGy/dβ is determined on the basis of the time-based change rates of the actual side slip angle β and the actual transverse acceleration Gy, respectively.

Referring to FIG. 36, an arithmetic means for determining a parameter for the decision of the stability of the motor vehicle behavior is comprised of a time-based slip-angle change rate measuring unit 8 for determining the time-based slip-angle change rate dβ/dt, a time-based acceleration change rate measuring-unit 34 for determining the time-based change rate of the actual transverse acceleration Gy in the form of dGy/dt (i.e., the time-based acceleration change rate) and an acceleration/slip-angle change rate arithmetic unit 35 for arithmetically determining the acceleration/slip-angle change rate dGy/dβ by dividing the time-based acceleration change rate dGy/dt by the time-based slip-angle change rate dβ/dt.

Now, referring to FIG. 36, operation of the motor vehicle state detecting system according to the instant embodiment of the invention will be described.

As described hereinbefore, the motor vehicle behavior stability decision unit 5E is designed to determine the state of the motor vehicle by taking advantage of the feature that the proportional relation of the actual transverse acceleration Gy relative to the actual side slip angle β can no more be sustained or held when the actual transverse acceleration Gy approaches to the stability limit of the motor vehicle.

The time-based slip-angle change rate measuring unit 8 is designed to measure the time-based slip-angle change rate dβ/dt, while the time-based acceleration change rate measuring unit 34 is designed to arithmetically determine the time-based acceleration change rate dGy/dt by measuring the actual transverse acceleration Gy at a predetermined time interval.

The time-based acceleration change rate measuring unit 34 may be constituted by a load cell or the like mounted on the steering column for measuring the transverse acceleration periodically at a predetermined time interval.

The acceleration/slip-angle change rate arithmetic unit 35 is designed to divide the time-based acceleration change rate dGy/dt by the time-based slip-angle change rate dβ/dt to thereby arithmetically determine the ratio of the change rate of the actual transverse acceleration Gy to that of the actual slip angle β (i.e., the acceleration/slip-angle change rate dGy/dβ) in accordance with the undermentioned expression (12):

$$(dGy/dt)/(d\beta/dt)=dGy/d\beta \quad (12)$$

The motor vehicle behavior stability decision unit 5E determines that the behavior of the motor vehicle is in the unstable state or the prognostic state thereof when the acceleration/slip-angle change rate dGy/dβ is outside of a predetermined range (see the expression (11) mentioned previously), to output an unstable state detection signal.

Figure 37:
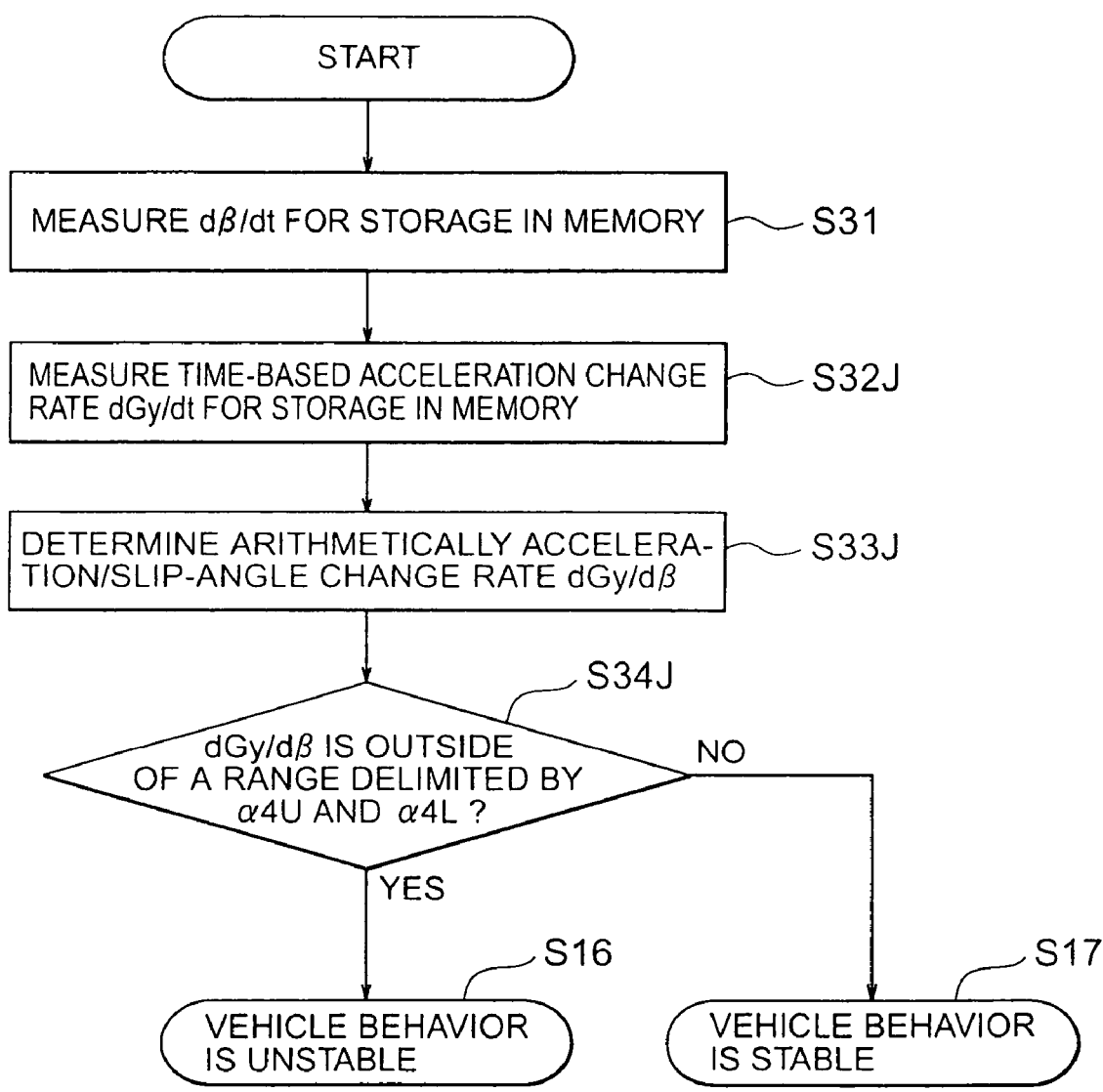
FIG. 37 is a flow chart for illustrating vehicle behavior decision operation performed by the motor vehicle state detecting system according to the seventeenth embodiment of the invention.

Next, referring to a flow chart shown in FIG. 37, description will be directed to the vehicle state decision operation performed by the motor vehicle state detecting system according to the seventeenth embodiment of the invention shown in FIG. 36. In FIG. 37, the steps S31, S16 and S17 represent the processings similar to those described hereinbefore by reference to FIG. 7. Further, processings in steps S32J to S34J correspond to those executed in the steps S32 to S34 described hereinbefore.

At first, the time-based slip-angle change rate dβ/dt is measured to be stored in a memory in the step S31. Succeedingly, the time-based acceleration change rate dGy/dt is measured in the step S32J to be stored in the memory.

Subsequently, in the step S33J, the time-based acceleration change rate dGy/dt is divided by the time-based slip-angle change rate dβ/dt to determine the acceleration/slip-angle change rate dGy/dβ, whereon the acceleration/slip-angle change rate dGy/dβ is compared with the predetermined range (delimited by the upper limit value α4U and the lower limit value α4L, respectively) in the step S34J.

When the acceleration/slip-angle change rate dGy/dβ lies outside of the predetermined range, it is decided that the behavior of the motor vehicle is unstable (step S16), whereas it is decided that the behavior of the motor vehicle is stable when the acceleration/slip-angle change rate dGy/dβ falls within the predetermined range mentioned above (step S17).

In this manner, by computing the acceleration/slip-angle change rate dGy/dβ from the time-based change rate of the actual transverse acceleration Gy and that of the actual side slip angle β, there can be achieved advantageous action and effect similar to those of the embodiments described hereinbefore.

At this juncture, it should further be added that even in the case where it is impossible to directly measure (or determine arithmetically) the acceleration/slip-angle change rate dGy/dβ, this change rate can arithmetically be derived from the time-based change rates of the actual transverse acceleration Gy and the actual side slip angle β, respectively.

Embodiment 18

In the case of the motor vehicle state detecting system according to the seventeenth embodiment of the invention, the time-based change rates of the actual side slip angle β and the actual transverse acceleration Gy, respectively, are used for arithmetically determining the acceleration/slip-angle change rate dGy/dβ. In the motor vehicle state detecting system according to an eighteenth embodiment of the present invention, change rates of the actual side slip angle β and the actual transverse acceleration Gy, respectively, for the travel distance of the motor vehicle (i.e., distance the motor vehicle has traveled) are used.

Figure 38:
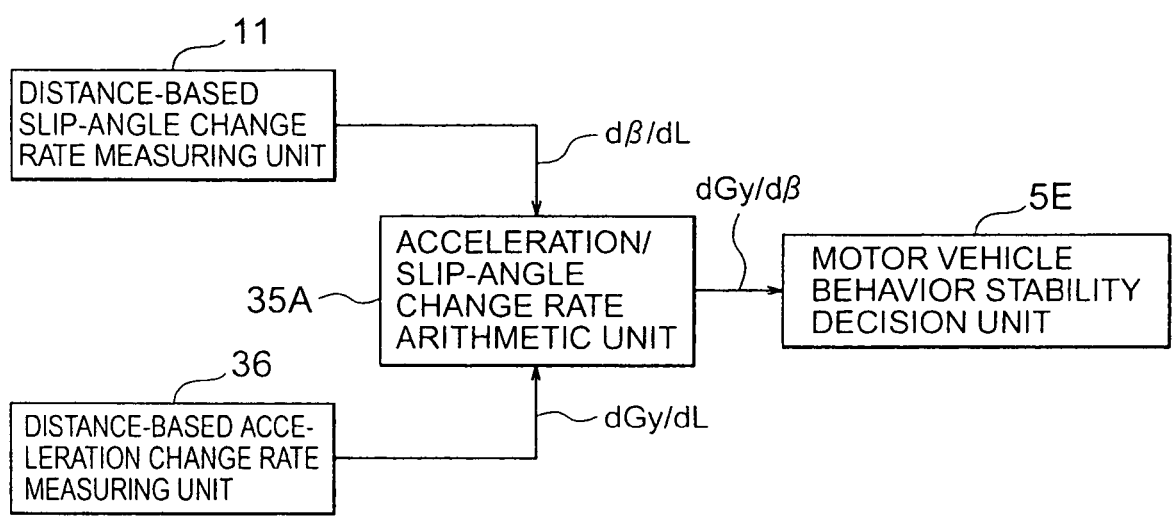
FIG. 38 is a block diagram showing schematically a major portion of the motor vehicle state detecting system according to an eighteenth embodiment of the present invention.

FIG. 38 is a block diagram showing generally and schematically a major portion of the motor vehicle state detecting system according to the eighteenth embodiment of the invention in which there are used the change rates of the actual side slip angle β and the actual transverse acceleration Gy, respectively, for the travel distance of the motor vehicle (i.e., the distance-based slip-angle change rate and the distance-based acceleration change rate).

In FIG. 38, reference numeral 11 denotes a distance-based slip-angle change rate measuring unit and numeral 5E denotes a motor vehicle behavior stability decision unit which is similar to those described hereinbefore in conjunction with FIGS. 8 and 36. An acceleration/slip-angle change rate arithmetic unit 35A corresponds to the acceleration/slip-angle change rate arithmetic unit 35 shown in FIG. 36.

In the case of the instant embodiment of the invention, the arithmetic means for determining the parameter for stability decision is comprised of a distance-based slip-angle change rate measuring unit 11 for determining the distance-based slip-angle change rate $d\beta/dL$, a distance-based acceleration change rate measuring unit 36 for determining the change rate of the actual transverse acceleration Gy for the travel distance L (i.e., the distance-based acceleration change rate) $dGy/dL$, and a acceleration/slip-angle change rate arithmetic unit 35A for arithmetically determining the acceleration/slip-angle change rate $dGy/d\beta$ by dividing the distance-based acceleration change rate $dGy/dL$ by the distance-based slip-angle change rate $d\beta/dL$.

The distance-based acceleration change rate measuring unit 36 may be constituted by mounting an accelerometer in the transverse direction of the motor vehicle for measuring the actual transverse acceleration Gy periodically every predetermined travel distance.

Now, referring to FIG. 38, operation of the motor vehicle state detecting system according to the eighteenth embodiment of the invention will be described.

The distance-based slip-angle change rate measuring unit 11 arithmetically determines the distance-based slip-angle change rate $d\beta/dL$ while the distance-based acceleration change rate measuring unit 36 arithmetically determines the distance-based acceleration change rate $dGy/dL$ by measuring the actual transverse acceleration Gy every predetermined travel distance.

The acceleration/slip-angle change rate arithmetic unit 35A is designed to divide the distance-based acceleration change rate $dGy/dL$ by the distance-based slip-angle change rate $d\beta/dL$ to thereby determine the acceleration/slip-angle change rate $dGy/d\beta$ in accordance with the undermentioned expression (13):

$$(dGy/dL)/(d\beta/dL)=dGy/d\beta \qquad (13)$$

Further, the motor vehicle behavior stability decision unit 5E is designed to check whether or not the acceleration/slip-angle change rate $dGy/d\beta$ falls within a predetermined range, as described hereinbefore and decide that the behavior of the motor vehicle is unstable when the acceleration/slip-angle change rate $dGy/d\beta$ is outside of the predetermined range (refer to the expression (11) mentioned previously).

Figure 39:
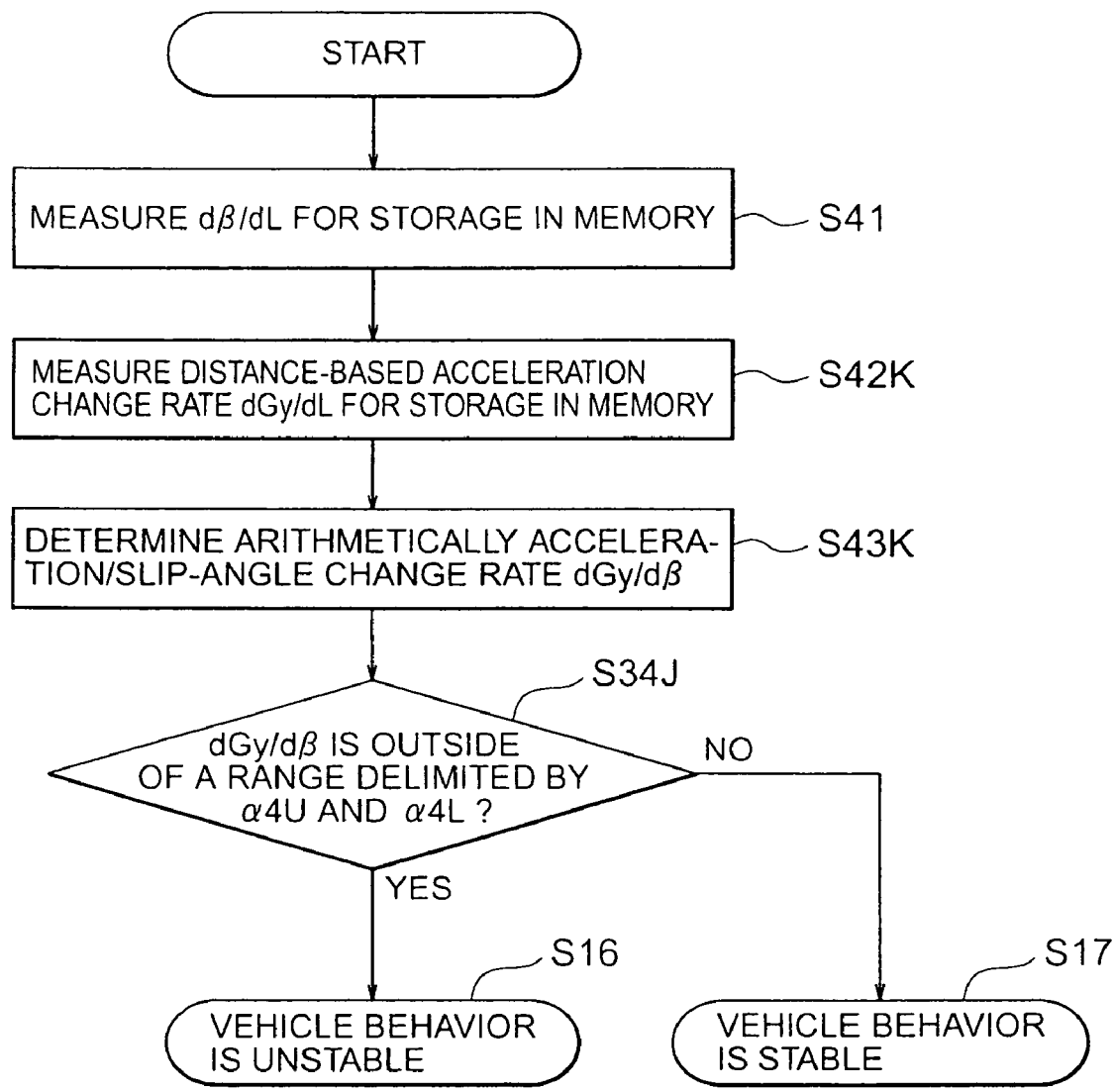
FIG. 39 is a flow chart for illustrating vehicle behavior decision operation performed by the motor vehicle state detecting system according to the eighteenth embodiment of the invention.

Next, referring to a flow chart shown in FIG. 39, description will be made of operation performed by the motor vehicle state detecting system according to the eighteenth embodiment of the invention shown in FIG. 38. In FIG. 39, the steps S41, S16, S17 and S34J represent the processings similar to those described hereinbefore by reference to FIGS. 9 and 37 and processings in steps S42K and S43K correspond to those executed in the steps S42 and S43 shown in FIG. 9.

At first, the distance-based slip-angle change rate $d\beta/dL$ is measured to be stored in a memory in a step S41. Subsequently, the distance-based acceleration change rate $dGy/dL$ is measured to be stored in the memory (step S42K).

Subsequently, the distance-based acceleration change rate $dGy/dL$ is divided by the distance-based slip-angle change rate $d\beta/dL$ to thereby determine the acceleration/slip-angle change rate $dGy/d\beta$ (step S43K).

In succession, the motor vehicle behavior stability decision unit 5E compares the acceleration/slip-angle change rate $dGy/d\beta$ with the predetermined range (step S34J) to thereby make decision that the behavior of the motor vehicle is in the unstable state (step S16) or in the stable state (step S17).

In the motor vehicle state detecting system according to the instant embodiment of the invention, advantageous actions and effects comparable to those mentioned previously can be obtained. Furthermore, even in the case where it is impossible to directly measure (or determine arithmetically) the acceleration/slip-angle change rate $dGy/d\beta$, the latter can arithmetically be derived by determining the acceleration/slip-angle change rate $dGy/d\beta$ on the basis of the distance-based acceleration change rate $dGy/dL$ and the distance-based slip-angle change rate $d\beta/dL$ substantially to the same advantageous action and effect similar to those described hereinbefore.

Embodiment 19

In the case of the motor vehicle state detecting system according to the seventeenth embodiment of the invention, the time-based slip-angle change rate measuring unit 8 is employed for making available the time-based slip-angle change rate $d\beta/dt$ (see FIG. 36). In the motor vehicle state detecting system according to a nineteenth embodiment of the present invention, the time-based slip-angle change rate $d\beta/dt$ is arithmetically determined on the basis of outputs of various relevant sensors.

Figure 40:
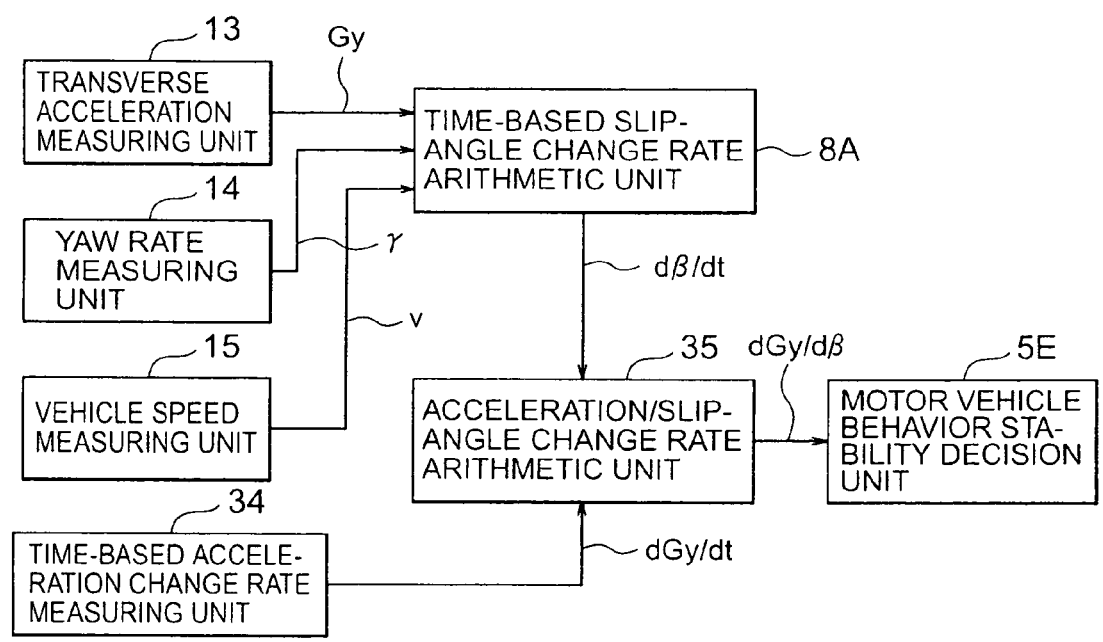
FIG. 40 is a block diagram showing schematically a major portion of the motor vehicle state detecting system according to a nineteenth embodiment of the present invention.

FIG. 40 is a block diagram showing schematically a major portion of the motor vehicle state detecting system according to the nineteenth embodiment of the present invention in which a time-based slip-angle change rate arithmetic unit 8A is employed. In the figure, components similar to those described previously in conjunction with FIGS. 10 and 36 are denoted by like reference symbols.

The motor vehicle state detecting system according to the instant embodiment of the invention includes as the sensors the transverse acceleration measuring unit 13 for detecting the actual acceleration Gy in the transverse direction, the yaw rate measuring unit 14 for detecting the acceleration in the yaw direction (actual yaw rate) γ and the vehicle speed measuring unit 15 for detecting the actual vehicle speed v.

In the instant embodiment of the present invention, the time-based slip-angle change rate arithmetic unit 8A is so designed as to arithmetically determine the time-based slip-angle change rate $d\beta/dt$ on the basis of the actual transverse acceleration Gy, the actual yaw rate (time-based differential value of the speed in the yaw direction) γ and the actual vehicle speed v.

Now, referring to FIG. 40, operation of the motor vehicle state detecting system according to the nineteenth embodiment of the invention will be described.

The transverse acceleration measuring unit 13 detects the actual transverse acceleration Gy. The yaw rate measuring unit 14 detects the actual yaw rate γ. The vehicle speed measuring unit 15 detects the actual vehicle speed v. Each of the detected values is stored in a memory incorporated in the time-based slip-angle change rate arithmetic unit 8A.

Further, the time-based acceleration change rate measuring unit 34 measures the time-based acceleration change rate $dGy/dt$ to be stored in a memory incorporated in the acceleration/slip-angle change rate arithmetic unit 35.

The time-based slip-angle change rate arithmetic unit 8A is designed to arithmetically determine the time-based slip-angle change rate $d\beta/dt$ on the basis of the actual transverse acceleration Gy, the actual yaw rate γ and the actual vehicle speed v in accordance with the expression (5) mentioned hereinbefore.

In succession, the acceleration/slip-angle change rate arithmetic unit 35 divides the time-based acceleration change rate $dGy/dt$ by the time-based slip-angle change rate $d\beta/dt$ to determine the acceleration/slip-angle change rate $dGy/d\beta$ in accordance with the expression (12) mentioned hereinbefore.

Further, the motor vehicle behavior stability decision unit 5E compares the acceleration/slip-angle change rate $dGy/d\beta$ with the predetermined range to determine the stability or instability of the behavior of the motor vehicle.

Figure 41:
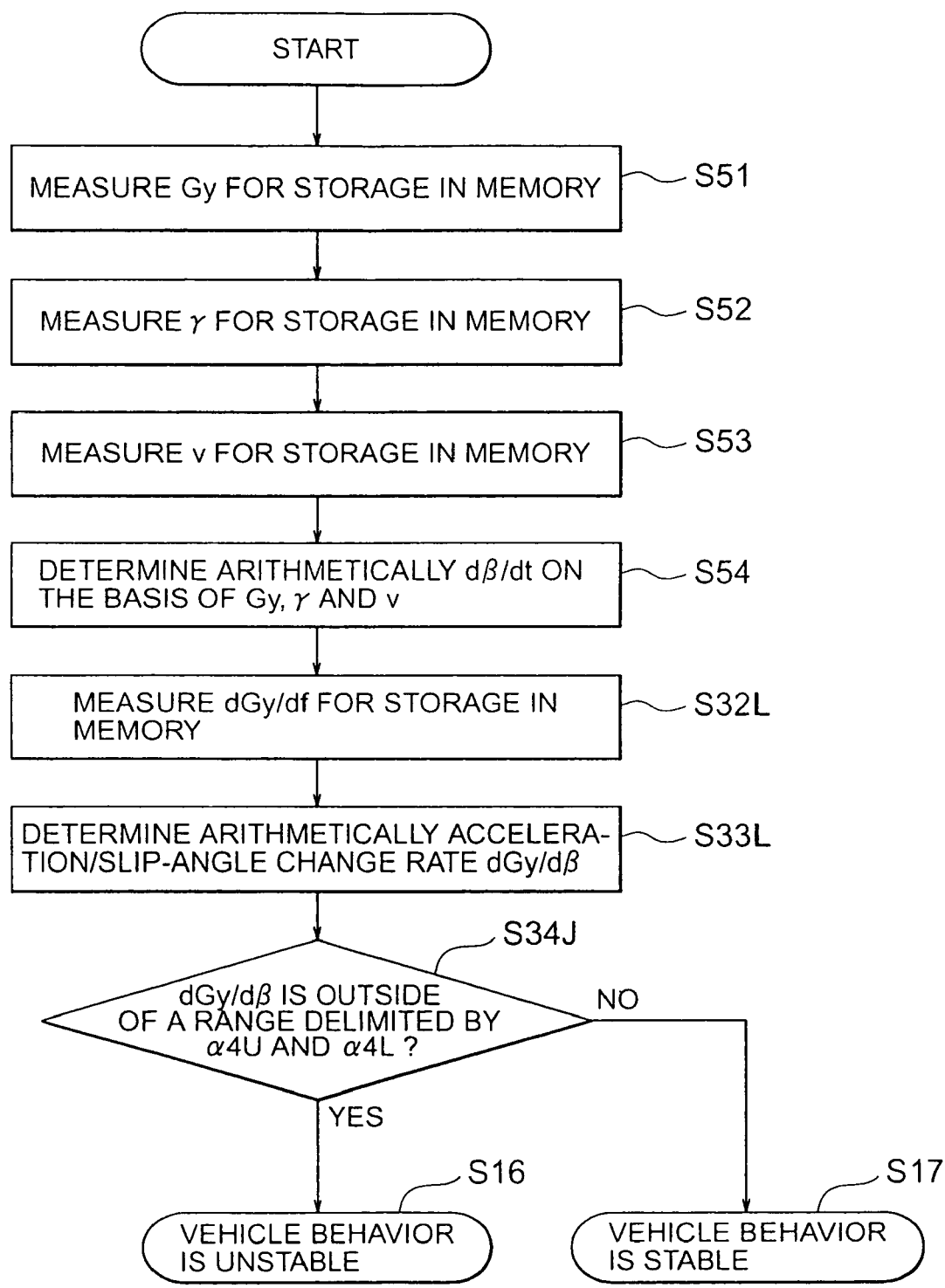
FIG. 41 is a flow chart for illustrating vehicle behavior decision operation performed by the motor vehicle state detecting system according to the nineteenth embodiment of the invention.

Next, referring to a flow chart shown in FIG. 41, description will be made of operation performed by the motor vehicle state detecting system according to the nineteenth embodiment of the invention shown in FIG. 40. In FIG. 41, the steps S51 to S54, S34J, S16 and S17 represent the processings similar to those described hereinbefore by reference to FIGS. 11 and 37 and processings in steps S32L and S33L correspond, respectively, to those in the steps S32 and S33 shown in FIG. 11.

At first, the actual transverse acceleration Gy, the actual yaw rate γ and the actual vehicle speed v of the motor vehicle are measured to be stored in the memory in steps S51, S52 and S53, respectively. Then, in a step S54, the time-based slip-angle change rate $d\beta/dt$ is arithmetically determined on the basis of the actual transverse acceleration Gy, the actual yaw rate γ and the vehicle speed v to be stored in the memory.

Further, the time-based acceleration change rate $dGy/dt$ is measured to be stored in the memory (step S32L).

Next, in a step S33, the time-based acceleration change rate $dGy/dt$ is divided by the time-based slip-angle change rate $d\beta/dt$ to thereby determine the acceleration/slip-angle change rate $dGy/d\beta$.

Subsequently, the acceleration/slip-angle change rate $dGy/d\beta$ is compared with the predetermined range (step S34J) to determine that the behavior of the motor vehicle is in the unstable state (step S16) or alternatively in the stable state (step S17).

In this manner, even in the case where it is impossible to directly measure the time-based slip-angle change rate $d\beta/dt$, this change rate $d\beta/dt$ can arithmetically be determined by measuring the transverse acceleration Gy, the yaw rate γ and the vehicle speed v derived from the outputs of the relevant sensors. Thus, substantially same action and effect as those described hereinbefore can be ensured.

Embodiment 20

In the case of the motor vehicle state detecting system according to the seventeenth embodiment of the invention, no consideration has been paid to the processing which is executed when the time-based slip-angle change rate $d\beta/dt$ is smaller than the lower limit permissible value. In the motor vehicle state detecting system according to a twentieth embodiment of the present invention, such arrangement is adopted that the division arithmetic processing executed by the acceleration/slip-angle change rate arithmetic unit 35 (see FIG. 36) is inhibited when the time-based slip-angle change rate $d\beta/dt$ becomes smaller than the lower limit permissible value with a view to preventing the occurrence of overflow.

Figure 42:
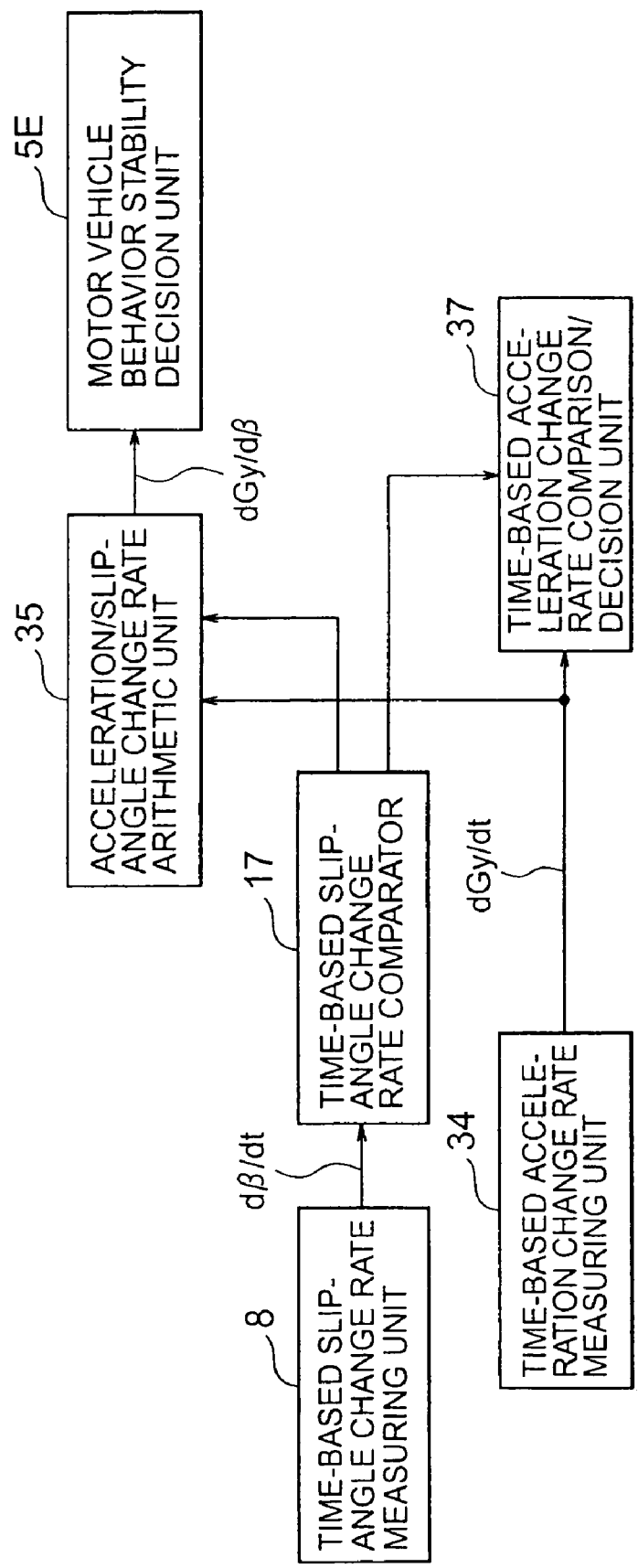
FIG. 42 is a block diagram showing schematically a major portion of the motor vehicle state detecting system according to a twentieth embodiment of the present invention.

FIG. 42 is a block diagram showing generally a major portion of the motor vehicle state detecting system according to the twentieth embodiment of the present invention in which the division arithmetic executed by the acceleration/slip-angle change rate arithmetic unit 35 is inhibited when the time-based slip-angle change rate $d\beta/dt$ is small. In FIG. 42, components similar to those described previously by reference to FIGS. 12 and 36 are denoted by like reference symbols.

Referring to FIG. 42, the time-based slip-angle change rate comparator 17 is inserted between the time-based slip-angle change rate measuring unit 8 and the acceleration/slip-angle change rate arithmetic unit 35, wherein the time-based acceleration change rate comparison/decision unit 37 is connected to the output of the time-based slip-angle change rate comparator 17.

The time-based slip-angle change rate comparator 17 is so designed that it ordinarily supplies the time-based slip-angle change rate $d\beta/dt$ to the acceleration/slip-angle change rate arithmetic unit 35 to validate the arithmetic operation (division processing) of the acceleration/slip-angle change rate arithmetic unit 35.

However, when the time-based slip-angle change rate $d\beta/dt$ is smaller than the lower limit permissible value, the time-based slip-angle change rate comparator 17 inhibits the division processing executed by the acceleration/slip-angle change rate arithmetic unit 35 by invalidating or disabling the acceleration/slip-angle change rate arithmetic unit 35 while outputting the result of the above-mentioned comparison (i.e., $d\beta/dt$<lower limit permissible value) to the time-based acceleration change rate comparison/decision unit 37 to thereby enable the operation of the time-based acceleration change rate comparison/decision unit 37.

The time-based slip-angle change rate comparator 17 is comprised of a lower limit value setting means for setting the lower limit permissible value for the time-based slip-angle change rate $d\beta/dt$ in dependence on the motor vehicle concerned, and a division arithmetic inhibiting means for disabling the division arithmetic executed by the acceleration/slip-angle change rate arithmetic unit 35 when the value of the time-based slip-angle change rate $d\beta/dt$ becomes smaller than the lower limit permissible value.

On the other hand, the time-based acceleration change rate comparison/decision unit 37 is comprised of a predetermined change rate setting means for setting a predetermined change rate for the time-based acceleration change rate $dGy/dt$ in dependence on the motor vehicle concerned and a comparison means for comparing the time-based acceleration change rate $dGy/dt$ with a predetermined change rate. Incidentally, the function of the time-based acceleration change rate comparison/decision unit 37 may be implemented as one of the function of the motor vehicle behavior stability decision unit 5E.

In operation, when it is decided by the time-based slip-angle change rate comparator 17 that the value of the time-based slip-angle change rate $d\beta/dt$ is smaller than the lower limit permissible value, operation of the time-based acceleration change rate comparison/decision unit 37 is validated instead of the acceleration/slip-angle change rate arithmetic unit 35 and the motor vehicle behavior stability decision unit 5E. In that case, the time-based acceleration change rate comparison/decision unit 37 makes decision that the behavior of the motor vehicle is unstable when the time-based acceleration change rate $dGy/dt$ reaches or exceeds the predetermined change rate value.

In general, when the absolute value of the time-based slip-angle change rate $d\beta/dt$ of the motor vehicle is smaller than the lower limit permissible value and when the absolute value of the time-based acceleration change rate $dGy/dt$ is smaller than the predetermined change rate value, then it can be determined that the motor vehicle is scarcely moving in the lateral or transverse direction and thus the motor vehicle is in the stable state.

By contrast, if the absolute value of the time-based acceleration change rate $dGy/dt$ exceeds the predetermined change rate value, the behavior of the motor vehicle is then identified as being in the unstable state, even if the absolute value of the time-based slip-angle change rate dβ/dt is smaller than the lower limit permissible value inclusive.

Furthermore, even if the time-based slip-angle change rate dβ/dt is greater than the lower limit permissible value inclusive, the behavior of the motor vehicle is regarded as being in the stable state so far as the acceleration/slip-angle change rate dGy/dβ falls within the predetermined range. However, if the acceleration/slip-angle change rate dGy/dβ lies outside of the predetermined range, it is then determined that the motor vehicle is in the unstable state.

Next, description will turn to operation of the motor vehicle state detecting system according to the twentieth embodiment of the invention shown in FIG. 42.

At first, the time-based slip-angle change rate measuring unit 8 measures the time-based slip-angle change rate dβ/dt while the time-based acceleration change rate measuring unit 34 measures the time-based acceleration change rate dGy/dt.

The time-based slip-angle change rate comparator 17 compares the time-based slip-angle change rate dβ/dt with the lower limit permissible value to supply the time-based slip-angle change rate dβ/dt to the acceleration/slip-angle change rate arithmetic unit 35 when the value of the time-based slip-angle change rate dβ/dt is greater than the lower limit permissible value inclusive. In response thereto, the acceleration/slip-angle change rate arithmetic unit 35 performs the ordinary division arithmetic processing in accordance with the expression (12) mentioned hereinbefore.

Subsequently, the motor vehicle behavior stability decision unit 5E compares the acceleration/slip-angle change rate dGy/dβ with the predetermined range mentioned above to decide that the behavior of the motor vehicle is in the unstable state when the acceleration/slip-angle change rate dGy/dβ lies outside of the predetermined range (see expression (11)).

On the other hand, when the value of the time-based slip-angle change rate dβ/dt is smaller than the lower limit permissible value, the time-based slip-angle change rate comparator 17 inhibits the time-based slip-angle change rate dβ/dt from being supplied to the acceleration/slip-angle change rate arithmetic unit 35 (and hence the division arithmetic represented by the expression (12)). Further, the result of the comparison mentioned above is supplied to the time-based acceleration change rate comparison/decision unit 37.

Thus, the time-based acceleration change rate comparison/decision unit 37 is put into operation in place of the motor vehicle behavior stability decision unit 5E, whereby the state of the motor vehicle is detected on the basis of the result of the comparison processing executed by the time-based acceleration change rate comparison/decision unit 37.

More specifically, the time-based acceleration change rate comparison/decision unit 37 compares the time-based acceleration change rate dGy/dt with a predetermined change rate to decide that the behavior of the motor vehicle is unstable when the time-based acceleration change rate dGy/dt is greater than the above-mentioned predetermined change rate inclusive.

Figure 43:
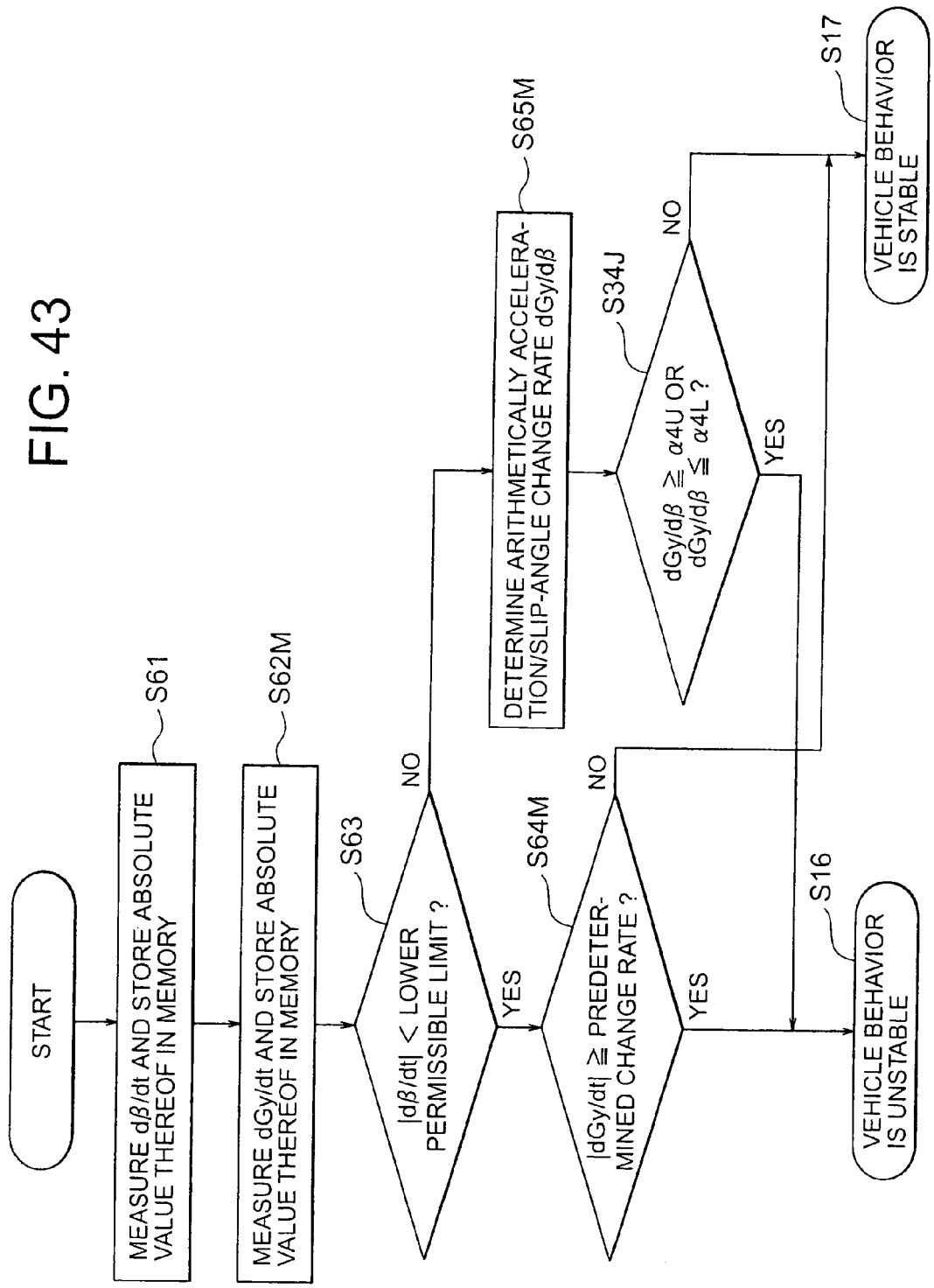
FIG. 43 is a flow chart for illustrating vehicle behavior decision operation performed by the motor vehicle state detecting system according to the twentieth embodiment of the invention.

Next, referring to a flow chart shown in FIG. 43, description will be made of operation performed by the motor vehicle state detecting system according to the twentieth embodiment of the invention shown in FIG. 42. In FIG. 43, the steps S61, S63, S34J, S16 and S17 represent the processings similar to those described hereinbefore by reference to FIGS. 13 and 37 and processings in steps S62M, S64M and S65M correspond, respectively, to those executed in the steps S62, S64 and S65 shown in FIG. 13.

At first, the time-based slip-angle change rate dβ/dt is measured and the absolute value thereof is stored in the memory (step S61). Further, the time-based acceleration change rate dGy/dt is measured and the absolute value thereof is stored in the memory (step S62M).

Subsequently, decision is made whether or not the absolute value of the time-based slip-angle change rate dβ/dt is smaller than the lower limit permissible value (step S63) When it is determined that |dβ/dt|<lower limit permissible value (i.e., when the step S63 is "YES"), then the time-based acceleration change rate comparison/decision unit 37 is validated, whereon decision is made whether or not the absolute value of the time-based acceleration change rate dGy/dt is greater than the above-mentioned predetermined change rate inclusive thereof (step S64M).

When the decision step S64M results in that |dGy/dt|≧predetermined change rate, i.e., "YES", it is then determined that the behavior of the motor vehicle is in the unstable state (step S16), while it is decided that the motor vehicle is in the stable state (step S17) when |dGy/dt|<predetermined change rate, i.e., when the step S64M results in "NO", whereon the processing routine shown in FIG. 43 is terminated.

On the other hand, when the decision steps S63 results in that |dβ/dt|≧lower limit permissible value, i.e., "NO", then the acceleration/slip-angle change rate arithmetic unit 35 is put into operation to arithmetically determine the acceleration/slip-angle change rate dGy/dβ (step S65M). In succession, it is decided by the motor vehicle behavior stability decision unit 5E whether or not the acceleration/slip-angle change rate dGy/dβ lies outside of the predetermined range (step S34J).

Finally, in dependence on whether or not the acceleration/slip-angle change rate dGy/dβ lies outside of the predetermined range, the unstable state or the stable state of the motor vehicle behavior is decided (step S16 or S17).

As is apparent from the above, according to the teaching of the invention incarnated in the instant embodiment, the division processing performed by the acceleration/slip-angle change rate arithmetic unit 35 is inhibited when the value of the time-based slip-angle change rate dβ/dt is smaller than the lower limit permissible value, and the state of the motor vehicle is determined on the basis of only the time-based acceleration change rate dGy/dt.

By virtue of this feature, occurrence of overflow due to the division arithmetic executed by the acceleration/slip-angle change rate arithmetic unit 35 can be suppressed while ensuring detection of the unstable state of the motor vehicle or the prognostic state thereof, even when the time-based slip-angle change rate dβ/dt is small.

Embodiment 21

In the case of the motor vehicle state detecting system according to the eighteenth embodiment of the invention, no consideration has been paid to the processing procedure which can be executed when the distance-based slip-angle change rate dβ/dL is smaller than the lower limit permissible value. In the motor vehicle state detecting system according to a twenty-first embodiment of the present invention, such arrangement is adopted that the division arithmetic processing executed by the acceleration/slip-angle change rate arithmetic unit 35A (see FIG. 38) is inhibited or disabled when the distance-based slip-angle change rate dβ/dL is smaller than the lower limit permissible value, to thereby prevent occurrence of overflow.

Figure 44:
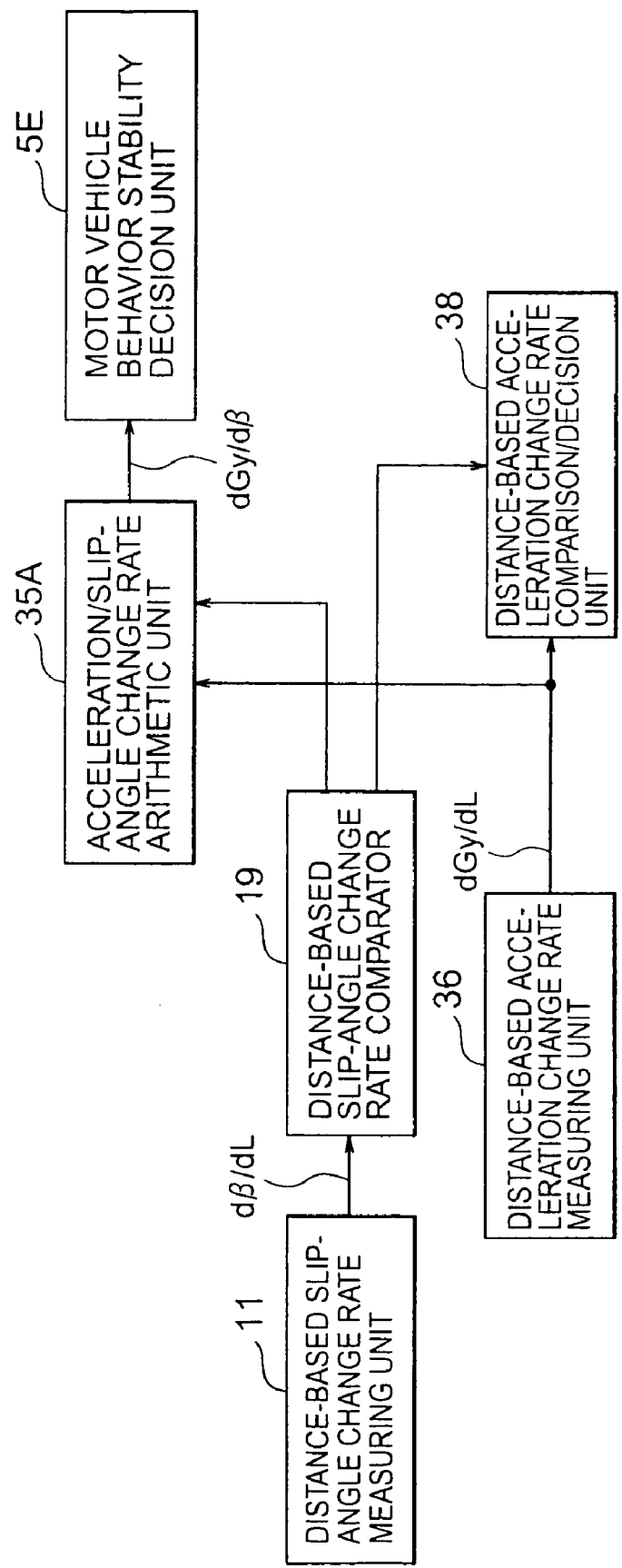
FIG. 44 is a block diagram showing schematically a major portion of the motor vehicle state detecting system according to a twenty-first embodiment of the present invention.

FIG. 44 is a block diagram showing generally a major portion of the motor vehicle state detecting system according to the twenty-first embodiment of the invention in which the division processing executed by the acceleration/slip-angle change rate arithmetic unit 35A is inhibited when the distance-based slip-angle change rate $d\beta/dL$ is small.

In FIG. 44, components similar to those described previously in conjunction with FIGS. 14 and 38 are denoted by like reference symbols.

Referring to the figure, a distance-based slip-angle change rate comparator 19 is inserted between the distance-based slip-angle change rate measuring unit 11 and the acceleration/slip-angle change rate arithmetic unit 35A, wherein the distance-based acceleration change rate comparison/decision unit 38 is connected to the output of the distance-based slip-angle change rate comparator 19.

The distance-based slip-angle change rate comparator 19 is so designed that it ordinarily supplies the distance-based slip-angle change rate $d\beta/dL$ to the acceleration/slip-angle change rate arithmetic unit 35A to validate the arithmetic operation (division processing) of the acceleration/slip-angle change rate arithmetic unit 35A.

On the other hand, when the distance-based slip-angle change rate $d\beta/dL$ is smaller than a lower limit permissible value, the distance-based slip-angle change rate comparator 19 inhibits the division processing executed by the acceleration/slip-angle change rate arithmetic unit 35A by disabling the acceleration/slip-angle change rate arithmetic unit 35A while outputting the result of the above-mentioned comparison (i.e., $d\beta/dL$ < lower limit permissible value) to the distance-based acceleration change rate comparison/decision unit 38 to thereby enable the operation of the distance-based acceleration change rate comparison/decision unit 38.

The distance-based slip-angle change rate comparator 19 is comprised of a lower limit value setting means for setting the lower limit permissible value for the distance-based slip-angle change rate $d\beta/dL$ in dependence on the motor vehicle concerned and a division arithmetic inhibiting means for inhibiting the division processing executed by the acceleration/slip-angle change rate arithmetic unit 35A when the value of the distance-based slip-angle change rate $d\beta/dL$ is smaller than the lower limit permissible value.

On the other hand, the distance-based acceleration change rate comparison/decision unit 38 is comprised of a predetermined change rate setting means for setting a predetermined change rate for the distance-based acceleration change rate $dGy/dL$ in dependence on the motor vehicle concerned and a comparison means for comparing the distance-based acceleration change rate $dGy/dL$ with the predetermined change rate. Incidentally, the distance-based acceleration change rate comparison/decision unit 38 may be realized as a part of the motor vehicle behavior stability decision unit 5E.

In operation, when it is decided by the distance-based slip-angle change rate comparator 19 that the value of the distance-based slip-angle change rate $d\beta/dL$ is smaller than the lower limit permissible value, operation of the distance-based acceleration change rate comparison/decision unit 38 is validated in place of the acceleration/slip-angle change rate arithmetic unit 35A and the motor vehicle behavior stability decision unit 5E. In that case, the distance-based acceleration change rate comparison/decision unit 38 makes decision that the behavior of the motor vehicle is unstable when the distance-based acceleration change rate $dGy/dL$ is greater than the predetermined change rate value inclusive.

In general, when the absolute value of the distance-based slip-angle change rate $d\beta/dL$ of the motor vehicle is smaller than the lower limit permissible value and when the absolute value of the distance-based acceleration change rate $dGy/dL$ is smaller than the predetermined change rate value, then it can be determined that the motor vehicle is scarcely moving in the transverse direction and thus the motor vehicle is in the stable state.

On the other hand, even when the absolute value of the distance-based slip-angle change rate $d\beta/dL$ is smaller than the lower limit permissible value, it is determined that the behavior of the motor vehicle is in the unstable state if the absolute value of the distance-based acceleration change rate $dGy/dL$ is greater than the predetermined change rate value inclusive.

Furthermore, so far as the acceleration/slip-angle change rate $dGy/d\beta$ lies within the predetermined range, the motor vehicle can be regarded as being in the stable state, even if the distance-based slip-angle change rate $d\beta/dL$ is greater than the lower limit permissible value inclusive. However, if the acceleration/slip-angle change rate $dGy/d\beta$ lies outside of the predetermined range, it is then determined that the motor vehicle is in the unstable state.

Referring to FIG. 44, the distance-based slip-angle change rate measuring unit 11 measures the distance-based slip-angle change rate $d\beta/dL$ while the distance-based acceleration change rate measuring unit 36 measures the distance-based acceleration change rate $dGy/dL$.

The distance-based slip-angle change rate comparator 19 outputs the result of the comparison to the acceleration/slip-angle change rate arithmetic unit 35A when the distance-based slip-angle change rate $d\beta/dL$ is greater than the lower limit permissible value inclusive while outputting the result of the comparison to the distance-based acceleration change rate comparison/decision unit 38 when the distance-based slip-angle change rate $d\beta/dL$ is smaller than the lower limit permissible value.

The acceleration/slip-angle change rate arithmetic unit 35A divides the distance-based acceleration change rate $dGy/dL$ by the distance-based slip-angle change rate $d\beta/dL$ to thereby arithmetically determine the acceleration/slip-angle change rate $dGy/d\beta$ in accordance with the expression (13) mentioned previously.

The distance-based acceleration change rate comparison/decision unit 38 determines that the behavior of the motor vehicle is unstable when the distance-based acceleration change rate $dGy/dL$ is greater than the above-mentioned predetermined change rate inclusive.

Figure 45:
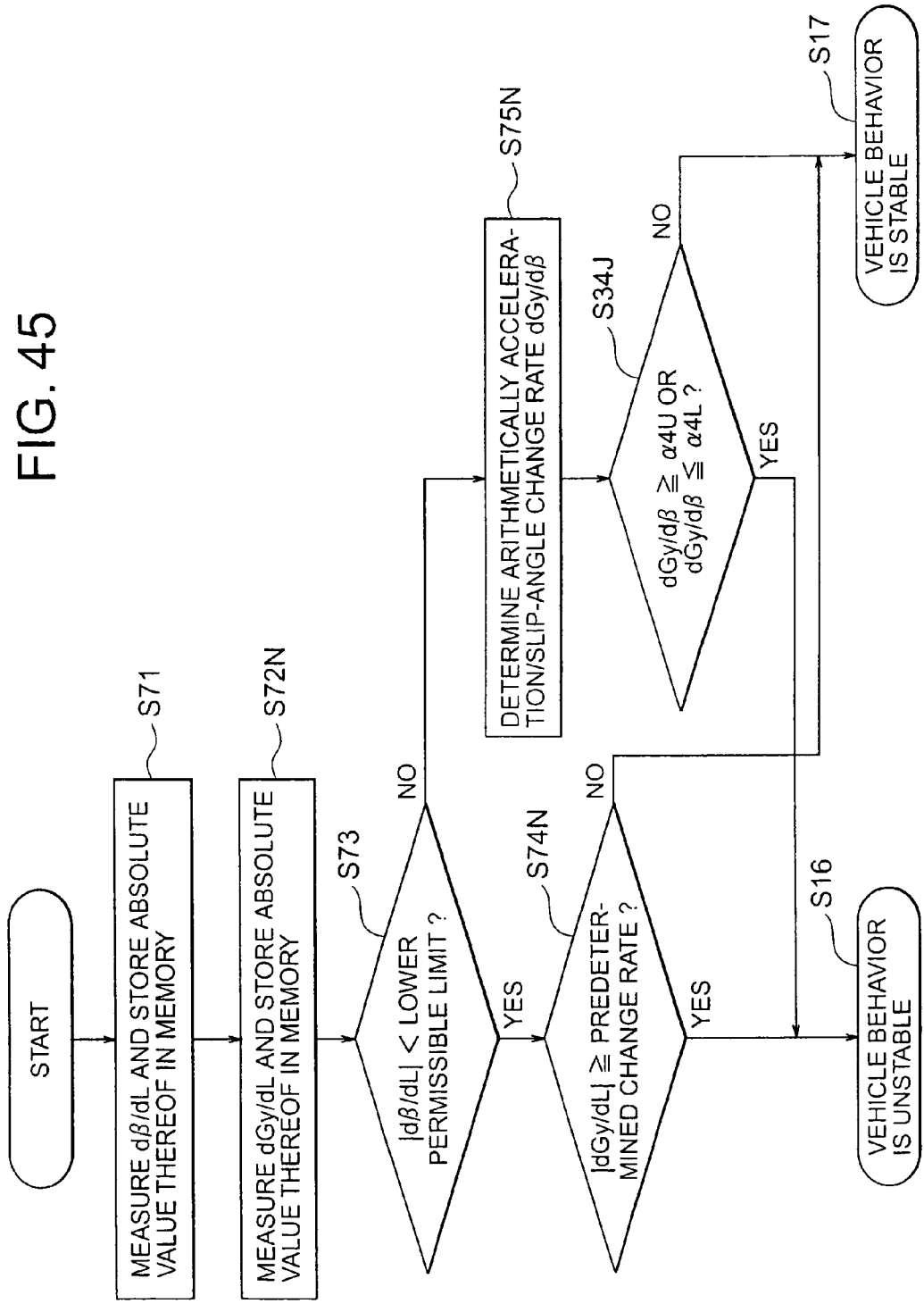
FIG. 45 is a flow chart for illustrating vehicle behavior decision operation performed by the motor vehicle state detecting system according to the twenty-first embodiment of the invention.

Next, referring to a flow chart shown in FIG. 45, description will be made of the processings executed by the motor vehicle state detecting system according to the twenty-first embodiment of the invention shown in FIG. 44. In FIG. 45, the steps S71, S73, S34J, S16 and S17 represent the processings similar to those described hereinbefore by reference to FIGS. 15 and 39. Further, steps S72N, S74N and S75N correspond, respectively, to the steps S72, S74 and S75 shown in FIG. 15.

At first, the distance-based slip-angle change rate $d\beta/dL$ is measured and the absolute value thereof is stored in the memory (step S71). Further, the distance-based acceleration change rate $dGy/dL$ is measured and the absolute value thereof is stored in the memory (step S72N).

Succeedingly, decision is made whether or not the absolute value of the distance-based slip-angle change rate $d\beta/dL$ is smaller than the lower limit permissible value (step S73).

When it is determined that |dβ/dL|<lower limit permissible value (i.e., when the step S73 results in "YES"), then the distance-based acceleration change rate comparison/decision unit 38 is validated for making decision whether or not the absolute value of the distance-based acceleration change rate dGy/dL is greater than the predetermined change rate inclusive (step S74N).

When the decision step S74N results in that |dGy/dL|≧predetermined change rate, i.e., "YES", it is then determined that the behavior of the motor vehicle is in the unstable state (step S16), while it is decided that the motor vehicle is in the stable state when |dGy/dL|<predetermined change rate, i.e., when the step S74N is "NO" (step S17), whereupon the processing routine shown in FIG. 45 is terminated.

On the other hand, when the decision steps S73 results in that |dβ/dL|≧lower limit permissible value, i.e., "NO", then the acceleration/slip-angle change rate arithmetic unit 35A is put into operation to arithmetically determine the acceleration/slip-angle change rate dGy/dβ (step S75N). In succession, it is checked by the motor vehicle behavior stability decision unit 5E whether or not the acceleration/slip-angle change rate dGy/dβ lies outside of the predetermined range (step S34J).

Finally, in dependence on whether or not the acceleration/slip-angle change rate dGy/dβ lies outside of the predetermined range, the unstable state or the stable state of the motor vehicle behavior is determined (step S16 or S17).

As is apparent from the above, according to the teaching of the invention incarnated in the twenty-first embodiment, the division processing executed by the acceleration/slip-angle change rate arithmetic unit 35A is inhibited when the value of the distance-based slip-angle change rate dβ/dL is smaller than the lower limit permissible value, and the state of the motor vehicle is determined on the basis of only the distance-based acceleration change rate dGy/dL.

By virtue of this feature, occurrence of overflow due to the division processing executed by the acceleration/slip-angle change rate arithmetic unit 35A can be suppressed while ensuring detection of the unstable state of the motor vehicle or the prognostic state thereof, even in the case where the distance-based slip-angle change rate dβ/dL is small.

Embodiment 22

In the case of the motor vehicle state detecting system according to the nineteenth embodiment of the invention, no consideration has been made as to the processing which is executed when the time-based slip-angle change rate dβ/dt is smaller than the lower limit permissible value. In the motor vehicle state detecting system according to a twenty-second embodiment of the present invention, such arrangement is adopted that the division processing executed by the acceleration/slip-angle change rate arithmetic unit 35 (see FIG. 40) is inhibited when the time-based slip-angle change rate dβ/dt is smaller than the lower limit permissible value, to thereby prevent occurrence of overflow, as is the case with the system according to the twentieth embodiment described previously.

Figure 46:
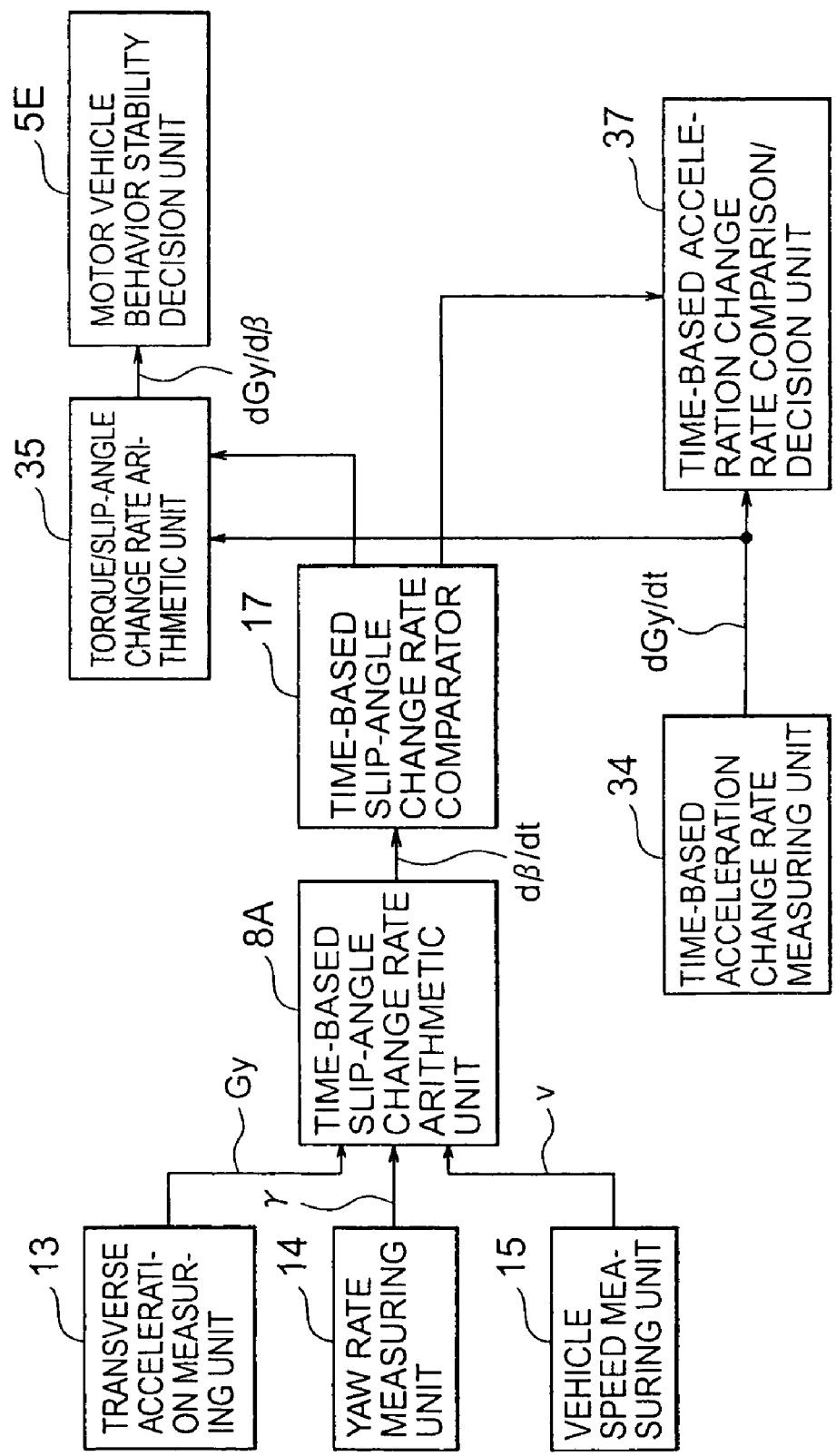
FIG. 46 is a block diagram showing schematically a major portion of the motor vehicle state detecting system according to a twenty-second embodiment of the present invention.

FIG. 46 is a block diagram showing generally a major portion of the motor vehicle state detecting system according to the twenty-second embodiment of the present invention in which the division processing executed by the acceleration/slip-angle change rate arithmetic unit 35 is inhibited when the value of the time-based slip-angle change rate dβ/dt is small.

In FIG. 46, components similar to those described previously in conjunction with FIGS. 16 and 40 are denoted by like reference symbols.

Referring to the figure, the time-based slip-angle change rate comparator 17 is inserted between the time-based slip-angle change rate arithmetic unit 8A and the acceleration/slip-angle change rate arithmetic unit 35, wherein the time-based acceleration change rate comparison/decision unit 37 is connected to the output of the time-based slip-angle change rate comparator 17.

The time-based slip-angle change rate comparator 17 is so designed that it ordinarily supplies the time-based slip-angle change rate dβ/dt to the acceleration/slip-angle change rate arithmetic unit 35 to validate the arithmetic operation (division processing) of the acceleration/slip-angle change rate arithmetic unit 35.

On the other hand, when the time-based slip-angle change rate dβ/dt is smaller than the lower limit permissible value, the time-based slip-angle change rate comparator 17 inhibits the division processing executed by the acceleration/slip-angle change rate arithmetic unit 35 by disabling the acceleration/slip-angle change rate arithmetic unit 35 while outputting the result of the comparison (i.e., dβ/dt<lower limit permissible value) to the time-based acceleration change rate comparison/decision unit 37 to thereby enable the operation of that unit 37.

The time-based slip-angle change rate comparator 17 is comprised of the lower limit value setting means for setting the lower limit permissible value for the time-based slip-angle change rate dβ/dt in dependence on the motor vehicle concerned and the division arithmetic inhibiting means for disabling the division processing executed by the acceleration/slip-angle change rate arithmetic unit 35 when the value of the time-based slip-angle change rate dβ/dt is smaller than the lower limit permissible value.

The time-based acceleration change rate comparison/decision unit 37 is comprised of the predetermined change rate setting means for setting a predetermined change rate for the time-based acceleration change rate dGy/dt in dependence on the motor vehicle concerned and the comparison means for comparing the time-based acceleration change rate dGy/dt with the predetermined change rate. Incidentally, the function of the time-based acceleration change rate comparison/decision unit 37 may be incarnated as one of the functions of the motor vehicle behavior stability decision unit 5E, as is the case with the embodiments described previously.

In operation, when it is decided by the time-based slip-angle change rate comparator 17 that the value of the time-based slip-angle change rate dβ/dt is smaller than the lower limit permissible value, operation of the time-based acceleration change rate comparison/decision unit 37 is validated instead of the acceleration/slip-angle change rate arithmetic unit 35 and the motor vehicle behavior stability decision unit 5E. In that case, the time-based acceleration change rate comparison/decision unit 37 determines that the behavior of the motor vehicle is unstable when the time-based acceleration change rate dGy/dt reaches or exceeds the predetermined change rate value.

In general, when the absolute value of the time-based slip-angle change rate dβ/dt of the motor vehicle which is arithmetically determined on the basis of the transverse acceleration Gy, the yaw rate γ and the vehicle speed v is smaller than the lower limit permissible value and when the absolute value of the time-based acceleration change rate dGy/dt is smaller than the predetermined change rate, it can be determined that the behavior of the motor vehicle is stable.

By contrast, if the absolute value of the time-based acceleration change rate dGy/dt is equal to or exceeds the predetermined change rate, the behavior of the motor vehicle can then be identified as being in the unstable state, even if the absolute value of the time-based slip-angle change rate dβ/dt is smaller than the lower limit permissible value.

Furthermore, even if the time-based slip-angle change rate dβ/dt is equal to or greater than the lower limit permissible value, the behavior of the motor vehicle can be regarded as being in the stable state so far as the acceleration/slip-angle change rate dGy/dβ remains within the predetermined range. However, if the acceleration/slip-angle change rate dGy/dβ lies outside of the predetermined range, it is then detected that the behavior of the motor vehicle is unstable.

Referring to FIG. 46, the transverse acceleration measuring unit 13 detects the transverse acceleration Gy of the motor vehicle to be stored in a memory. Further, the yaw rate measuring unit 14 to detects the acceleration γ in the yaw direction which is also stored in the memory. Similarly, the vehicle speed measuring unit 15 detects the actual vehicle speed v for storage in the memory.

The time-based slip-angle change rate arithmetic unit 8A arithmetically determines the time-based slip-angle change rate dβ/dt on the basis of the transverse acceleration Gy, the yaw rate γ and the vehicle speed v in accordance with the expression (5) mentioned hereinbefore.

The time-based acceleration change rate measuring unit 34 is designed to measure the time-based acceleration change rate dGy/dt.

The time-based slip-angle change rate comparator 17 compares the time-based slip-angle change rate dβ/dt with the lower limit permissible value to output the result of the comparison to the time-based acceleration change rate comparison/decision unit 37 when the value of the time-based slip-angle change rate dβ/dt is smaller than the lower limit permissible value or alternatively to the acceleration/slip-angle change rate arithmetic unit 35 when the value of the time-based slip-angle change rate dβ/dt is greater than the lower limit permissible value inclusive.

The acceleration/slip-angle change rate arithmetic unit 35 divides the time-based acceleration change rate dGy/dt by the time-based slip-angle change rate dβ/dt to thereby arithmetically determine the acceleration/slip-angle change rate dGy/dβ in accordance with the expression (12) mentioned hereinbefore.

On the other hand, the time-based acceleration change rate comparison/decision unit 37 compares the time-based acceleration change rate dGy/dt with the predetermined change rate to decide that the behavior of the motor vehicle is unstable when the acceleration/slip-angle change rate dGy/dβ is greater than the predetermined change rate inclusive.

The motor vehicle behavior stability decision unit 5E compares the acceleration/slip-angle change rate dGy/dβ with the predetermined range, to thereby determine that the behavior of the motor vehicle is unstable when the acceleration/slip-angle change rate dGy/dβ lies outside of the predetermined range (refer to the expression (11) mentioned hereinbefore).

Figure 47:
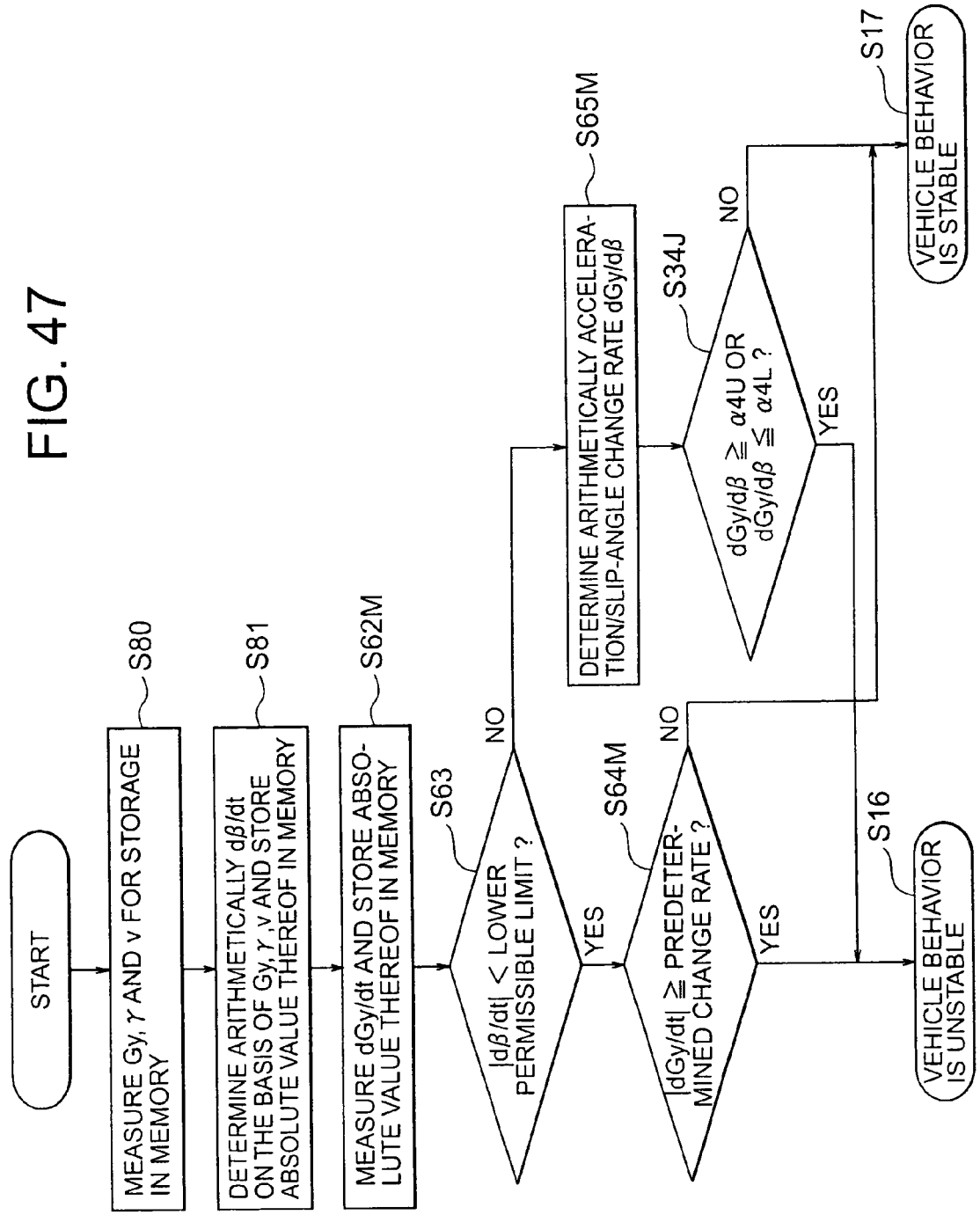
FIG. 47 is a flow chart for illustrating vehicle behavior decision operation performed by the motor vehicle state detecting system according to the twenty-second embodiment of the invention.

Next, referring to a flow chart shown in FIG. 47, description will be made of the processings executed by the motor vehicle state detecting system according to the twenty-second embodiment of the invention shown in FIG. 46. In FIG. 47, the steps S80 and S81 and the steps S62M, S63, S64M, S65M, S34J, S16 and S17 represent the processings similar to those described hereinbefore by reference to FIGS. 17 and 43, respectively.

At first, the transverse acceleration Gy, the yaw rate γ and the vehicle speed v are measured to be stored in the memory (step S80). Succeedingly, the time-based slip-angle change rate dβ/dt is arithmetically determined on the basis of the transverse acceleration Gy, the yaw rate γ and the vehicle speed v (step S81).

Further, the time-based acceleration change rate dGy/dt is measured to be stored in the memory (step S62M).

In succession, decision is made whether or not the absolute value of the time-based slip-angle change rate dβ/dt is smaller than the lower limit permissible value (step S63). When the step S63 results in |dβ/dt|<lower limit permissible value (i.e., "YES"), the processing proceeds to a step S64M. By contrast, when it is determined that |dβ/dt|≧lower limit permissible value (i.e., when the step S63 results in "NO"), the processing proceeds to a step S65M.

When the decision step S64M results in that |dGy/dt|≧predetermined change rate, i.e., "YES", it is then determined by the time-based acceleration change rate comparison/decision unit 37 that the behavior of the motor vehicle is the unstable (step S16), while it is determined that the behavior of the motor vehicle is stable (step S17) when the step S64M results in that |dGy/dt|<predetermined change rate, i.e., "NO".

On the other hand, the acceleration/slip-angle change rate arithmetic unit 35 arithmetically determines the acceleration/slip-angle change rate dGy/dβ (=(dGy/dt)/(dβ/dt)) in the step S65M. Succeedingly, the motor vehicle behavior stability decision unit SE compares the acceleration/slip-angle change rate dGy/dβ with the predetermined range (step S34J) to determine that the behavior of the motor vehicle is unstable (step S16) when the acceleration/slip-angle change rate dGy/dβ is outside of the predetermined range (i.e., when the step S34J results in "YES") while determining that the behavior of the motor vehicle is stable (step S17) when the acceleration/slip-angle change rate dGy/dβ lies within the predetermined range mentioned above (i.e., when the step S34J results in "NO").

As can be seen from the above, even in the situation where the grip force of tire is small, it is possible to detect effectively the unstable state of the motor vehicle behavior on the basis of only the time-based acceleration change rate dGy/dt corresponding to the actual transverse acceleration Gy when the time-based slip-angle change rate dβ/dt is small.

As described previously by reference to FIG. 33, the transverse acceleration which acts on the motor vehicle running on the slippery road surface decreases as the side slip angle becomes smaller. However, in the region where the side slip angle is small, the linearity of the actual transverse acceleration Gy which conforms to the slope of the normal transverse acceleration Go is sustained. Thus, the stability of the behavior of the motor vehicle can be decided on the basis of the acceleration/slip-angle change rate dGy/dβ by using the predetermined range (reference for comparison) similarly to the case where the motor vehicle is running on a dry-asphalt (not slippery) road surface.

Furthermore, even in the case where it is impossible to measure the time-based slip-angle change rate dβ/dt, this change rate dβ/dt can arithmetically be determined by measuring the transverse acceleration Gy, the yaw rate γ and the vehicle speed v. Thus, essentially same action and effect as those described hereinbefore can be achieved.

By virtue of the feature mentioned above, occurrence of overflow due to the division processing executed by the acceleration/slip-angle change rate arithmetic unit 35 can be suppressed while ensuring detection of the unstable state of the motor vehicle even if the time-based slip-angle change rate $d\beta/dt$ is small.

As described previously by reference to FIG. 33, the transverse acceleration Gy which acts on the motor vehicle running on the slippery road surface is low when the side slip angle is relatively small. However, in the region where the side slip angle is further lessened, linearity which conforms to the slope of the normal transverse acceleration Go is sustained. Thus, the range of the predetermined change rate (gain) of the acceleration/slip-angle change rate can be used for making decision concerning the stability of the motor vehicle behavior as is with the case of the motor vehicle running on a dry-asphalt road surface.

Embodiment 23

In the motor vehicle state detecting systems described above in conjunction with the fifteenth to twenty-second embodiments of the invention, the actual side slip angle $\beta$ is used as the actual measured value of the first parameter. In the motor vehicle state detecting system according to a twenty-third embodiment of the present invention, an actual steering angle $\theta$ of the steering wheel manipulated by the driver of the motor vehicle is used.

Figure 48:
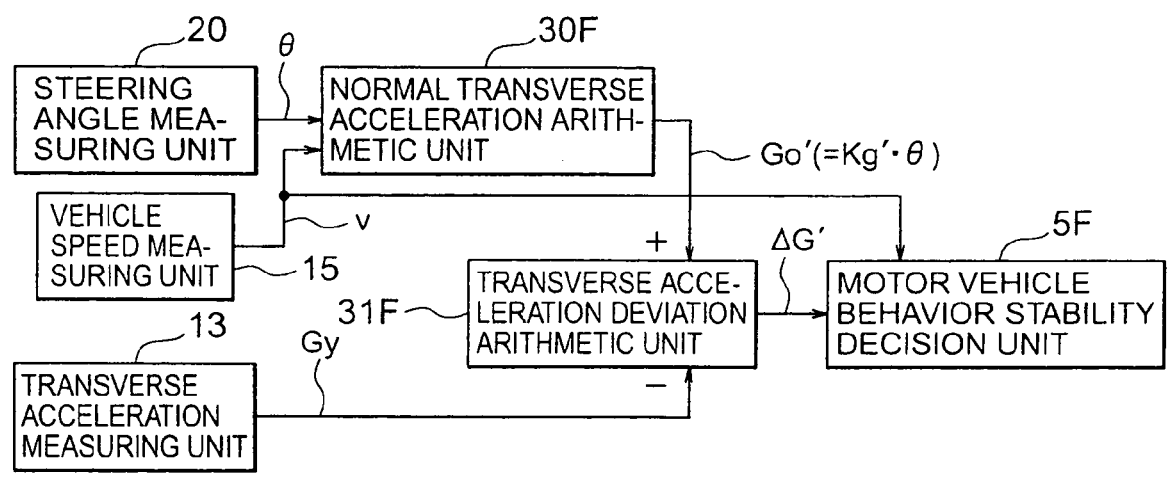
FIG. 48 is a block diagram showing schematically a major portion of the motor vehicle state detecting system according to a twenty-third embodiment of the present invention.

FIG. 48 is a schematic block diagram showing generally a major portion of the motor vehicle state detecting system according to the twenty-third embodiment of the invention in which the actual steering angle $\theta$ is used instead of the actual side slip angle $\beta$. In the figure, the contents same as or equivalent to those described hereinbefore (FIG. 18, FIG. 31) are denoted by like reference symbols affixed with "F" or "'".

In the motor vehicle state detecting system according to the instant embodiment of the invention, a steering angle measuring unit 20 is employed for detecting the steering angle $\theta$, replacing of the side slip angle measuring unit 1. Additionally, a vehicle speed measuring unit 15 is provided in association with the normal transverse acceleration arithmetic unit 30F and the motor vehicle behavior stability decision unit 5F.

In general, the transverse acceleration applied to the motor vehicle bears an approximately proportional relation to the actual steering angle $\theta$ so long as the motor vehicle is in the stable running state. However, when the running state of the motor vehicle approaches to the stability limit, the transverse acceleration becomes lowered as described hereinbefore, rendering it impossible to sustain the above-mentioned proportional relation to the actual steering angle $\theta$. Accordingly, by taking advantage of this feature, it is possible to detect the state of the motor vehicle on the basis of the steering angle $\theta$.

Referring to FIG. 48, the steering angle measuring unit 20 is designed to measure the steering angle $\theta$, while the transverse acceleration measuring unit 13 is designed to measure the actual transverse acceleration Gy. The vehicle speed measuring unit 15 measures the vehicle speed v. The detected values outputted from these units are stored in the memory.

Further, the normal transverse acceleration arithmetic unit 30F incorporates therein an acceleration/steering-angle ratio setting means (not shown) for setting an acceleration/steering-angle ratio (=gain Kg') and is designed to arithmetically determine the normal transverse acceleration Go' (=Kg'·$\theta$), The transverse acceleration deviation arithmetic unit 31F is designed to arithmetically determine an absolute value of a deviation of the actual transverse acceleration Gy from the normal transverse acceleration Go' (=Kg'·$\theta$) in the terms of the transverse acceleration deviation $\Delta$G' (=Go'−Gy).

The motor vehicle behavior stability decision unit 5F includes a predetermined deviation quantity setting means designed for setting a predetermined deviation quantity $\alpha$4 serving as a reference for comparison in dependence on the motor vehicle concerned and the speed v thereof, to thereby allow the transverse acceleration deviation $\Delta$G' to be compared with the predetermined deviation quantity $\alpha$4. When the above-mentioned comparison shows that the transverse acceleration deviation $\Delta$G' is greater than the predetermined deviation quantity $\alpha$4 inclusive (i.e., when the condition given by the undermentioned expression (14) is satisfied), it is then determined that the behavior of the motor vehicle is unstable.

$$|Kg\cdot\theta - Gy| \geq \alpha 4 \tag{14}$$

Figure 49:
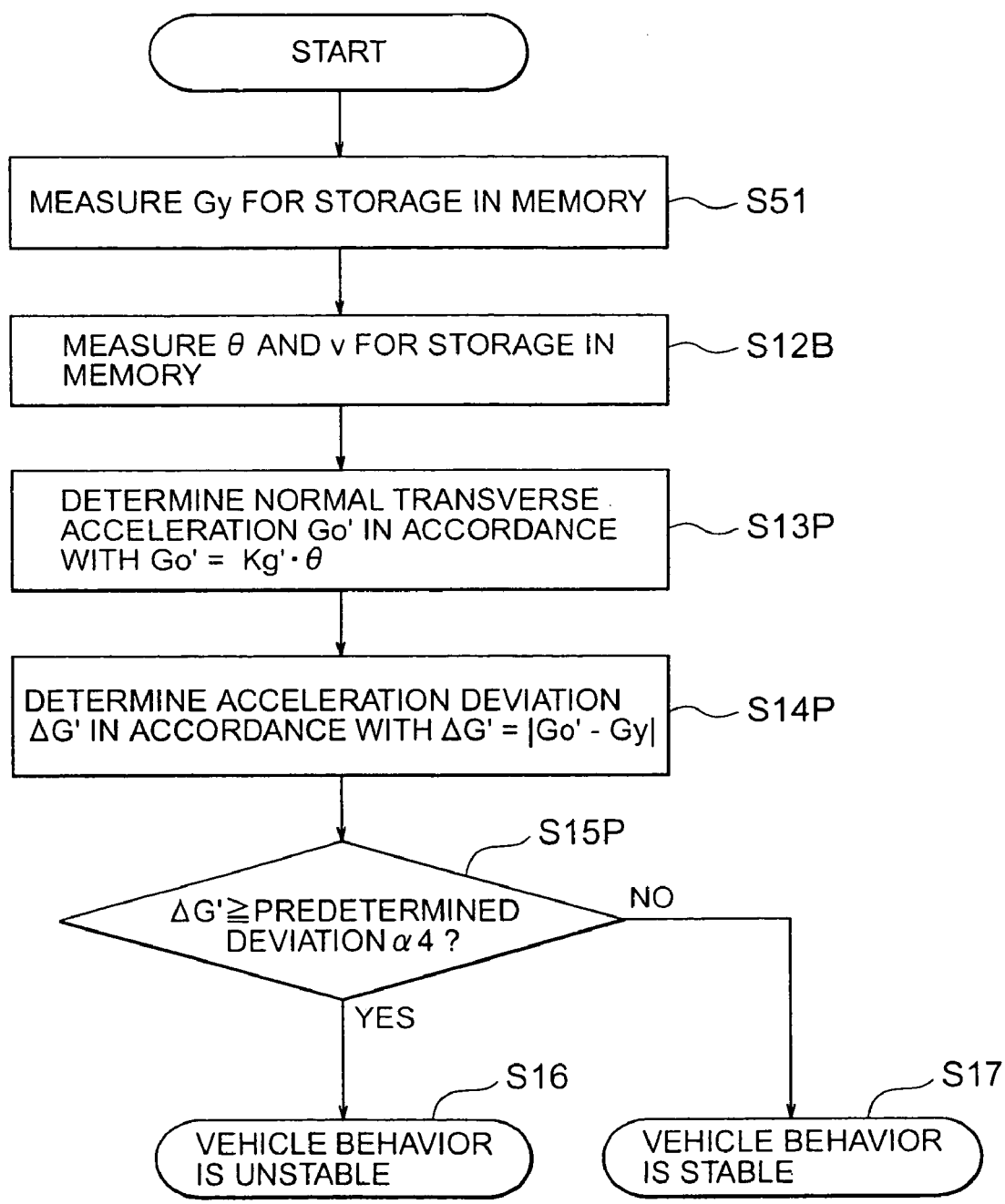
FIG. 49 is a flow chart for illustrating vehicle behavior decision operation performed by the motor vehicle state detecting system according to the twenty-third embodiment of the invention.

Next, description will be made of the operation performed by the motor vehicle state detecting system according to the twenty-third embodiment of the invention by reference to a flow chart shown in FIG. 49 together with FIG. 48. In FIG. 49, processing steps S51, S12B, S16 and S17 are essentially same as those described hereinbefore by reference to FIGS. 19 and 32. The processing steps which correspond to those described previously are denoted by like reference symbols affixed with "P".

The transverse acceleration measuring unit 13 measures the actual transverse acceleration Gy to be stored in a memory incorporated in the transverse acceleration deviation arithmetic unit 31F (step S51).

The steering angle measuring unit 20 measures the steering angle $\theta$ while the vehicle speed measuring unit 15 measures the vehicle speed v. These detected values are stored in a memory incorporated in the normal transverse acceleration arithmetic unit 30F (step S12B). At this time point, the vehicle speed v is also measured to be stored in a memory of the motor vehicle behavior stability decision unit 5F.

In succession, the normal transverse acceleration arithmetic unit 30F multiplies the gain Kg' of the transverse acceleration for the steering angle by the actual steering angle $\theta$ to thereby determine arithmetically the normal transverse acceleration Go' (step S13P).

Succeedingly, the transverse acceleration deviation arithmetic unit 31F subtracts the actual transverse acceleration Gy from the normal transverse acceleration Go' to derive the absolute value of the difference as the transverse acceleration deviation $\Delta$G' (step S14P).

Finally, the transverse acceleration deviation $\Delta$G' is compared with the predetermined deviation quantity $\alpha$4 preset in dependence on the motor vehicle concerned and the vehicle speed v by means of the motor vehicle behavior stability decision unit 5F, whereon decision is made whether the condition given by the above-mentioned expression (14), i.e., $\Delta$G'$\geq\alpha$4, is satisfied or not (step S15P).

When it is decided in the step S15P that $\Delta$G'$\geq\alpha$4 (i.e., when the decision step S15P results in "YES"), it is determined that the behavior of the motor vehicle is unstable or that a prognostic sign thereof exists (step S16). By contrast, when it is decided in the step S15P that $\Delta$G'<$\alpha$4 (i.e., when the decision step S15P results in "NO"), it is then determined that the behavior of the motor vehicle is stable (step S17), whereon the processing routine shown in FIG. 49 comes to an end.

In this manner, the unstable state of the motor vehicle behavior can be determined by detecting the steering angle θ, the vehicle speed v and the actual transverse acceleration Gy actually taking place in the motor vehicle to thereby arithmetically determine the normal transverse acceleration Go' for the actual steering angle θ and comparing the actual transverse acceleration Gy with the normal transverse acceleration Go', whereby the unstable state of the motor vehicle behavior can effectively be detected even in the locked state where the grip force of tire is reduced, as is the case with the embodiments described hereinbefore.

Additionally, even in the case where the side slip angle β of the motor vehicle cannot be measured, it is possible to detect the unstable state of the motor vehicle behavior or the prognostic sign thereof by making use of the vehicle speed v and the steering angle θ.

The actual transverse acceleration Gy which acts on the motor vehicle running on the slippery road surface becomes small as the actual steering angle θ decreases. However, in the region where the actual steering angle θ is further lessened, the linearity of the actual transverse acceleration Gy which conforms to the slope of the normal transverse acceleration Go' is sustained. Thus, the range of gain of the normal transverse acceleration Go' for the actual steering angle θ can be used, similarly to the case where the motor vehicle is running on a dry-asphalt road surface.

Embodiment 24

In the case of the motor vehicle state detecting system according to the twenty-third embodiment of the invention, decision as to whether or not the motor vehicle is in the unstable state is made on the basis of the deviation ΔG' of the actual transverse acceleration Gy from the normal transverse acceleration Go'. In the motor vehicle state detecting system according to a twenty-fourth embodiment of the present invention, such arrangement is adopted that a change rate of the actual transverse acceleration Gy for the steering angle θ is arithmetically determined (or alternatively measured) to thereby determine that the motor vehicle is in the unstable state when the acceleration/steering-angle change rate departs from a predetermined range.

Figure 50:
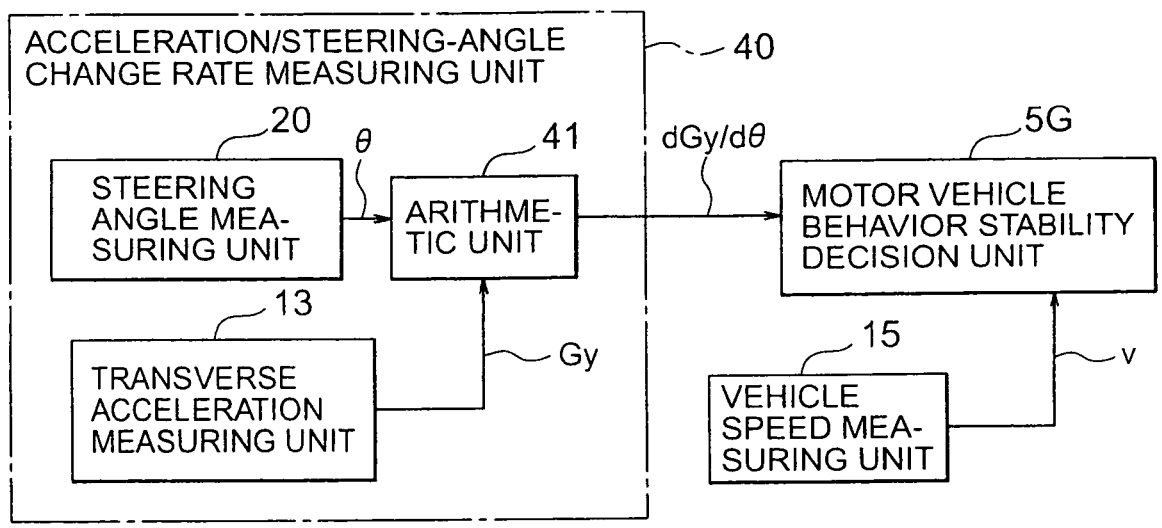
FIG. 50 is a block diagram showing schematically a major portion of the motor vehicle state detecting system according to a twenty-fourth embodiment of the present invention.

FIG. 50 is a schematic block diagram showing generally a major portion of the motor vehicle state detecting system according to the twenty-fourth embodiment of the invention which is so arranged as to make decision concerning the stability of behavior of the motor vehicle on the basis of comparison between the acceleration/steering-angle change rate and the predetermined range. Incidentally, components same as or equivalent to those described hereinbefore by reference to FIGS. 21 and 34 are denoted by like reference symbols affixed with "G" as the case may be. Repeated description in detail of those components will be unnecessary.

Now, referring to FIG. 50, reference numeral 40 denotes an acceleration/steering-angle change rate measuring unit which is comprised of the steering angle measuring unit 20, the transverse acceleration measuring unit 13 and an arithmetic unit 41. The arithmetic unit 41 is designed to arithmetically determine (or alternatively measure) the rate of change of the actual transverse acceleration Gy for the actual steering angle θ in terms of the acceleration/steering-angle change rate dGy/dθ.

The acceleration/steering-angle change rate dGy/dθ arithmetically determined by the arithmetic unit 41 incorporated in the acceleration/steering-angle change rate measuring unit 40 is inputted to a motor vehicle behavior stability decision unit 5G to be used in making decision as to the stability of behavior of the motor vehicle.

Further, the vehicle speed v outputted from the vehicle speed measuring unit 15 is supplied to the motor vehicle behavior stability decision unit 5G to be used for setting a reference value (predetermined range) for deciding the motor vehicle behavior.

The motor vehicle behavior stability decision unit 5G includes a predetermined range setting means which is designed to set a predetermined range as a reference for comparison with the acceleration/steering-angle change rate dGy/dθ in dependence on the type of the motor vehicle concerned and the vehicle speed v. When the acceleration/steering-angle change rate dGy/dθ departs from the predetermined range, the motor vehicle behavior stability decision unit 5G determines that the behavior of the motor vehicle is unstable.

In general, the actual transverse acceleration Gy bears at least approximately a proportional relation to the actual steering angle θ so long as the motor vehicle is in the stable running state. However, when the behavior of the motor vehicle approaches to the stability limit mentioned hereinbefore, magnitude of the actual transverse acceleration Gy decreases to a level where the proportional relation to the steering angle θ can no more be maintained, as described hereinbefore by reference to FIG. 20. By taking advantage of this feature, it is possible to make decision as to the state of the motor vehicle.

The arithmetic unit 41 incorporated in the acceleration/steering-angle change rate measuring unit 40 may, for example, be so designed as to determine the acceleration/steering-angle change rate dGy/dθ by measuring the actual transverse acceleration Gy in correspondence to the steering angle θ actually measured.

The motor vehicle behavior stability decision unit 5G compares the acceleration/steering-angle change rate dGy/dθ with a predetermined range preset, to thereby determine that the behavior of the motor vehicle is unstable when the acceleration/steering-angle change rate dGy/dθ lies outside of the predetermined range. Mathematically, this decision can be expressed as follows:

$$dGy/d\theta \geq \alpha 4U' \text{ or } dGy/d\theta \leq \alpha 4L' \qquad (15)$$

Figure 51:
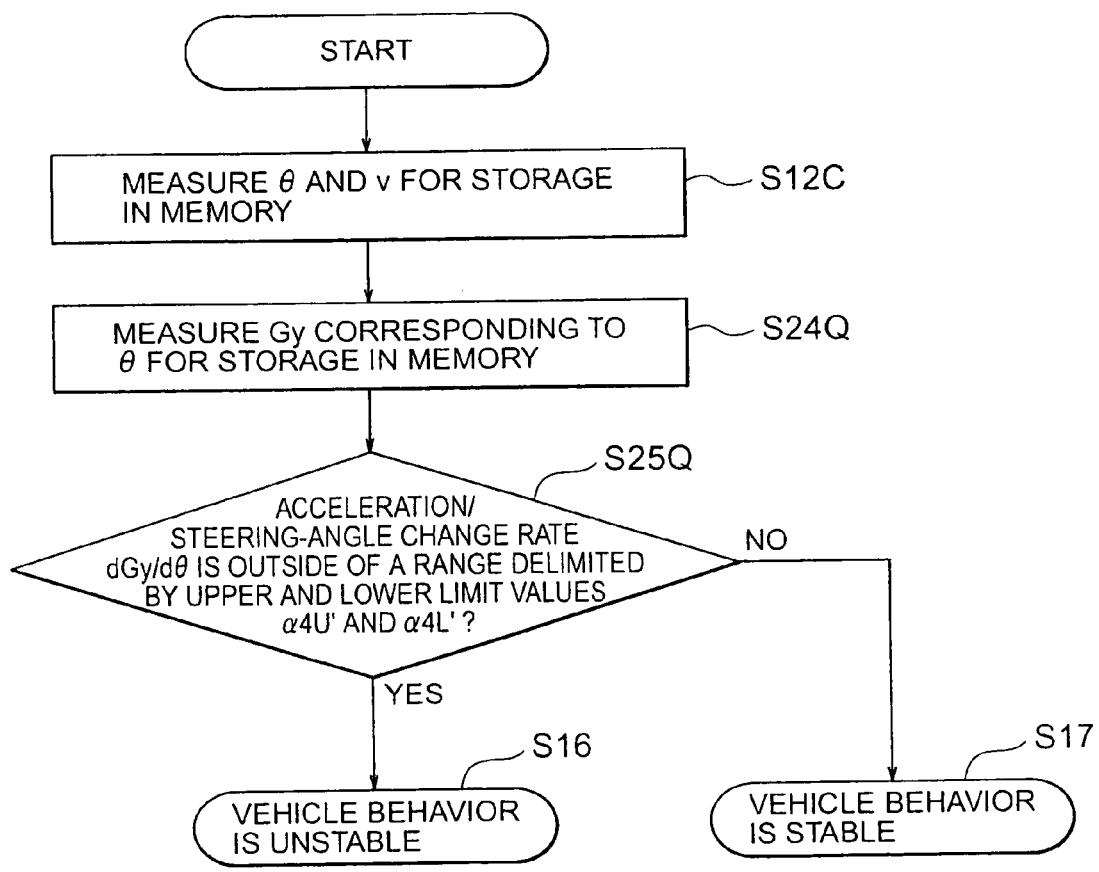
FIG. 51 is a flow chart for illustrating vehicle behavior decision operation performed by the motor vehicle state detecting system according to the twenty-fourth embodiment of the invention.

Next, referring to a flow chart shown in FIG. 51, description will be made of the processings executed by the motor vehicle state detecting system according to the twenty-fourth embodiment of the invention. In FIG. 51, the steps S12C, S16 and S17 represent the processings similar to those described hereinbefore by reference to FIGS. 22 and 35. Further, processing steps corresponding to those described hereinbefore are affixed with "Q".

At first, the actual steering angle θ is measured by means of the arithmetic unit 41 incorporated in the acceleration/steering-angle change rate measuring unit 40 to be stored in a memory in a step S12C, which is then followed by a step S24Q where the actual transverse acceleration Gy corresponding to the actual steering angle θ is measured in terms of the acceleration/steering-angle change rate dGy/dθ which is then stored in the memory as well.

In succession, in a step S25Q, the motor vehicle behavior stability decision unit 5G fetches the acceleration/steering-angle change rate dGy/dθ measured by the acceleration/steering-angle change rate measuring unit 40 to make decision whether or not the acceleration/steering-angle change rate dGy/dθ departs from the predetermined range defined by the upper limit value α4U' and the lower limit value α4L', respectively.

When it is decided in the step S25Q that the acceleration/steering-angle change rate dGy/dθ departs from the predetermined range (i.e., "YES"), it is determined in a step S16 that the behavior of the motor vehicle is unstable (or that a prognostic sign thereof exists). By contrast, when it is decided in the step S25Q that the acceleration/steering-angle change rate dGy/dθ lies within the predetermined range (i.e., when the step S25Q is "NO"), it is then determined that the behavior of the motor vehicle is stable (step S17), whereupon the processing routine shown in FIG. 51 comes to an end.

As is obvious from the above, by detecting the unstable state of the motor vehicle behavior on the basis of the actual steering angle θ and the actual transverse acceleration Gy really taking place in the motor vehicle concerned, it is possible to detect effectively the unstable state of the motor vehicle behavior even in the situation where the grip force of tire is reduced.

Figure 52:
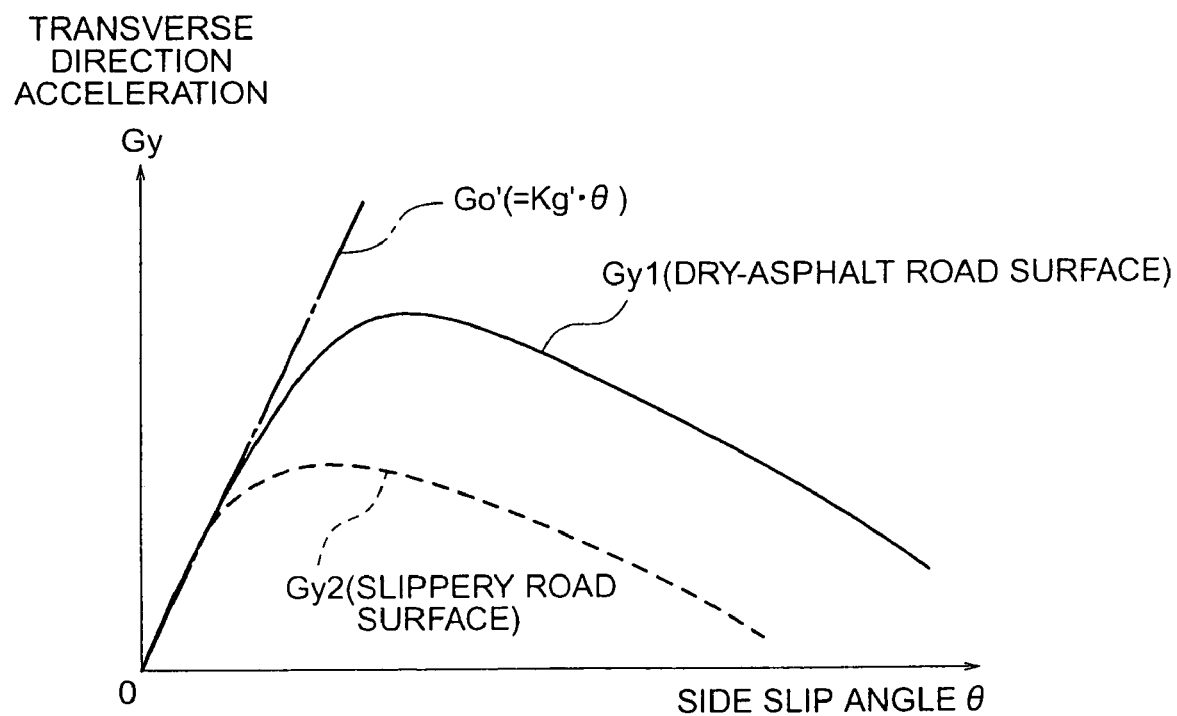
FIG. 52 is a characteristic diagram for graphically illustrating characteristic of a transverse acceleration for a steering angle when a friction coefficient of a road surface changes in the system according to the twenty-fourth embodiment of the invention.

As illustrated in FIG. 52, the actual transverse acceleration Gy which acts on the motor vehicle running on the slippery road surface is low when the actual steering angle θ is relatively small. However, in the region where the steering angle θ is further lessened, linearity which conforms to the slope of the normal transverse acceleration Go' is sustained. Thus, the range of the acceleration/steering-angle change rate (gain) can be used for making decision concerning the stability of the motor vehicle behavior as is with the case of the motor vehicle running on a dry-asphalt (not slippery) road surface.

FIG. 52 is a characteristic diagram for graphically illustrating the characteristics of the actual transverse accelerations Gy1 and Gy2 as a function of the actual steering angle (θ). This figure corresponds FIG. 33 described hereinbefore.

In FIG. 52, the actual steering angle θ is taken along the abscissa while the actual transverse acceleration Gy is taken along the ordinate. Further, in the figure, a single-dotted line curve represents the normal transverse acceleration Go', a solid line curve represents an actual transverse acceleration Gy1 when the motor vehicle is running on a road surface covered with dry asphalt, and a broken line curve represents an actual transverse acceleration Gy2 when the motor vehicle is traveling on a slippery road surface.

As can be seen in FIG. 52, the characteristic curve representing the actual transverse acceleration Gy2 on the slippery road surface (see broken line curve) begins to fall at the actual steering angle θ of a smaller value when compared with the actual transverse acceleration Gy1 on the dry asphalt road surface represented by the solid line characteristic curve. However, in a range where the actual steering angle θ is much smaller than the value mentioned above, linearity of the actual transverse acceleration Gy2 on the slippery road surface which substantially conforms to the normal transverse acceleration Go' is sustained similarly to the characteristic curve Gy1.

Accordingly, in the range or region where the value of the actual steering angle θ is small, the range of the gain of the normal transverse acceleration Go' preset in dependence on the motor vehicle concerned for the steering angle θ can be made use of independently from the road surface condition. (the slope of the curve Go' shown in FIG. 52).

Embodiment 25

In the motor vehicle state detecting system according to the twenty-fourth embodiment of the invention, the acceleration/steering-angle change rate measuring unit 40 is employed for determining the acceleration/steering-angle change rate dGy/dθ. In the case of the motor vehicle state detecting system according to a seventeenth embodiment of the present invention, the time-based change rates of the actual steering angle θ and the actual transverse acceleration Gy, respectively, are measured and subjected to the division processing with a view to determining the acceleration/steering-angle change rate dGy/dθ instead of employing the acceleration/steering-angle change rate measuring unit 40.

Figure 53:
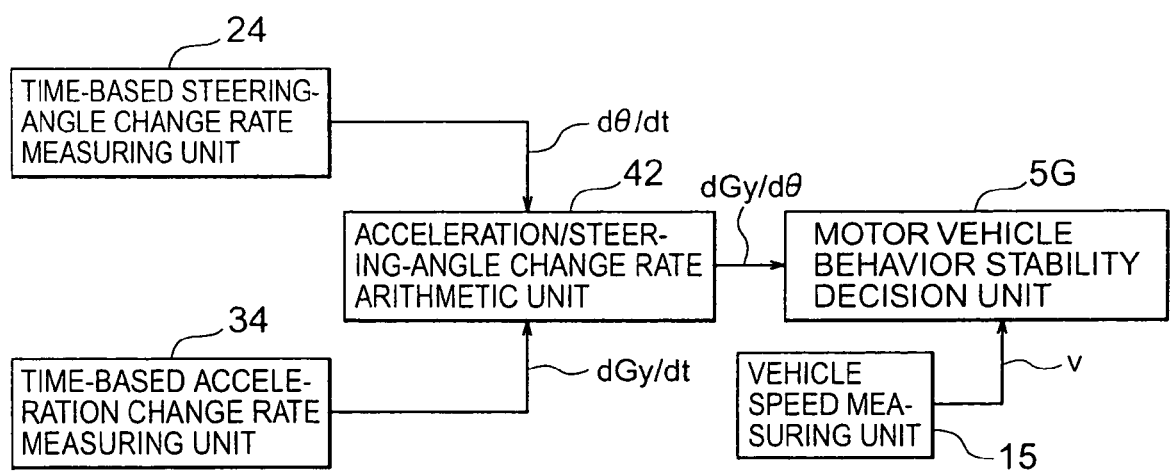
FIG. 53 is a block diagram showing schematically a major portion of the motor vehicle state detecting system according to a twenty-fifth embodiment of the present invention.

FIG. 53 is a block diagram showing generally and schematically a major portion of the motor vehicle state detecting system according to the twenty-fifth embodiment of the invention in which the acceleration/steering-angle change rate dGy/dθ is determined on the basis of the time-based change rates of the actual steering angle θ and the actual transverse acceleration Gy, respectively. In this figure, components similar to those described hereinbefore by reference to FIGS. 23, 36 and 50 are denoted by like reference symbols.

Referring to FIG. 53, the arithmetic means for determining a parameter used in deciding the stability of the motor vehicle behavior is comprised of a time-based steering-angle change rate measuring unit 24 for determining the time-based steering-angle change rate dθ/dt, a time-based acceleration change rate measuring unit 34 for determining the time-based change rate of the actual transverse acceleration Gy in the form of dGy/dt (i.e., the time-based acceleration change rate) and an acceleration/steering-angle change rate arithmetic unit 42 for arithmetically determining the acceleration/steering-angle change rate dGy/dθ by dividing the time-based acceleration change rate dGy/dt by the time-based steering-angle change rate dθ/dt.

The vehicle speed v actually measured is inputted to the motor vehicle behavior stability decision unit 5G, as is the case with the embodiments described hereinbefore.

Now, referring to FIG. 53, operation of the motor vehicle state detecting system according to the instant embodiment of the invention will be described.

The motor vehicle behavior stability decision unit 5G is designed to determine the state of the motor vehicle by taking advantage of the fact that the proportional relation of the actual transverse acceleration Gy relative to the actual steering angle θ can no more be sustained or held when the actual transverse acceleration Gy approaches to the stability limit of the motor vehicle.

The time-based slip-angle change rate measuring unit 8 is designed to measure the time-based steering-angle change rate dθ/dt (steering angular speed), while the time-based acceleration change rate measuring unit 34 is designed to determine the time-based acceleration change rate dGy/dt by measuring the actual transverse acceleration Gy at a predetermined time interval.

The acceleration/slip-angle change rate arithmetic unit 42 is so designed as to divide the time-based acceleration change rate dGy/dt by the time-based steering-angle change rate dθ/dt to thereby arithmetically determine the ratio of the change rate of the actual transverse acceleration Gy to that of the actual steering angle θ in terms of the torque/steering-angle change rate dTa/dθ in accordance with the undermentioned expression (16):

$$(dGy/dt)/(d\theta/dt)=dGy/d\theta \tag{16}$$

The motor vehicle behavior stability decision unit 5G determines that the behavior of the motor vehicle is in the unstable state or the prognostic sign thereof exists when the acceleration/steering-angle change rate dGy/dθ is outside of a predetermined range (see the expression (15) mentioned previously), as a result of which an unstable state detection signal is outputted from the motor vehicle behavior stability decision unit 5G.

Figure 54:
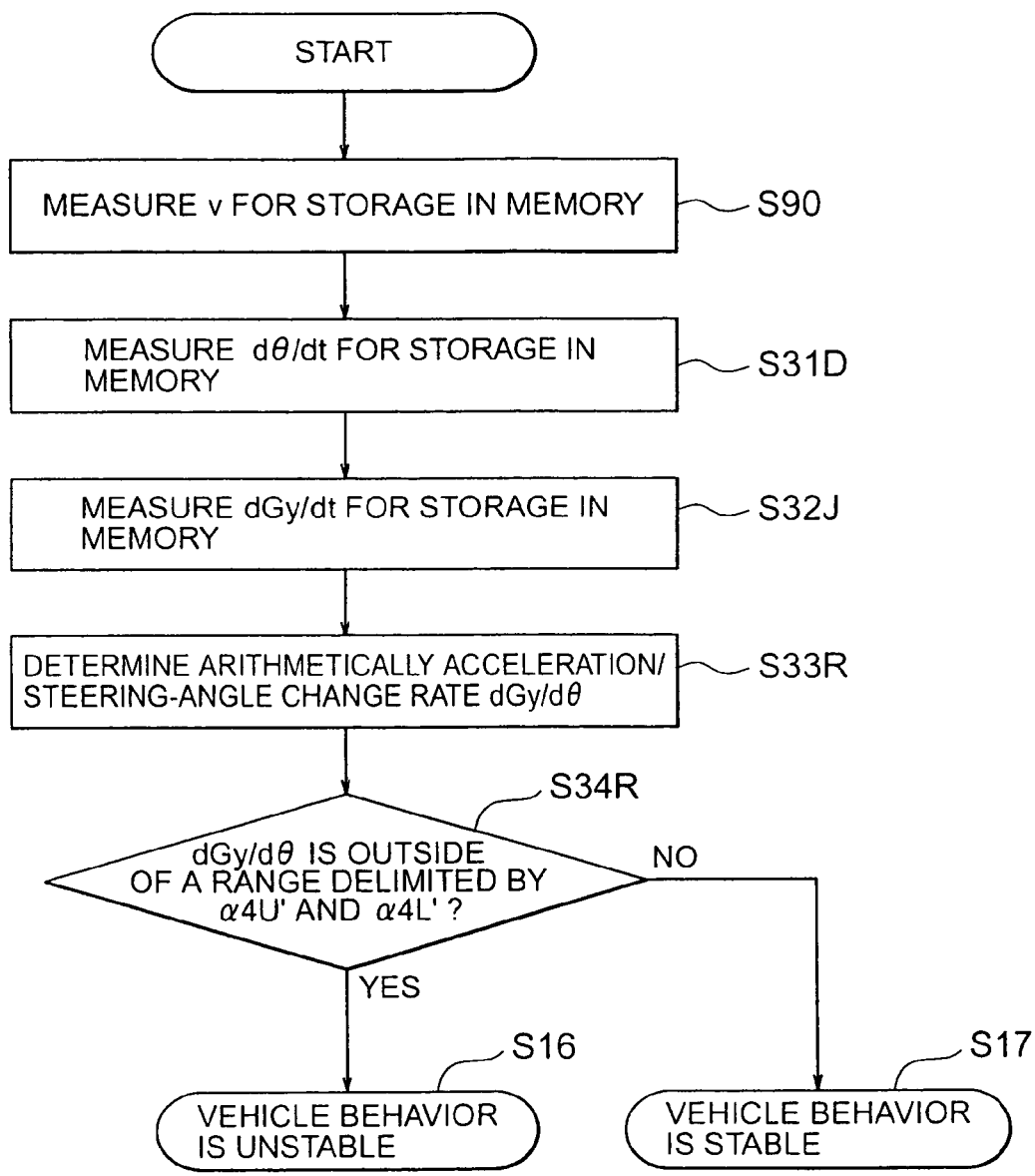
FIG. 54 is a flow chart for illustrating vehicle behavior decision operation performed by the motor vehicle state detecting system according to the twenty-fifth embodiment of the invention.

Next, description will be made of the processings executed performed by the motor vehicle state detecting system according to the twenty-fifth embodiment of the invention by reference to a flow chart shown in FIG. 54 together with FIG. 53. In FIG. 54, processing steps S90, S31D, S32J, S16 and S17 are essentially same as those described hereinbefore by reference to FIGS. 24 and 37. The processing steps which correspond to those described previously are denoted by like reference symbols affixed with "R".

At first, the vehicle speed v, the time-based steering-angle change rate dθ/dt are measured, respectively, to be stored in the memory (steps S90, S31D, S32D).

In succession, the time-based acceleration change rate dGy/dt is divided by the time-based steering-angle change rate dθ/dt to determine the acceleration/steering-angle change rate dGy/dθ (step S33D).

When the acceleration/steering-angle change rate dGy/dθ lies outside of the predetermined range delimited by the upper limit value α4U' and the lower limit value α4L', respectively, the motor vehicle behavior stability decision unit 5G decides that the behavior of the motor vehicle is unstable (step S16), while deciding that the behavior of the motor vehicle is stable when the acceleration/steering-angle change rate dGy/dθ falls within the predetermined range mentioned above (step S17).

In this manner, by making use of the acceleration/steering-angle change rate dGy/dθ, there can be achieved advantageous action and effect similar to those of the embodiments described hereinbefore.

More specifically, even in the case where it is impossible to directly measure (or determine arithmetically) the acceleration/steering-angle change rate dGy/dθ, this change rate can arithmetically be derived from the time-based change rates of the actual transverse acceleration Gy and the actual steering angle θ, respectively.

Embodiment 26

In the motor vehicle state detecting system according to the twenty-fifth embodiment of the invention, the time-based change rates of the actual steering angle θ and the actual transverse acceleration Gy, respectively, are used for arithmetically determining the acceleration/steering-angle change rate dGy/dθ. In the motor vehicle state detecting system according to an eighteenth embodiment of the present invention, the change rates of the actual steering angle θ and the actual transverse acceleration Gy, respectively, for the travel distance of the motor vehicle (i.e., distance the motor vehicle has traveled) are used.

Figure 55:
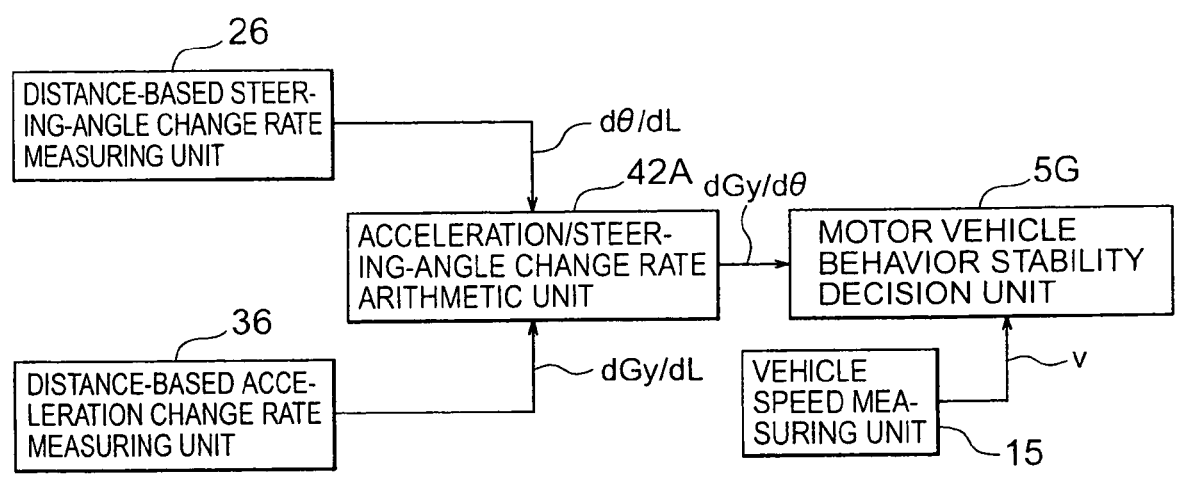
FIG. 55 is a block diagram showing schematically a major portion of the motor vehicle state detecting system according to a twenty-sixth embodiment of the present invention.

FIG. 55 is a block diagram showing generally and schematically a major portion of the motor vehicle state detecting system according to the twenty-sixth embodiment of the invention in which there are used the change rates of the actual side slip angle θ and the actual transverse acceleration Gy, respectively, for the travel distance of the motor vehicle (i.e., the distance-based slip-angle change rate and the distance-based acceleration change rate).

In FIG. 55, reference numeral 36 denotes a distance-based acceleration change rate measuring unit and numeral 5G denotes a motor vehicle behavior stability decision unit which is similar to those described hereinbefore in conjunction with FIGS. 25, 38 and 53. An acceleration/steering-angle change rate arithmetic unit 42A corresponds to the acceleration/steering-angle change rate arithmetic unit 42 shown in FIG. 53.

In the case of the instant embodiment of the invention, the arithmetic means for determining the parameter for the stability decision is comprised of a distance-based steering-angle change rate measuring unit 26 for determining the distance-based steering-angle change rate dθ/dL, a distance-based acceleration change rate measuring unit 36 for determining the distance-based acceleration change rate dGy/dL, and a acceleration/steering-angle change rate arithmetic unit 42A for arithmetically determining the acceleration/steering-angle change rate dGy/dθ.

The distance-based steering-angle change rate measuring unit 26 includes a travel distance measuring unit (or arithmetic unit) for determining the distance L the motor vehicle has traveled or moved (travel distance).

Now, referring to FIG. 55, operation of the motor vehicle state detecting system according to the eighteenth embodiment of the invention will be described.

The distance-based slip-angle change rate measuring unit 11 arithmetically determines the distance-based slip-angle change rate dβ/dL by measuring e.g. the ground speeds in both the longitudinal and transverse directions, respectively, while the distance-based acceleration change rate measuring unit 36 arithmetically determines the distance-based acceleration change rate dGy/dL by measuring the actual transverse acceleration Gy every predetermined travel distance.

The acceleration/steering-angle change rate arithmetic unit 42A is designed to divide the distance-based acceleration change rate dGy/dL by the distance-based steering-angle change rate dθ/dL to thereby determine the acceleration/steering-angle change rate dGy/dθ in accordance with the undermentioned expression (17):

$$(dGy/dL)/(d\theta/dL) = dGy/d\theta \qquad (17)$$

The motor vehicle behavior stability decision unit 5G is designed to check whether or not the acceleration/steering-angle change rate dGy/dθ falls within a predetermined range to determine that the behavior of the motor vehicle is unstable when the acceleration/steering-angle change rate dGy/dθ is outside of the predetermined range, as is the case with the preceding embodiments.

Figure 56:
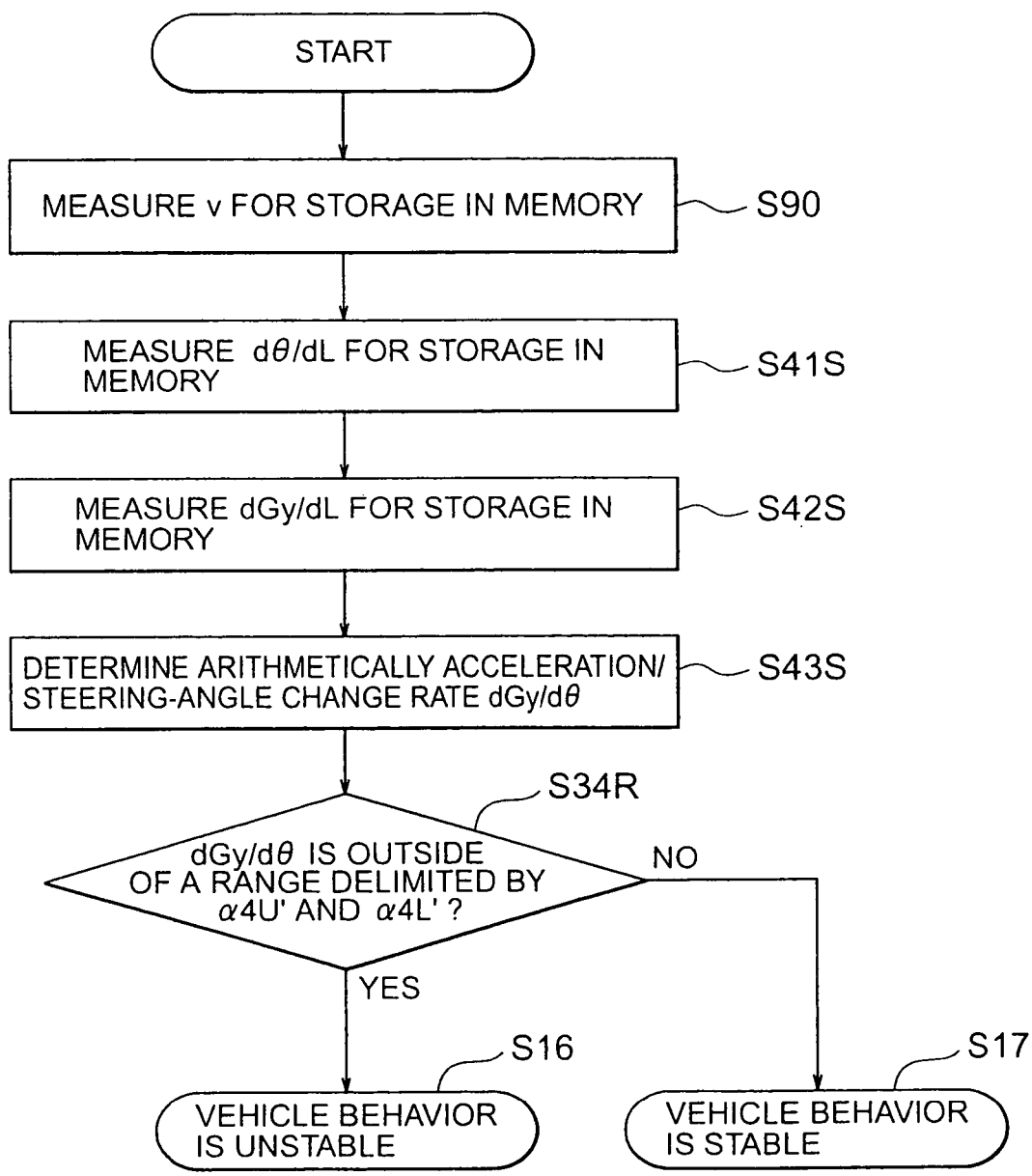
FIG. 56 is a flow chart for illustrating vehicle behavior decision operation performed by the motor vehicle state detecting system according to the twenty-sixth embodiment of the invention.

Next, referring to a flow chart shown in FIG. 56, description will be made of the processings executed by the motor vehicle state detecting system according to the twenty-sixth embodiment of the invention shown in FIG. 55. In FIG. 56, the steps S90 and S34R represent the processings similar to those described hereinbefore by reference to FIG. 54 while the processings executed in steps S41S, S42S and S43S correspond, respectively, to those executed in the steps S41E, S42E and S43E shown in FIG. 26.

At first, the vehicle speed v, the distance-based steering-angle change rate dθ/dL and the distance-based acceleration change rate are measured, respectively, to be stored in the memory (steps S90, S41S and S42S).

Subsequently, the distance-based acceleration change rate dGy/dL is divided by the distance-based steering-angle change rate dθ/dL to thereby derive the acceleration/steering-angle change rate dGy/dθ (step S43S).

In succession, the motor vehicle behavior stability decision unit 5G compares the acceleration/steering-angle change rate dGy/dβ with the predetermined range delimited by the upper limit value α4U' and the lower limit value α4L' (step S34R) to thereby make decision whether the behavior of the motor vehicle is in the unstable state (step S16) or in the stable state (ste_S17).

In the motor vehicle state detecting system according to the instant embodiment of the invention, advantageous actions and effects comparable to those mentioned previously can be obtained. Furthermore, even in the case where it is impossible to directly measure (or determine arithmetically) the acceleration/steering-angle change rate $dGy/d\theta$, the latter can arithmetically be derived through the division mentioned above, and the decision as to the stability of the motor vehicle behavior can be realized by comparing the acceleration/steering angle change rate $dGy/d\theta$ with the predetermined range preset in dependence on the vehicle speed.

Embodiment 27

In the motor vehicle state detecting system according to the twenty-fifth embodiment of the invention, no consideration has been paid to the processing which is executed when the time-based steering-angle change rate $d\theta/dt$ is smaller than the lower limit permissible value. In the motor vehicle state detecting system according to a twenty-seventh embodiment of the present invention, such arrangement is adopted that the division arithmetic processing executed by the acceleration/steering-angle change rate arithmetic unit 42 (see FIG. 53) is inhibited when the time-based steering-angle change rate $d\theta/dt$ is smaller than the lower limit permissible value with a view to preventing the occurrence of overflow.

Figure 57:
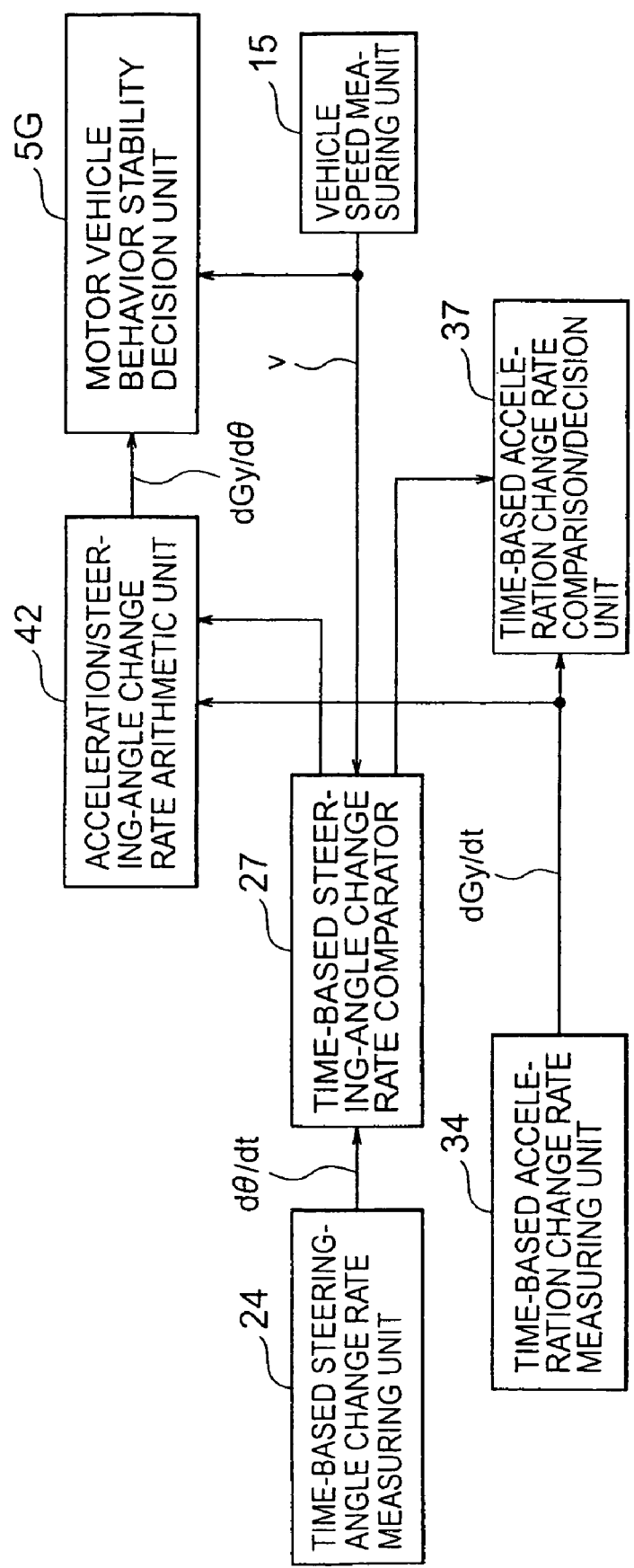
FIG. 57 is a block diagram showing schematically a major portion of the motor vehicle state detecting system according to a twenty-seventh embodiment of the present invention.

FIG. 57 is a block diagram showing generally a major portion of the motor vehicle state detecting system according to the twenty-seventh embodiment of the present invention in which the division arithmetic executed by the acceleration/steering-angle change rate arithmetic unit 42 is inhibited when the time-based steering-angle change rate $d\theta/dt$ is small.

In FIG. 57, components similar to those described previously by reference to FIGS. 27 and 53 are denoted by like reference symbols.

Referring to FIG. 57, the time-based steering-angle change rate comparator 27 is inserted between the time-based steering-angle change rate measuring unit 24 and the acceleration/steering-angle change rate arithmetic unit 42, wherein the time-based acceleration change rate comparison/decision unit 37 is connected to the output of the time-based steering-angle change rate comparator 27.

The time-based steering-angle change rate comparator 27 is so designed that it ordinarily supplies the time-based steering-angle change rate $d\theta/dt$ to the acceleration/steering-angle change rate arithmetic unit 42 to validate the arithmetic operation (division processing) performed by the acceleration/steering-angle change rate arithmetic unit 42.

However, when the time-based steering-angle change rate $d\theta/dt$ is smaller than the lower limit permissible value, the time-based steering-angle change rate comparator 27 inhibits the division processing executed by the acceleration/steering-angle change rate arithmetic unit 42 by disabling the acceleration/steering-angle change rate arithmetic unit 42 while outputting the result of the above-mentioned comparison (i.e., $d\theta/dt$<lower limit permissible value) to the time-based acceleration change rate comparison/decision unit 37 to thereby enable the operation of the time-based acceleration change rate comparison/decision unit 37.

The time-based steering-angle change rate comparator 27 is comprised of a lower limit value setting means and a division arithmetic inhibiting means.

The lower limit value setting means incorporated in the time-based steering-angle change rate comparator 27 is designed to set the lower limit permissible value for the time-based steering-angle change rate $d\theta/dt$ in dependence on the motor vehicle concerned and the vehicle speed v.

On the other hand, the division arithmetic inhibiting means incorporated in the time-based steering-angle change rate comparator 27 is designed to disable the division processing executed by the acceleration/steering-angle change rate arithmetic unit 42 when the value of the time-based steering-angle change rate $d\theta/dt$ is smaller than the lower limit permissible value.

The time-based acceleration change rate comparison/decision unit 37 is comprised of a predetermined change rate setting means for setting a predetermined change rate for the time-based acceleration change rate $dGy/dt$ in dependence on the motor vehicle concerned and a comparison means for comparing the time-based acceleration change rate $dGy/dt$ with the predetermined change rate. Incidentally, the function of the time-based acceleration change rate comparison/decision unit 37 may be implemented as one of the functions of the motor vehicle behavior stability decision unit 5G.

In operation, when it is decided by the time-based steering-angle change rate comparator 27 that the value of the time-based steering-angle change rate $d\theta/dt$ is smaller than the lower limit permissible value, operation of the time-based acceleration change rate comparison/decision unit 37 is validated instead of the acceleration/steering-angle change rate arithmetic unit 42 and the motor vehicle behavior stability decision unit 5G. In that case, the time-based acceleration change rate comparison/decision unit 37 determines that the behavior of the motor vehicle is unstable when the time-based acceleration change rate $dGy/dt$ reaches or exceeds the predetermined change rate value.

In general, when the absolute value of the time-based steering-angle change rate $d\theta/dt$ of the motor vehicle is smaller than the lower limit permissible value and when the absolute value of the time-based acceleration change rate $dGy/dt$ is smaller than the predetermined change rate value, then it can be determined that the motor vehicle is scarcely moving in the transverse direction and thus the motor vehicle is in the stable state.

By contrast, even if the absolute value of the time-based steering-angle change rate $d\theta/dt$ is smaller than the lower limit permissible value, the behavior of the motor vehicle is identified as being in the unstable state when the absolute value of the time-based acceleration change rate $dGy/dt$ is greater than the predetermined change rate value inclusive.

Furthermore, even if the time-based steering-angle change rate $d\theta/dt$ is greater than the lower limit permissible value inclusive, the behavior of the motor vehicle can be regarded as being in the stable state so far as the acceleration/steering-angle change rate $dGy/d\theta$ lies within the predetermined range. However, if the acceleration/steering-angle change rate $dGy/d\theta$ is outside of the predetermined range, it is then determined that the motor vehicle is in the unstable state.

Next, description will turn to operation of the motor vehicle state detecting system according to the twenty-seventh embodiment of the invention shown in FIG. 57.

At first, the time-based steering-angle change rate measuring unit 24 measures the time-based steering-angle change rate $d\theta/dt$ while the time-based acceleration change rate measuring unit 34 measures the time-based acceleration change rate $dGy/dt$.

The time-based steering-angle change rate comparator 27 compares the time-based steering-angle change rate $d\theta/dt$ with the lower limit permissible value to supply the time-based steering-angle change rate $d\theta/dt$ to the acceleration/ steering-angle change rate arithmetic unit 42 when the value of the time-based steering-angle change rate dθ/dt is greater than the lower limit permissible value inclusive. In response thereto, the acceleration/steering-angle change rate arithmetic unit 42 executes the ordinary division processing in accordance with the expression (16) mentioned hereinbefore.

Subsequently, the motor vehicle behavior stability decision unit 5G compares the acceleration/steering-angle change rate dGy/dθ with the predetermined range mentioned above to determine that the behavior of the motor vehicle is in the unstable state when the acceleration/steering-angle change rate dGy/dθ lies outside of the predetermined range (see the expression (15)).

On the other hand, when the value of the time-based steering-angle change rate dθ/dt is smaller than the lower limit permissible value, the time-based steering-angle change rate comparator 27 inhibits the time-based steering-angle change rate dθ/dt from being supplied to the acceleration/steering-angle change rate arithmetic unit 42 (and hence inhibits the division arithmetic represented by the expression (16)). Further, the result of the comparison (dθ/dt<lower limit permissible value) mentioned above is supplied to the time-based acceleration change rate comparison/decision unit 37.

Thus, the time-based acceleration change rate comparison/decision unit 37 is put into operation in place of the motor vehicle behavior stability decision unit 5G, whereby the state of the motor vehicle is detected on the basis of the result of the comparison processing executed by the time-based acceleration change rate comparison/decision unit 37.

More specifically, the time-based acceleration change rate comparison/decision unit 37 compares the time-based acceleration change rate dGy/dt with the predetermined change rate to determine that the behavior of the motor vehicle is in the unstable state when the time-based acceleration change rate dGy/dt is greater than the above-mentioned predetermined change rate inclusive.

Figure 58:
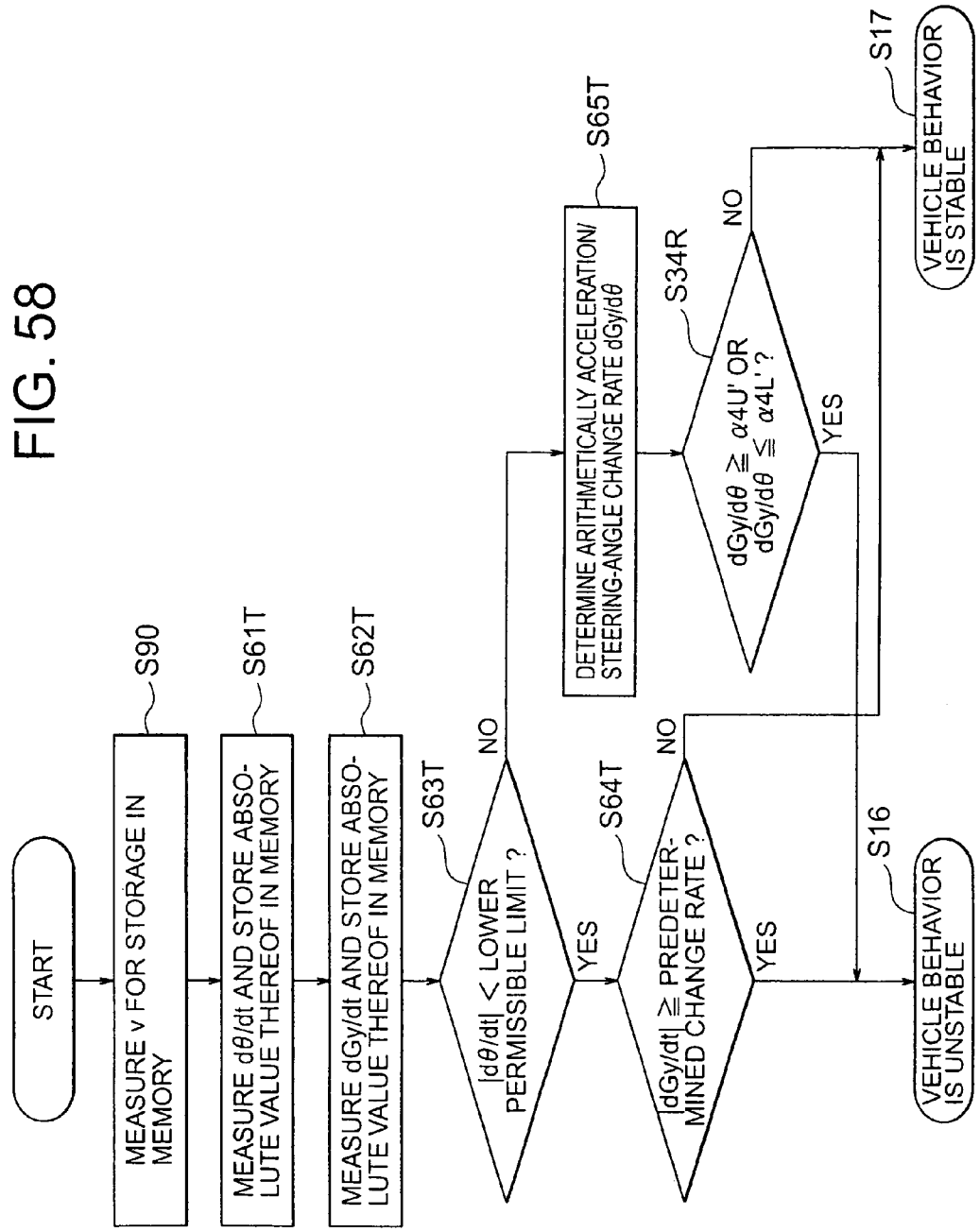
FIG. 58 is a flow chart for illustrating vehicle behavior decision operation performed by the motor vehicle state detecting system according to the twenty-seventh embodiment of the invention.

Next, referring to a flow chart shown in FIG. 58, description will be made of operation performed by the motor vehicle state detecting system according to the twentieth embodiment of the invention shown in FIG. 57. In FIG. 58, the steps S90, S34R, S16 and S17 represent the processings similar to those described hereinbefore by reference to FIG. 54. Further, processings in steps S61T, S62T, S63T, S64T and S65T correspond, respectively, to those executed in the steps S61, S62, S63, S64 and S65 shown in FIG. 28.

At first, the vehicle speed v is measured to be stored in the memory (step S90). The time-based steering-angle change rate dθ/dt is measured and the absolute value thereof is stored in the memory (step S61T). Further, the time-based acceleration change rate dGy/dt is measured and the absolute value thereof is stored in the memory (step S62T).

Subsequently, decision is made whether or not the absolute value of the time-based steering-angle change rate dθ/dt is smaller than the lower limit permissible value (step S63T). When it is determined that |dθ/dt|<lower limit permissible value (i.e., when the step S63T results in "YES"), then the time-based acceleration change rate comparison/decision unit 37 is validated, whereon decision is made whether or not the absolute value of the time-based acceleration change rate dGy/dt is greater than the above-mentioned predetermined change rate inclusive thereof (step S64T).

When the decision step S64T results in that |dGy/dt|≧predetermined change rate, i.e., "YES", it is then determined that the behavior of the motor vehicle is unstable (step S16), while it is determined that the motor vehicle is in the stable state (step S17) when |dGy/dt|<predetermined change rate, i.e., when the step S64T results in "NO", whereon the processing routine shown in FIG. 58 is terminated.

On the other hand, when the decision steps S63T results in that |dθ/dt|≧lower limit permissible value, i.e., "NO", then the acceleration/steering-angle change rate arithmetic unit 42 is put into operation to arithmetically determine the acceleration/steering-angle change rate dGy/dθ (step S65T). In succession, it is decided by the motor vehicle behavior stability decision unit 5G whether or not the acceleration/steering-angle change rate dGy/dθ lies outside of the predetermined range (step S34R).

Finally, in dependence on whether or not the acceleration/steering-angle change rate dGy/dθ lies outside of the predetermined range (delimited by the upper limit value α4U' and the lower limit value α4L', respectively), the unstable state or the stable state of the motor vehicle behavior is decided (step S16 or S17).

As is apparent from the above, according to the teaching of the invention incarnated in the instant embodiment, the division processing performed by the acceleration/steering-angle change rate arithmetic unit 42 is inhibited when the time-based steering-angle change rate dθ/dt is smaller than the lower limit permissible value, and the state of the motor vehicle is determined on the basis of only the time-based acceleration change rate dGy/dt.

By virtue of this feature, occurrence of overflow due to the division processing executed by the acceleration/steering-angle change rate arithmetic unit 42 can be suppressed while ensuring detection of the unstable state of the motor vehicle or the prognostic state thereof, even when the time-based steering-angle change rate dθ/dt is small.

Embodiment 28

In the case of the motor vehicle state detecting system according to the twenty-sixth embodiment of the invention, no consideration has been paid to the processing procedure which can be executed when the distance-based steering-angle change rate dθ/dL is smaller than the lower limit permissible value. In the motor vehicle state detecting system according to a twenty-eighth embodiment of the present invention, such arrangement is adopted that the division arithmetic processing executed by the acceleration/steering-angle change rate arithmetic unit 42A (see FIG. 55) is inhibited when the distance-based steering-angle change rate dθ/dL is smaller than the lower limit permissible value, to thereby prevent occurrence of overflow.

Figure 59:
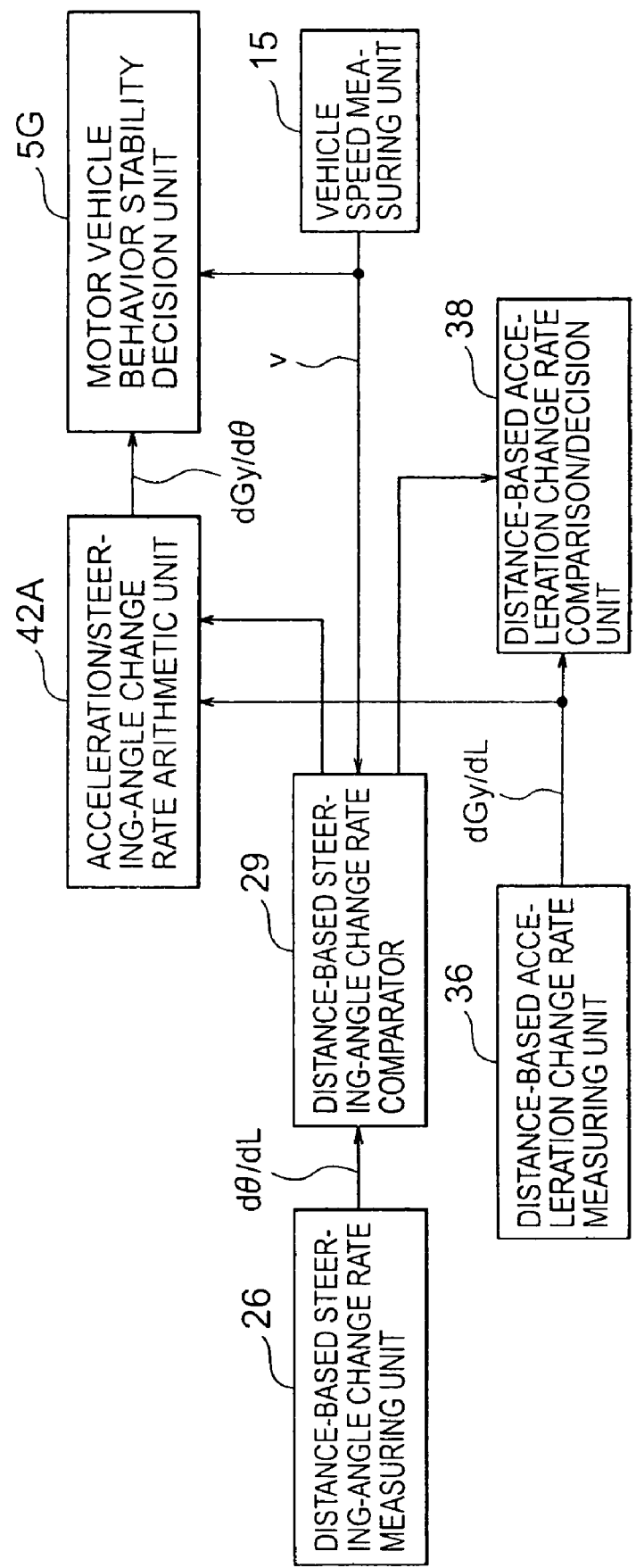
FIG. 59 is a block diagram showing schematically a major portion of the motor vehicle state detecting system according to a twenty-eighth embodiment of the present invention.

FIG. 59 is a block diagram showing generally a major portion of the motor vehicle state detecting system according to the twenty-eighth embodiment of the invention in which the division processing executed by the acceleration/steering-angle change rate arithmetic unit 42A is inhibited when the distance-based steering-angle change rate dθ/dL is small.

In FIG. 59, components similar to those described previously in conjunction with FIGS. 29 and 55 are denoted by like reference symbols.

Referring to the figure, a distance-based steering-angle change rate comparator 29 is inserted between the distance-based steering-angle change rate measuring unit 26 and the acceleration/steering-angle change rate arithmetic unit 42A, wherein the distance-based acceleration change rate comparison/decision unit 38 is connected to the output of the distance-based steering-angle change rate comparator 29.

The distance-based steering-angle change rate comparator 29 is so designed that it ordinarily supplies the distance-based steering-angle change rate dθ/dL to the acceleration/steering-angle change rate arithmetic unit 42A to validate the arithmetic operation (division processing) of the acceleration/steering-angle change rate arithmetic unit 42A.

On the other hand, when the distance-based steering-angle change rate dθ/dL is smaller than a lower limit permissible value, the distance-based steering-angle change rate comparator 29 inhibits the division processing executed by the acceleration/steering-angle change rate arithmetic unit 42A by disabling the acceleration/steering-angle change rate arithmetic unit 42A while outputting the result of the comparison (i.e., dθ/dL<lower limit permissible value) to the distance-based acceleration change rate comparison/decision unit 38 to thereby validate the operation of the distance-based acceleration change rate comparison/decision unit 38.

The distance-based steering-angle change rate comparator 29 is comprised of a lower limit value setting means for setting the lower limit permissible value for the distance-based steering-angle change rate dθ/dL in dependence on the motor vehicle concerned and the vehicle speed v and a division arithmetic inhibiting means for inhibiting the division processing executed by the acceleration/steering-angle change rate arithmetic unit 42A when the distance-based steering-angle change rate dθ/dL is smaller than the lower limit permissible value.

On the other hand, the distance-based acceleration change rate comparison/decision unit 38 is comprised of a predetermined change rate setting means for setting a predetermined change rate for the distance-based acceleration change rate dGy/dL in dependence on the motor vehicle concerned and a comparison means for comparing the distance-based acceleration change rate dGy/dL with the predetermined change rate. Incidentally, the distance-based acceleration change rate comparison/decision unit 38 may be realized as a functional part of the motor vehicle behavior stability decision unit 5G.

In operation, when it is decided by the distance-based steering-angle change rate comparator 29 that the value of the distance-based steering-angle change rate dθ/dL is smaller than the lower limit permissible value, operation of the distance-based acceleration change rate comparison/decision unit 38 is validated in place of the acceleration/steering-angle change rate arithmetic unit 42A and the motor vehicle behavior stability decision unit 5G. In that case, the distance-based acceleration change rate comparison/decision unit 38 determines that the behavior of the motor vehicle is unstable when the distance-based acceleration change rate dGy/dL is greater than the predetermined change rate value inclusive.

In general, when the absolute value of the distance-based steering-angle change rate dθ/dL of the motor vehicle is smaller than the lower limit permissible value and when the absolute value of the distance-based acceleration change rate dGy/dL is smaller than the predetermined change rate value, then it can be determined that the motor vehicle is scarcely moving in the transverse direction and thus the motor vehicle is in the stable state.

On the other hand, even when the absolute value of the distance-based steering-angle change rate dθ/dL is smaller than the lower limit permissible value, it is determined that the behavior of the motor vehicle is unstable if the absolute value of the distance-based acceleration change rate dGy/dL is greater than the predetermined change rate inclusive.

Furthermore, so far as the acceleration/steering-angle change rate dGy/dθ lies within the predetermined range, the motor vehicle can be regarded as being in the stable state, even if the distance-based steering-angle change rate dθ/dL is greater than the lower limit permissible value inclusive. However, if the acceleration/steering-angle change rate dGy/dθ lies outside of the predetermined range, it is then determined that the motor vehicle is in the unstable state.

Referring to FIG. 59, the distance-based steering-angle change rate measuring unit 26 measures the distance-based steering-angle change rate dθ/dL while the distance-based acceleration change rate measuring unit 36 measures the distance-based acceleration change rate dGy/dL.

The distance-based steering-angle change rate comparator 29 outputs the result of comparison to the acceleration/steering-angle change rate arithmetic unit 42A when the distance-based steering-angle change rate dθ/dL is greater than the lower limit permissible value inclusive while outputting the result of comparison to the distance-based acceleration change rate comparison/decision unit 38 when the distance-based steering-angle change rate dθ/dL is smaller than the lower limit permissible value.

The acceleration/steering-angle change rate arithmetic unit 42A divides the distance-based acceleration change rate dGy/dL by the distance-based steering-angle change rate dθ/dL to thereby arithmetically determine the acceleration/steering-angle change rate dGy/dθ in accordance with the expression (17) mentioned previously.

The distance-based acceleration change rate comparison/decision unit 38 determines that the behavior of the motor vehicle is unstable when the distance-based acceleration change rate dGy/dL is greater than the above-mentioned predetermined change rate inclusive.

Figure 60:
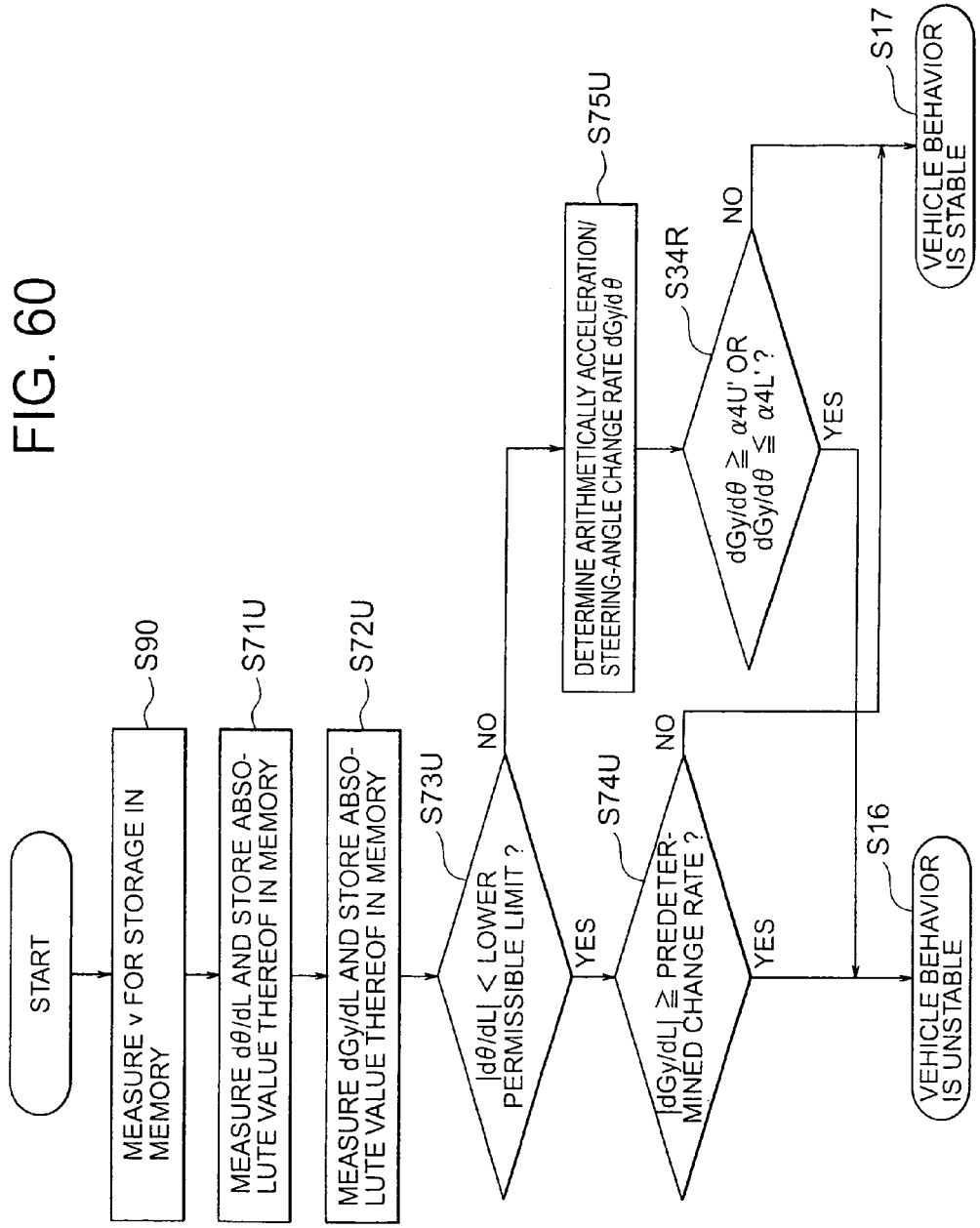
FIG. 60 is a flow chart for illustrating vehicle behavior decision operation performed by the motor vehicle state detecting system according to the twenty-eighth embodiment of the invention.

Next, referring to a flow chart shown in FIG. 60, description will be made of the operation performed executed by the motor vehicle state detecting system according to the twenty-eighth embodiment of the invention shown in FIG. 59. In FIG. 60, the steps S90, S34R, S16 and S17 represent the processings similar to those described hereinbefore by reference to FIGS. 30 and 56. Further, steps S71U, S72U, S73U, S74U and S75U correspond, respectively, to the steps S71G, S72G, S73G, S74G and S75G shown in FIG. 30.

At first, the vehicle speed v is measured and stored in the memory (step S90). The distance-based steering-angle change rate dθ/dL is measured and the absolute value thereof is stored in the memory (step S71U). Further, the distance-based acceleration change rate dGy/dL is measured and the absolute value thereof is stored in the memory (step S72U).

Succeedingly, decision is made whether or not the absolute value of the distance-based steering-angle change rate dθ/dL is smaller than the lower limit permissible value (step S73U). When it is determined that |dθ/dL|<lower limit permissible value (i.e., when the step S73U results in "YES"), then the distance-based acceleration change rate comparison/decision unit 38 is validated for making decision whether or not the absolute value of the distance-based acceleration change rate dGy/dL is greater than the predetermined change rate inclusive (step S74U).

When the decision step S74U results in that |dGy/dL|≧predetermined change rate, i.e., "YES", it is then determined that the behavior of the motor vehicle is unstable (step S16), while it is determined that the motor vehicle is in the stable state when |dGy/dL|<predetermined change rate, i.e., when the step S74U results in "NO" (step S17), whereupon the processing routine shown in FIG. 60 comes to an end.

On the other hand, when the decision steps S73U results in that |dθ/dL|≧lower limit permissible value, i.e., "NO", then the acceleration/steering-angle change rate arithmetic unit 42A is put into operation to arithmetically determine the acceleration/steering-angle change rate dGy/dθ (step S75U). In succession, it is checked by the motor vehicle behavior stability decision unit 5G whether or not the acceleration/steering-angle change rate dGy/dθ lies outside of the predetermined range in accordance with the expression (15) mentioned hereinbefore (step S34R).

Finally, in dependence on whether or not the acceleration/steering-angle change rate dGy/dθ lies outside of the predetermined range, the unstable state or the stable state of the motor vehicle behavior is determined (step S16 or S17).

As is apparent from the above, according to the teaching of the invention incarnated in the twenty-eighth embodiment, the division processing executed by the acceleration/steering-angle change rate arithmetic unit 42A is inhibited when the value of the distance-based steering-angle change rate dθ/dL is smaller than the lower limit permissible value, and the state of the motor vehicle is determined on the basis of only the distance-based acceleration change rate dGy/dL.

By virtue of this arrangement, occurrence of overflow due to the division processing executed by the acceleration/steering-angle change rate arithmetic unit 42A can be suppressed while ensuring detection of the unstable state of the motor vehicle even in the case where the distance-based steering-angle change rate dθ/dL is small.

Embodiment 29

In the foregoing description directed to the first to twenty-eighth embodiments of the invention, no consideration has been paid to the motor-driven power steering apparatus. However, it goes without saying that the teachings of the present invention can of course be applied to the motor vehicle which is equipped with the motor-driven power steering apparatus.

Figure 61:
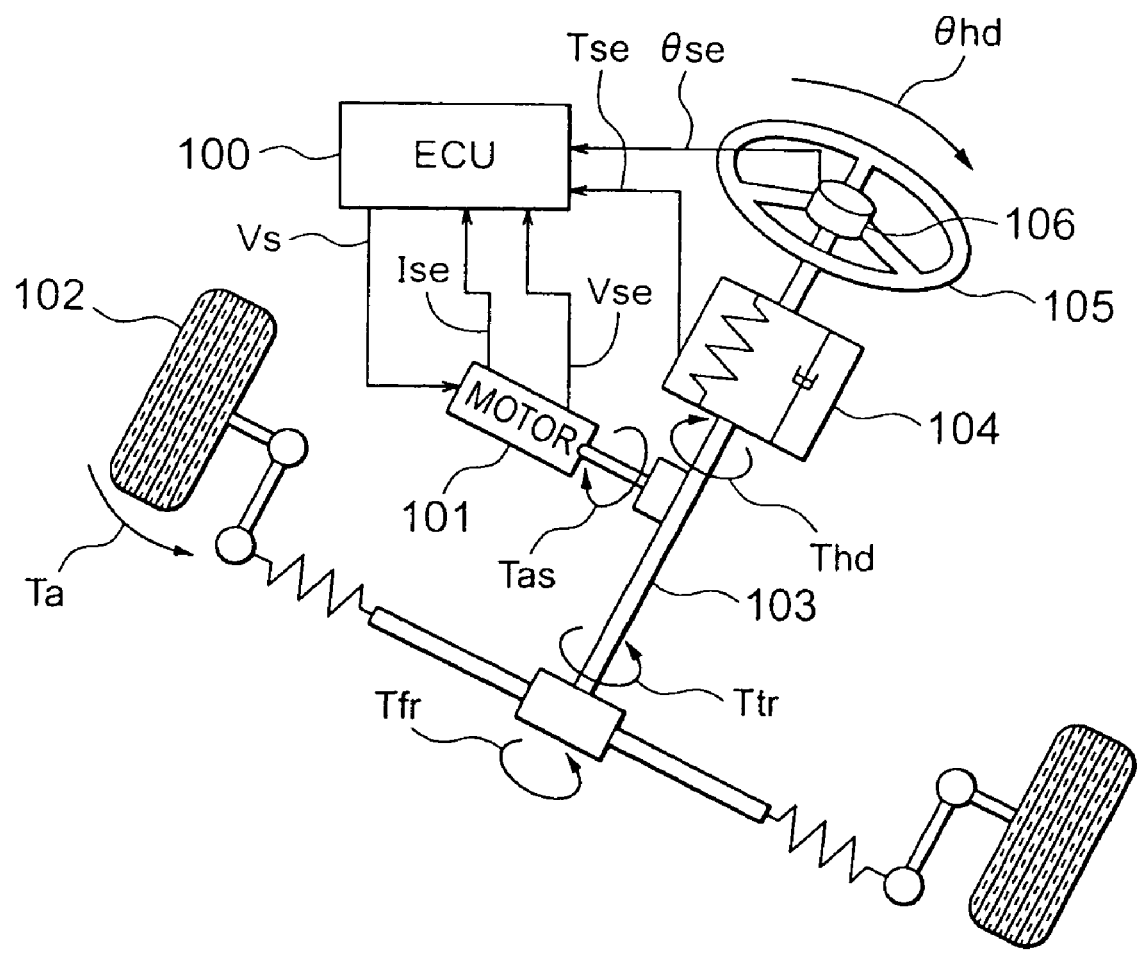
FIG. 61 is a view showing schematically a structure of a motor-driven power steering apparatus according to a twenty-ninth embodiment of the present invention.
Figure 62:
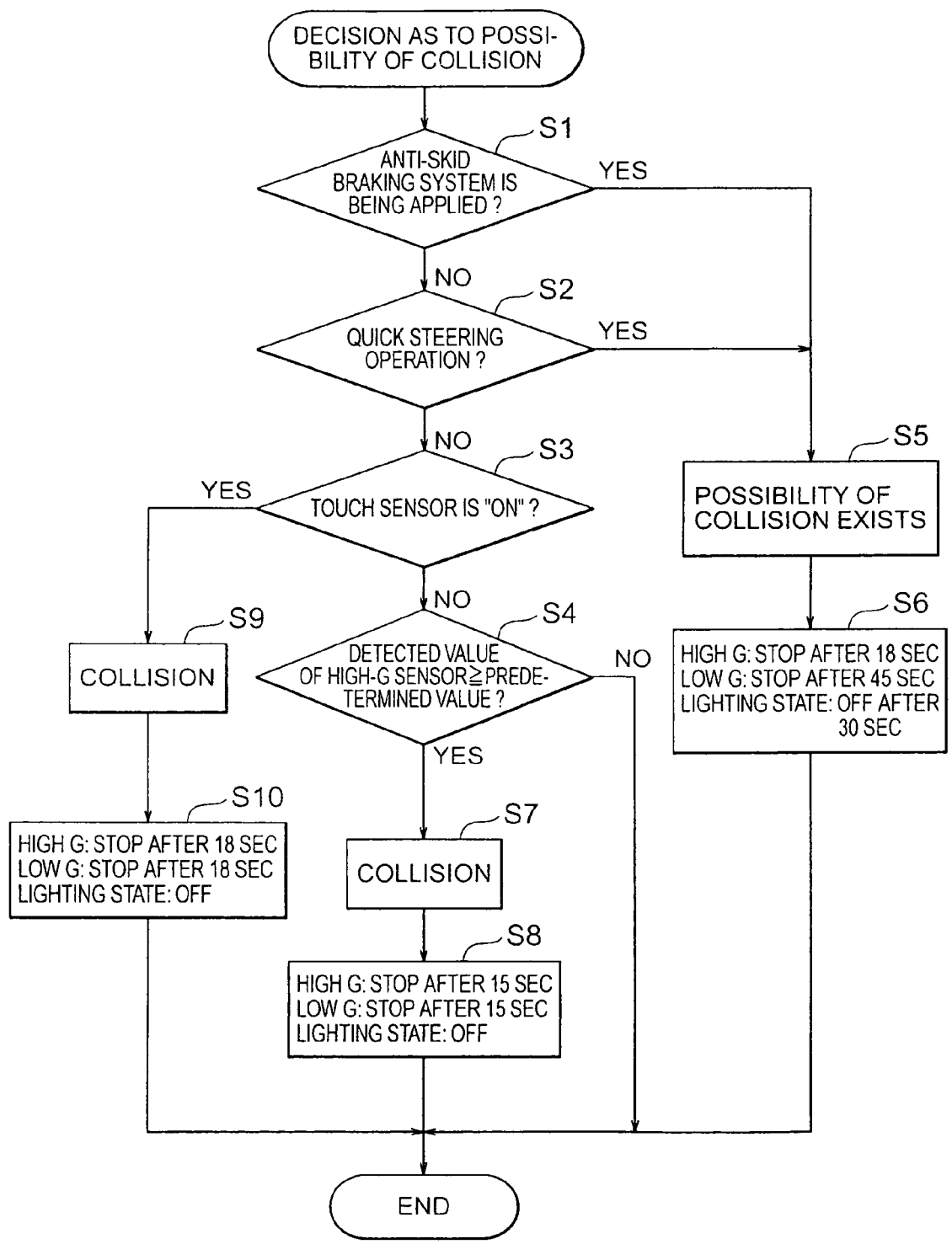
FIG. 62 is a flow chart for illustrating vehicle behavior decision operation performed by a conventional motor vehicle behavior detecting apparatus.

FIG. 61 is a view showing schematically a structure of the motor-driven power steering apparatus according to a twenty-ninth embodiment of the present invention to which the alignment torque measuring means described hereinbefore in conjunction with the first to the twenty-eighth embodiments of the invention is applied.

Referring to FIG. 61, an electronic control unit (hereinafter also referred to simply as the ECU in abbreviation) 100 which includes a microcomputer or microprocessor constitutes a major part of the motor vehicle state detecting system described hereinbefore and at the same time serves as a control unit for the motor-driven power steering apparatus.

The motor-driven power steering apparatus includes an electric motor 101 which is operatively coupled to a steering column 103 for manipulating wheels 102. The electric motor 101 is driven in response to a voltage Vs applied from the ECU 100 to thereby generate an assist torque Tas.

A voltage Vse and a current Ise supplied to the electric motor 101 are detected as voltage and current detection signals, respectively, which are then fed back to the ECU 100.

The steering column 103 is provided with a torque sensor 104 which is adapted to detect the steering torque Thd. A torque detection signal Tse outputted from the torque sensor 104 is fed back to the ECU 100 as well.

The steering wheel 105 manipulated by the driver of the motor vehicle is coupled to the steering column 103. Provided in association with the steering wheel 105 is a steering angle sensor 106 for detecting the steering angle θhd. A detection signal θse outputted from the steering angle sensor 106 is also supplied to the ECU 100 as an input thereto.

An alignment torque Ta acts on the wheels 102 as a reaction force from the road surface. On the other hand, a reaction torque Ttr containing a friction torque Tfr is applied to the steering column 103.

As is well known in the art, one of the major functions of the motor-driven power steering apparatus is to measure the steering torque Thd generated upon manipulation of the steering wheel 105 by the driver to thereby generate the assist torque Tas in response to the torque detection signal Tse.

With a view to realizing a comfortable steering operation and ensuring security for steering operation, the steering angle sensor 106 is provided for detecting the steering angle θhd. Additionally, a sensor (not shown) for measuring a rotation angle or angular velocity (or alternatively angular acceleration derived by differentiating the angular velocity) may be provided.

Further, the current Ise flowing through the electric motor 101 and a voltage Vse applied across the terminals of the electric motor 101 are fetched as the detection signals to be inputted to the ECU 100.

Dynamically, a sum of the steering torque Thd and the assist torque Tas is effective for rotating the steering column 103 against the reaction torque Ttr of the steering column 103.

Further, since the inertia term of the electric motor 101 (differential term of the angular velocity ω) is also active, relations among various torques mentioned above can be expressed as follows:

$$Ttr = Thd + Tas - J \cdot d\omega/dt \qquad (18)$$

For the assist torque Tas of the electric motor 101, the relation given by the undermentioned expression (19) applies valid.

$$Tas = Gg \cdot Kt \cdot Imtr \qquad (19)$$

where Gg represents a constant determined by the gear ratio of the electric motor assembly 101, Kt represents a proportional constant and Imtr represents the torque generated by the motor current.

The reaction torque Ttr of the steering column 203 can be expressed as a sum of the alignment torque Ta and the friction torque Tfr induced in the steering mechanism. In other words, the undermentioned expression (20) holds true:

$$Ttran = Ta + Tfric \qquad (20)$$

By the way, a method of estimating the alignment torque Ta while eliminating the influence of the friction torque Tfr by employing a low-pass filter is disclosed in, for example, Japanese Patent Application Laid-Open Publication No. 122146/2001 (JP-A-2001-122146).

As is apparent from the above, the alignment torque Ta acting on the motor vehicle can equally be measured even in the motor vehicle which is equipped with the motor-driven power steering apparatus. This means that the decision as to the stability of behavior of the motor vehicle equipped with the motor-driven power steering apparatus can be effectuated according to the teachings of the present invention.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A motor vehicle state detecting system for detecting an unstable state of a motor vehicle or alternatively a prognostic sign thereof, comprising:

first detecting means for detecting an actual measured value of a first parameter corresponding to either a side slip angle or alternatively a steering angle of said motor vehicle;

second detecting means for detecting an actual measured value of a second parameter corresponding to either an alignment torque or alternatively a transverse acceleration which said motor vehicle is subjected to;

arithmetic means for arithmetically determining a third parameter relevant to a correlation which said first and second parameters bear to each other;

reference value setting means for setting in advance a comparison reference value for said third parameter; and motor vehicle behavior stability decision means for making decision that behavior of said motor vehicle is unstable when said third parameter departs from said comparison reference value, wherein said first detecting means is designed to detect an actual side slip angle of a vehicle body or alternatively tire of said motor vehicle as the actual measured value of said first parameter, wherein said second detecting means is designed to detect an actual transverse acceleration applied to said motor vehicle as the actual measured value of said second parameter, wherein said arithmetic means is designed to arithmetically determine a change rate of said actual transverse acceleration for said actual side slip angle as an acceleration/slip-angle change rate which serves as said third parameter, wherein said reference value setting means is designed to set as said comparison reference value a predetermined range for said acceleration/slip-angle change rate in dependence on said motor vehicle concerned; and wherein said motor vehicle behavior stability decision means is designed to determine that behavior of said motor vehicle is unstable when said acceleration/slip-angle change rate departs from said predetermined range.

2. A motor vehicle state detecting system according to claim 1, wherein said arithmetic means includes:

time-based slip-angle change rate arithmetic means for arithmetically determining a time-based change rate of said actual side slip angle as a time-based slip-angle change rate;

time-based acceleration change rate arithmetic means for arithmetically determining a time-based change rate of said actual transverse acceleration as a time-based acceleration change rate; and acceleration/slip-angle change rate arithmetic means for dividing said time-based acceleration change rate by said time-based slip-angle change rate to thereby arithmetically derive said acceleration/slip-angle change rate.

3. A motor vehicle state detecting system according to claim 2, further comprising:

vehicle speed detecting means for detecting a running speed of said motor vehicle as a vehicle speed;

transverse acceleration detecting means for detecting transverse acceleration of said motor vehicle; and yaw rate detecting means for detecting an acceleration in the yaw direction of said motor vehicle, wherein said time-based slip-angle change rate arithmetic means is designed to arithmetically determine said time-based slip-angle change rate on the basis of said vehicle speed, said transverse acceleration and said yaw direction acceleration.

4. A motor vehicle state detecting system according to claim 2, wherein said arithmetic means includes:

lower limit value setting means for setting a lower limit permissible value for said time-based slip-angle change rate in dependence on the motor vehicle concerned;

predetermined change rate setting means for setting a predetermined change rate for said time-based acceleration change rate in dependence on the motor vehicle concerned; and division arithmetic inhibiting means for inhibiting division processing executed by said acceleration/slip-angle change rate arithmetic means when said time-based slip-angle change rate is smaller than said lower limit permissible value, wherein said motor vehicle behavior stability decision means determines that behavior of said motor vehicle is unstable when said time-based slip-angle change rate is smaller than said lower limit permissible value and when said time-based acceleration change rate is greater than or equal to said predetermined change rate inclusive thereof.

5. A motor vehicle state detecting system according to claim 1, wherein said arithmetic means includes:

travel distance arithmetic means for arithmetically determining travel distance of said motor vehicle;

distance-based slip-angle change rate arithmetic means for arithmetically determining a change rate of said actual side slip angle for said travel distance as a distance-based slip-angle change rate;

distance-based acceleration change rate arithmetic means for arithmetically determining a change rate of said actual transverse acceleration for said travel distance as a distance-based acceleration change rate; and acceleration/slip-angle change rate arithmetic means for dividing said distance-based acceleration change rate by said distance-based slip-angle change rate to thereby arithmetically derive said acceleration/slip-angle change rate.

6. A motor vehicle state detecting system according to claim 5, wherein said arithmetic means includes:

lower limit value setting means for setting a lower limit permissible value for said distance-based slip-angle change rate in dependence on the motor vehicle concerned;

predetermined change rate setting means for setting a predetermined change rate for said distance-based acceleration change rate in dependence on the motor vehicle concerned; and division arithmetic inhibiting means for inhibiting division processing executed by said acceleration/slip-angle change rate arithmetic means when said distance-based slip-angle change rate is smaller than said lower limit permissible value, wherein said motor vehicle behavior stability decision means determines that behavior of said motor vehicle is unstable when said distance-based slip-angle change rate is smaller than said lower limit permissible value and when said distance-based acceleration change rate is greater than or equal to said predetermined change rate inclusive thereof.

* * * * *